(12) United States Patent
Hayashi

(10) Patent No.: US 10,714,031 B2
(45) Date of Patent: Jul. 14, 2020

(54) DISPLAY DEVICE

(71) Applicant: Japan Display Inc., Minato-ku (JP)

(72) Inventor: Hirotaka Hayashi, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/190,565

(22) Filed: Nov. 14, 2018

(65) Prior Publication Data

US 2019/0164504 A1 May 30, 2019

(30) Foreign Application Priority Data

Nov. 28, 2017 (JP) .................................. 2017-228408

(51) Int. Cl.
*G09G 3/34* (2006.01)
*G02F 1/1362* (2006.01)

(52) U.S. Cl.
CPC . *G09G 3/344* (2013.01); *G02F 2001/136245* (2013.01); *G09G 2300/0814* (2013.01); *G09G 2310/0205* (2013.01); *G09G 2310/0243* (2013.01); *G09G 2310/0267* (2013.01); *G09G 2310/0275* (2013.01); *G09G 2310/0286* (2013.01); *G09G 2330/028* (2013.01)

(58) Field of Classification Search
CPC ..... G02F 2001/136245; G02F 1/13624; G02F 1/13454; G02F 1/1368; G02F 1/167; G09G 2310/0262; G09G 3/3648; G09G 3/3655; G09G 3/3688

See application file for complete search history.

(56) References Cited

U.S. PATENT DOCUMENTS

| 6,859,193 | B1 * | 2/2005 | Yumoto | G09G 3/3216 315/169.3 |
| 7,136,058 | B2 * | 11/2006 | Nakamura | G09G 3/2011 345/211 |
| 2006/0119563 | A1 * | 6/2006 | Nakamura | G09G 3/2011 345/98 |
| 2008/0238899 | A1 * | 10/2008 | Yamada | G09G 3/344 345/204 |
| 2012/0019503 | A1 * | 1/2012 | Lee | G09G 3/3659 345/211 |
| 2013/0063404 | A1 * | 3/2013 | Jamshidi Roudbari | ...... G06F 3/044 345/204 |

FOREIGN PATENT DOCUMENTS

JP 2011-221125 11/2011

* cited by examiner

*Primary Examiner* — Sanjiv D. Patel
(74) *Attorney, Agent, or Firm* — Oblon, McClelland, Maier & Neustadt, L.L.P.

(57) ABSTRACT

A display device comprising: a display portion that is provided on a thin-film transistor (TFT) substrate and that comprises pixel capacitors and pixel transistors included in a plurality of pixels arranged in a matrix in a first direction and a second direction intersecting the first direction, a plurality of scan lines each coupled to some of the pixels arranged in the first direction, and a plurality of video signal lines each coupled to some of the pixels arranged in the second direction; and a driver that is provided on the TFT substrate and that is configured to supply video signals to the video signal lines and to control the pixel transistors to be on and off through the scan lines.

17 Claims, 29 Drawing Sheets

DISPLAY DEVICE

CROSS-REFERENCE TO RELATED APPLICATIONS

This application claims priority from Japanese Application No. 2017-228408, filed on Nov. 28, 2017, the contents of which are incorporated by reference herein in its entirety.

BACKGROUND

1. Technical Field

The present disclosure relates to a display device.

2. Description of the Related Art

Recent years have seen a growing demand for display devices for use in mobile electronic apparatuses, such as mobile phones and electronic paper. Such display devices for use in the mobile electronic apparatuses are desired to consume less power. For example, in an electrophoretic display (EPD) used in the electronic paper, a pixel has a memory property to maintain a potential at the time of being rewritten. Thus, if the EPD performs the rewriting once for each frame, the potential at the time of the rewriting is maintained until the EPD performs the rewriting for the next frame. As a result, the EPD can perform low power consumption driving. The low power consumption is achieved, for example, by configuring pixel transistors in a complementary metal-oxide semiconductor (CMOS) configuration obtained by combining p-channel transistors with n-channel transistors.

In general, a plurality of power supply voltages having different voltage values are generally applied to a drive circuit of a display device. In particular, in the EPD, voltage values used in writing to the pixels are large, and the number of the supplied power supply voltages having the voltage values required to drive the display increases. As a result, cost for a power supply circuit increases, and the display device may increase in price.

SUMMARY

A display device according to one embodiment of the present disclosure includes a display portion that is provided on a thin-film transistor (TFT) substrate and that comprises pixel capacitors and pixel transistors included in a plurality of pixels arranged in a matrix in a first direction and a second direction intersecting the first direction, a plurality of scan lines each coupled to some of the pixels arranged in the first direction, and a plurality of video signal lines each coupled to some of the pixels arranged in the second direction, and a driver that is provided on the TFT substrate and that is configured to supply video signals to the video signal lines and to control the pixel transistors to be on and off through the scan lines. The pixel transistors include first pixel transistors that are p-channel metal-oxide semiconductor (PMOS) transistors coupled between the video signal lines and the pixel capacitors, and second pixel transistors that are n-channel metal-oxide semiconductor (NMOS) transistors coupled in parallel to the first pixel transistors, the scan lines include first scan lines coupled to gates of the first pixel transistors, and second scan lines coupled to gates of the second pixel transistors, and the driver includes a first shift register configured to generate first scan signals to be sequentially supplied to the first scan lines at intervals of a predetermined period, and a second shift register configured to generate second scan signals to be sequentially supplied to the second scan lines at intervals of the predetermined period.

DETAILED DESCRIPTION

Figure 1:
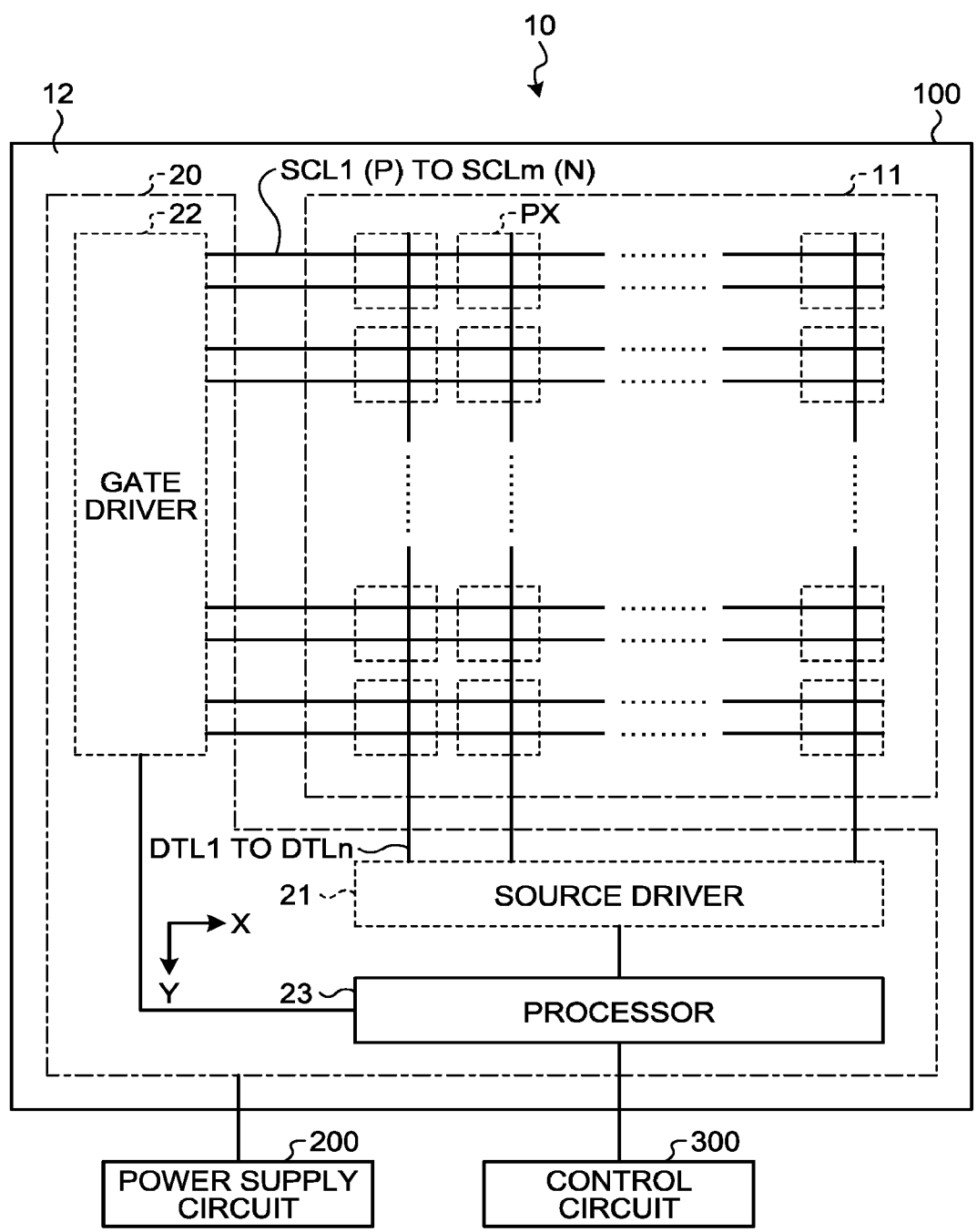
FIG. 1 is a diagram illustrating an exemplary schematic configuration of a display device according to a first embodiment of the present disclosure.

The following describes modes (embodiments) for carrying out the present disclosure in detail with reference to the drawings. The present disclosure is not limited to the description of the embodiments to be given below. Components to be described below include those easily conceivable by those skilled in the art or those substantially identical thereto. Furthermore, the components to be described below can be combined as appropriate. The disclosure is merely an example, and the present disclosure naturally encompasses appropriate modifications easily conceivable by those skilled in the art while maintaining the gist of the disclosure. To further clarify the description, widths, thicknesses, shapes, and the like of various parts will be schematically illustrated in the drawings as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

First Embodiment

FIG. 1 is a diagram illustrating an exemplary schematic configuration of a display device according to a first embodiment of the present disclosure.

For example, a power supply circuit 200 of an electronic apparatus provided with a display device 10 according to the first embodiment applies various power supply voltages to the display device 10, which performs image display, for example, based on a signal output from a control circuit 300 that is a host processor of the electronic apparatus. Examples of the electronic apparatus provided with the display device 10 include, but are not limited to, an electronic paper display device.

In the example illustrated in FIG. 1, the display device 10 is, for example, an electrophoretic display (EPD) provided with an electrophoretic display panel including an electrophoretic layer. The display device 10 may perform monochrome display, or may perform color display using, for example, color filters of a plurality of colors. The display device 10 may employ a light reflecting material for pixel electrodes of pixels PX thereof, or may have a configuration in which light-transmitting pixel electrodes are combined with a reflective film made of, for example, metal, and the reflective film reflects light. The display device 10 may be a flexible display, such as a sheet display.

In the display device 10, a display portion 11 and a display panel driver 20 are provided on a thin-film transistor (TFT) substrate 100. The display portion 11 includes the pixels PX arranged in a two dimensional matrix in a first direction (X-direction in FIG. 1) and a second direction (Y-direction in FIG. 1) orthogonal to the first direction. Hereinafter, the first direction (X-direction in FIG. 1) is also referred to as a row direction, and the second direction (Y-direction in FIG. 1) is also referred to as a column direction. A row in which some of the pixels PX are arranged in the row direction is also referred to as a pixel row, and a column in which some of the pixels PX are arranged in the column direction is also referred to as a pixel column. FIG. 1 illustrates an example in which n×m pixels (n pixels in the row direction and m pixels in the column direction) PX are arranged in a matrix.

The power supply circuit 200 is a power source generator that generates the various power supply voltages to be supplied to components of the display device 10 according to the present embodiment. The power supply circuit 200 is coupled to the display panel driver 20. The various power supply voltages are supplied from the power supply circuit 200 to the display panel driver 20.

The control circuit 300 is an arithmetic processor that controls operations of the display device 10 according to the present embodiment. The control circuit 300 is coupled to the display panel driver 20. The control circuit 300 is constituted by, for example, a control integrated circuit (IC).

A video signal and various control signals are supplied from the control IC to the display panel driver 20.

The display panel driver 20 includes a source driver 21, a gate driver 22, and a processor 23.

In the present embodiment, the source driver 21 is a thin-film transistor (TFT) circuit provided in an area (hereinafter, also called a bezel area) 12 outside the display portion 11 on the TFT substrate 100.

In the present embodiment, the gate driver 22 is a thin-film transistor (TFT) circuit provided in the bezel area 12 on the TFT substrate 100. As illustrated in FIG. 1, in the present embodiment, the gate driver 22 is disposed in the bezel area 12 on one side in the first direction (X-direction in FIG. 1) of the TFT substrate 100.

In the present embodiment, the processor 23 is provided in a display control IC. The display control IC is, for example, a chip mounted on the bezel area 12 on the TFT substrate 100 using a chip-on-glass (COG) technique.

The display panel driver 20 causes the processor 23 to hold and sequentially output the video signal to the display device 10 through the source driver 21. The source driver 21 is electrically coupled to the pixel columns in the display portion 11 through source bus lines (video signal lines) DTL1, . . . , DTLn, and transmits source drive signals (video signals) SIG1, . . . , SIGn to the source bus lines (video signal lines) DTL1, . . . , DTLn, respectively. The source drive signals (video signals) SIG1, . . . , SIGn are supplied to the pixels PX in the respective pixel columns.

Hereinafter, DTLp denotes one of the source bus lines (video signal lines) coupled to each of the pixels PX in a p-th pixel column (where p is an integer of 1 to n), and SIGp denotes one of the source drive signals (video signals) supplied to the source bus line (video signal line) DTLp.

The display panel driver 20 causes the gate driver 22 to select each of the pixel rows in the display portion 11. The gate driver 22 is electrically coupled to the pixel rows in the display portion 11 through first gate bus lines (first scan lines) SCL1(P), . . . , SCLm(P) and second gate bus lines (second scan lines) SCL1(N), . . . , SCLm(N), and transmits first gate drive signals (first scan signals) GATE1(P), . . . , GATEm(P) to the first gate bus lines (first scan lines) SCL1(P), . . . , SCLm(P), respectively, and second gate drive signals (second scan signals) GATE1(N), . . . , GATEm(N) to the second gate bus lines (second scan lines) SCL1(N), . . . , SCLm(N), respectively. The first gate drive signals (first scan signals) GATE1(P), . . . , GATEm(P) and the second gate drive signals (second scan signals) GATE1(N), . . . , GATEm(N) are supplied to the pixels PX in the respective pixel rows.

Hereinafter, SCLq(P) denotes one of the first gate bus lines (first scan lines) coupled to a q-th pixel row (where q is an integer of 1 to m), and SCLq(N) denotes one of the second gate bus lines (second scan lines) coupled thereto; and GATEq (P) denotes one of the first gate drive signals (first scan signals) supplied to the first gate bus line (first scan line) SCLq(P), and GATEq (N) denotes one of the second gate drive signals (second scan signals) supplied to the second gate bus line (second scan line) SCLq(N).

Figure 2:
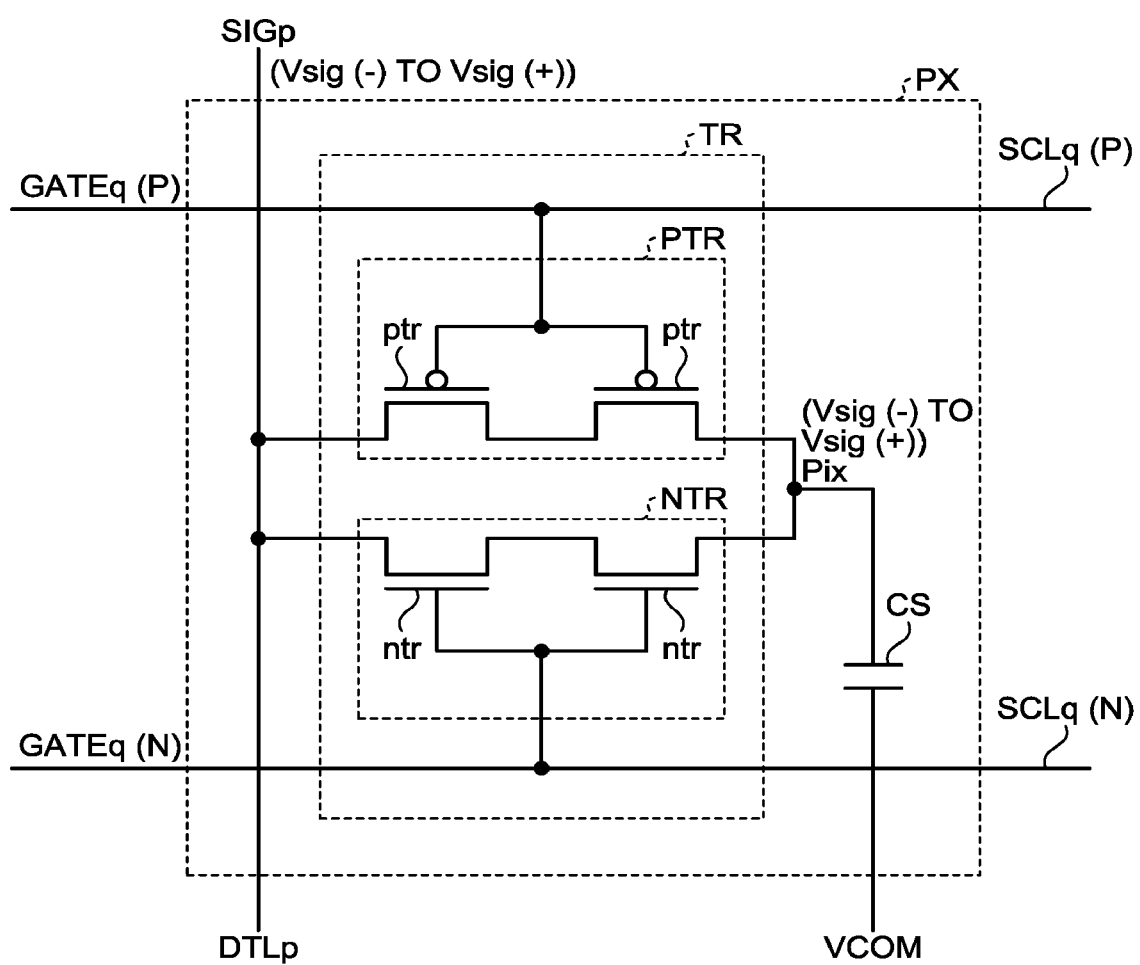
FIG. 2 is a diagram illustrating an exemplary pixel configuration of the display device according to the first embodiment.

FIG. 2 is a diagram illustrating an exemplary pixel configuration of the display device according to the first embodiment. The example illustrated in FIG. 2 illustrates a configuration in one of the pixels PX in the q-th row of the p-th column.

In the present embodiment, a pixel transistor TR included in each of the pixels PX has a complementary metal-oxide semiconductor MOS (CMOS) configuration including a p-channel metal-oxide semiconductor (PMOS) transistor (first pixel transistor) PTR and an n-channel metal-oxide semiconductor (NMOS) transistor (second pixel transistor) NTR.

The first gate bus line (first scan line) SCLq(P) is coupled to the gate of the PMOS transistor (first pixel transistor) PTR. The second gate bus lines (second scan line) SCLq(N) is coupled to the gate of the NMOS transistor (second pixel transistor) NTR.

The source path and the drain path of the PMOS transistor (first pixel transistor) PTR are coupled in parallel respectively to the source path and the drain path of the NMOS transistor (second pixel transistor) NTR. The source of the PMOS transistor (first pixel transistor) PTR and the source of the NMOS transistor (second pixel transistor) NTR are coupled to the source bus line (video signal line) DTLp. The drain of the PMOS transistor (first pixel transistor) PTR is coupled to the drain of the NMOS transistor (second pixel transistor) NTR.

In other words, the PMOS transistor (first pixel transistor) PTR is coupled in parallel to the NMOS transistor (second pixel transistor) NTR to constitute the pixel transistor TR. A pixel electrode Pix is provided at a coupling point between the drain of the PMOS transistor (first pixel transistor) PTR and the drain of the NMOS transistor (second pixel transistor) NTR. A pixel capacitor CS is provided between the pixel electrode Pix and a common electrode supplied with a common potential VCOM.

The sources of the PMOS transistor (first pixel transistor) PTR and the NMOS transistor (second pixel transistor) NTR are supplied with the source drive signal (video signal) SIGp having a voltage upper limit value of Vsig(+) and a voltage lower limit value of Vsig(−) from the source driver 21 through the source bus line (video signal line) DTLp. That is, the source drive signal (video signal) SIGp can have a voltage range from Vsig(−) to Vsig(+).

In the present embodiment, the voltage upper limit value Vsig(+) and the voltage lower limit value Vsig(−) of the source drive signal (video signal) SIGp have the same potential difference with respect to a ground (GND) potential (|Vsig(+)−GND|=|GND−Vsig(−)|). In other words, a middle value between the voltage upper limit value Vsig(+) and the voltage lower limit value Vsig(−) of the source drive signal (video signal) SIGp serves as the GND potential. In the present embodiment, the voltage upper limit value Vsig(+) of the source drive signal (video signal) SIGp is, for example, +15 V, and the voltage lower limit value Vsig(−) of the source drive signal (video signal) SIGp is, for example, −15 V.

In the present embodiment, the GND potential is supplied to the gate of the PMOS transistor (first pixel transistor) PTR through the first gate bus line (first scan line) SCLq(P) to place the PMOS transistor (first pixel transistor) PTR in an on standby state, and a potential higher than the GND potential is supplied to the gate of the NMOS transistor (second pixel transistor) NTR through the second gate bus line (second scan line) SCLq(N) to place the NMOS transistor (second pixel transistor) NTR in the on standby state.

In this state, the source drive signal (video signal) SIGp is supplied to charge the pixel electrode Pix with an electrical charge corresponding to the source drive signal (video signal) SIGp. The pixel electrode Pix can have a voltage value between the voltage upper limit value Vsig(+) and the voltage lower limit value Vsig(−) of the source drive signal (video signal) SIGp. In other words, the pixel electrode Pix can have a voltage range from Vsig(−) to Vsig(+), which is the same as that of the source drive signal (video signal) SIGp.

The configuration illustrated in FIG. 2 illustrates the example in which the PMOS transistor (first pixel transistor) PTR is constituted by coupling two PMOS transistors ptr in series, and the NMOS transistor (second pixel transistor) NTR is constituted by coupling two NMOS transistors ntr in series.

The PMOS transistor (first pixel transistor) PTR may be constituted by only one of the PMOS transistors ptr, and the NMOS transistor (second pixel transistor) NTR may be constituted by only one of the NMOS transistors ntr.

The PMOS transistor (first pixel transistor) PTR may be constituted by coupling three or more of the PMOS transistors ptr in series, and the NMOS transistor (second pixel transistor) NTR may be constituted by coupling the same number of the NMOS transistors ntr as that of the PMOS transistors ptr in series.

Figure 3:
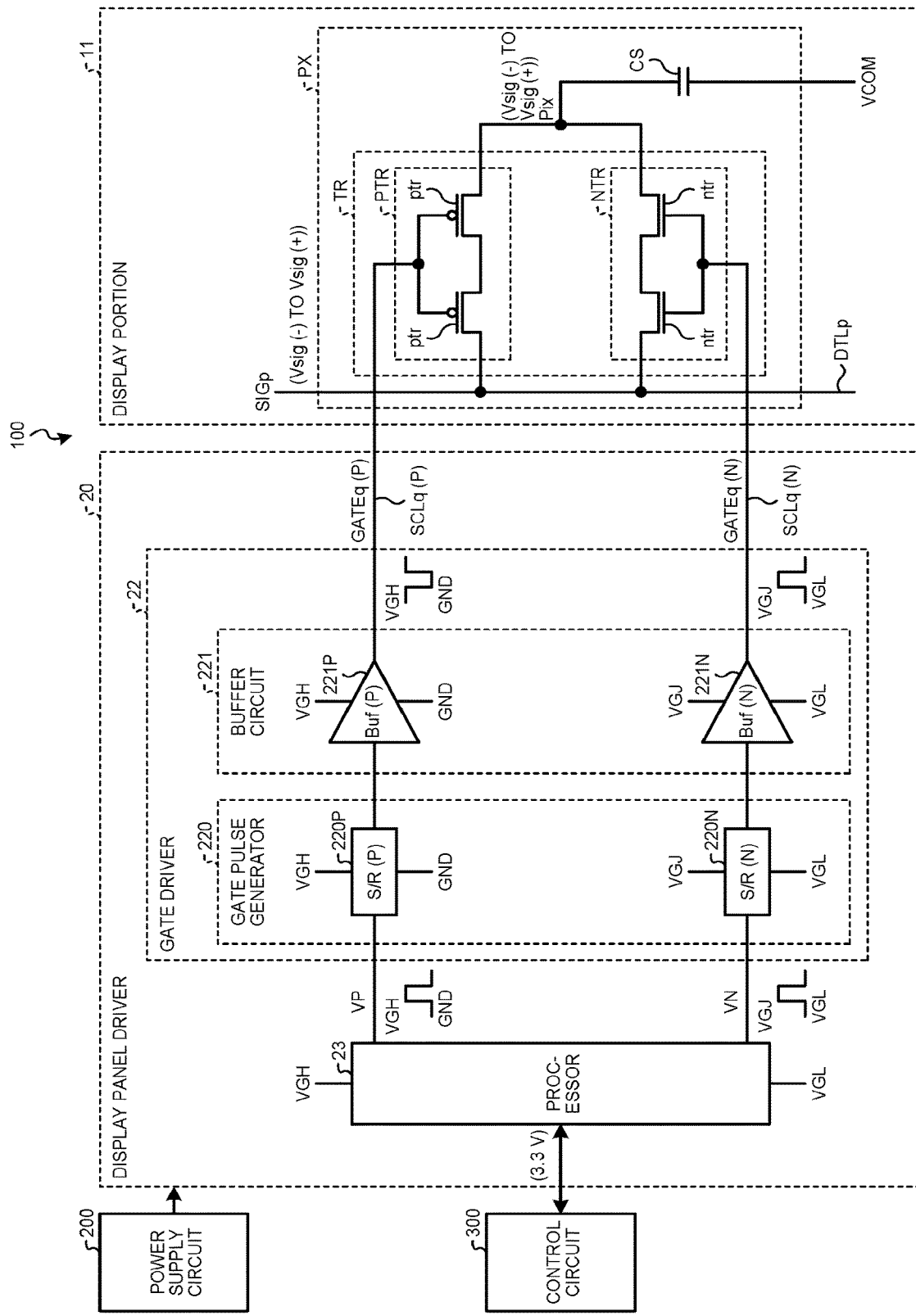
FIG. 3 is a diagram illustrating a configuration example of a gate driver for one pixel in the display device according to the first embodiment.
Figure 4:
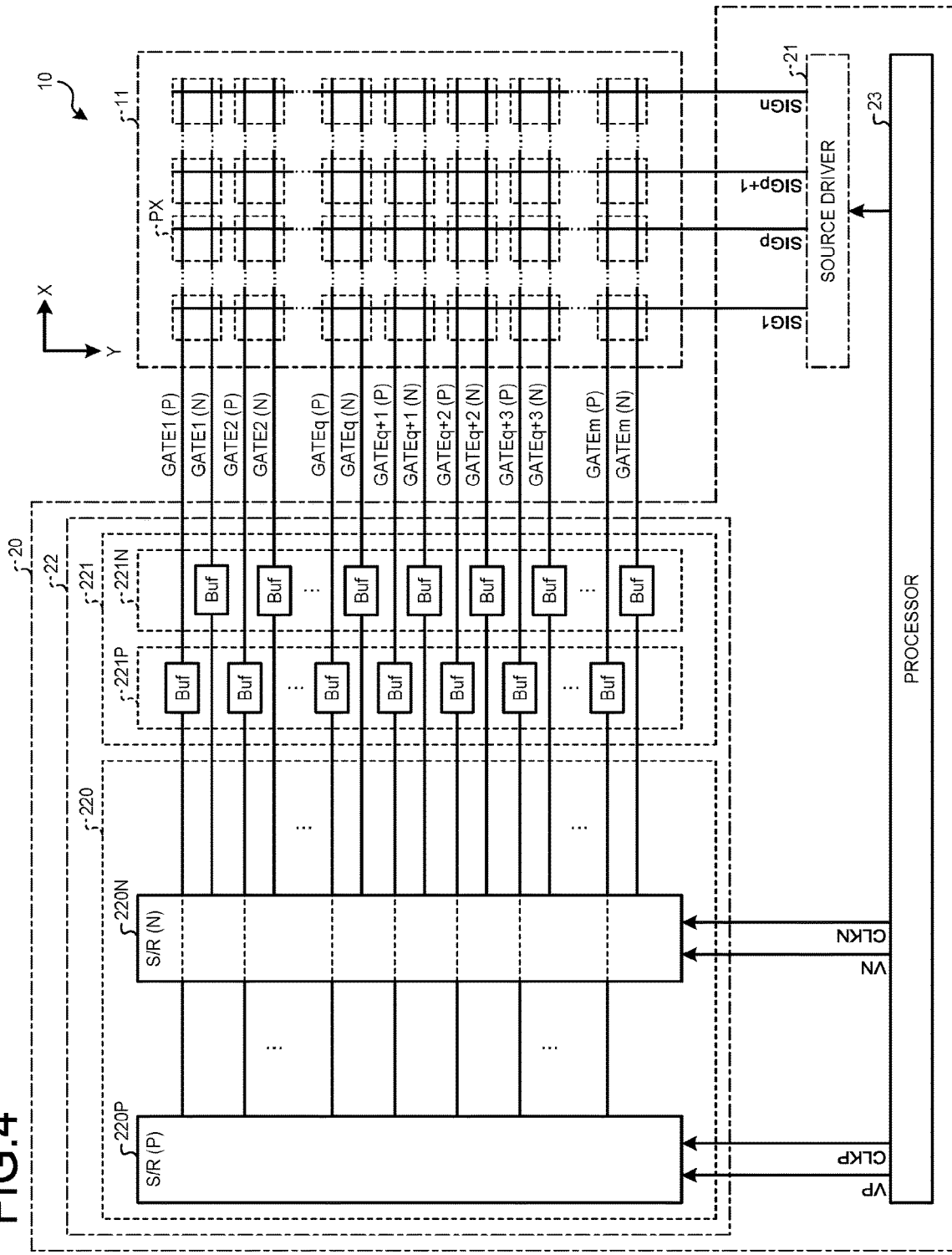
FIG. 4 is a diagram illustrating an exemplary overall configuration of a display portion and a display panel driver of the display device according to the first embodiment.

FIG. 3 is a diagram illustrating a configuration example of the gate driver for one pixel in the display device according to the first embodiment. FIG. 4 is a diagram illustrating a schematic configuration of the display device according to the first embodiment. FIG. 4 is the diagram illustrating an exemplary overall configuration of the display portion and the display panel driver of the display device according to the first embodiment. In the present embodiment, a plus side potential with respect to the GND potential in the display portion 11 is referred to as "positive potential", and a minus side potential with respect to the GND potential in the display portion 11 is referred to as "negative potential".

As illustrated in FIGS. 3 and 4, the gate driver 22 according to the present embodiment includes a gate pulse generator 220 and a buffer circuit unit 221.

The example illustrated in FIG. 3 illustrates a configuration corresponding to the q-th pixel row. In other words, FIG. 3 illustrates the configuration of generating the first gate drive signal (first scan signal) GATEq (P) to be supplied to the first gate bus line (first scan line) SCLq(P) coupled to the q-th pixel row and the second gate drive signal (second scan signal) GATEq (N) to be supplied to the second gate bus line (second scan line) SCLq(N) coupled to the q-th pixel row.

In the present embodiment, the power supply circuit 200 applies a first positive potential VGH higher than the voltage upper limit value Vsig(+) of the source drive signal (video signal) SIGp and a negative potential VGL lower than the voltage lower limit value Vsig(−) of the source drive signal (video signal) SIGp to the processor 23, and thus the processor 23 works. In the present embodiment, the first positive potential VGH is, for example, +17.2 V, and the negative potential VGL is, for example, −17.2 V.

The processor 23 receives a signal switched between, for example, a high potential of 3.3 V and a low potential of the GND potential from the control circuit 300. Based on the signal received from the control circuit 300, the processor 23 generates and outputs a first start pulse VP and a second start pulse VN serving as start pulses in one frame period of the video signal, and also generates and outputs a p-channel (p-ch) clock pulse CLKP and an re-channel (n-ch) clock pulse CLKN repeated in one horizontal period of the video signal.

The first start pulse VP is a pulsed signal that has a low potential of the GND potential and a high potential of the first positive potential VGH, and that has the high potential during a predetermined period in one frame period. The second start pulse VN is a pulsed signal that has a low potential of the negative potential VGL and a high potential of a second positive potential VGJ lower than the first positive potential VGH, and that has the high potential during the predetermined period in one frame period in the same manner as the first start pulse VP. In the present embodiment, the second positive potential VGJ is, for example, +3.3 V.

The p-ch clock pulse CLKP is a pulsed signal that has a low potential of the GND potential and a high potential of the first positive potential VGH, and that has the high potential during a predetermined period in one horizontal period. The n-ch clock pulse CLKN is a pulsed signal that has a low potential of the negative potential VGL and a high potential of the second positive potential VGJ lower than the first positive potential VGH, and has the high potential during the predetermined period in one horizontal period in the same manner as the p-ch clock pulse CLKP. In the present embodiment, the second positive potential VGJ is, for example, +3.3 V.

The gate pulse generator 220 includes a first shift register 220P that generates the first gate drive signal (first scan signal) GATEq (P) to be supplied to the first gate bus line (first scan line) SCLq(P) and a second shift register 220N that generates the second gate drive signal (second scan signal) GATEq (N) to be supplied to the second gate bus line (second scan line) SCLq(N).

The power supply circuit 200 applies the first positive potential VGH and the GND potential to the first shift register 220P, and thus the first shift register 220P works. The first shift register 220P receives the first start pulse VP and the p-ch clock pulse CLKP from the processor 23, and generates the first gate drive signal (first scan signal) GATEq (P) shifted at intervals of one horizontal period. The first gate drive signal (first scan signal) GATEq (P) is a pulsed signal having a high potential of the first positive potential VGH and a low potential of the GND potential.

The power supply circuit 200 applies the second positive potential VGJ and the negative potential VGL to the second shift register 220N, and thus the second shift register 220N works. The second shift register 220N receives the second start pulse VN and the n-ch clock pulse CLKN from the processor 23, and generates the second gate drive signal (second scan signal) GATEq (N) shifted at intervals of one horizontal period. The second gate drive signal (second scan signal) GATEq (N) is a pulsed signal having a high potential of the second positive potential VGJ and a low potential of the negative potential VGL.

The buffer circuit unit 221 includes a first buffer circuit 221P and a second buffer circuit 221N.

The first buffer circuit 221P supplies the first gate drive signal (first scan signal) GATEq (P) generated by the first shift register 220P to the gate of the PMOS transistor (first pixel transistor) PTR through the first gate bus line (first scan line) SCLq(P).

The second buffer circuit 221N supplies the second gate drive signal (second scan signal) GATEq (N) generated by the second shift register 220N to the gate of the NMOS transistor (second pixel transistor) NTR through the second gate bus line (second scan line) SCLq(N).

With the above-described configuration, while the first gate drive signal (first scan signal) GATEq (P) is at the low potential, that is, while the second gate drive signal (second scan signal) GATEq (N) is at the high potential, the PMOS transistor (first pixel transistor) PTR and the NMOS transistor (second pixel transistor) NTR are placed in the on standby state and the source drive signal (video signal) SIGp is supplied to the pixel electrode Pix, which is thereby charged with the electrical charge corresponding to the source drive signal (video signal) SIGp.

Figure 5:
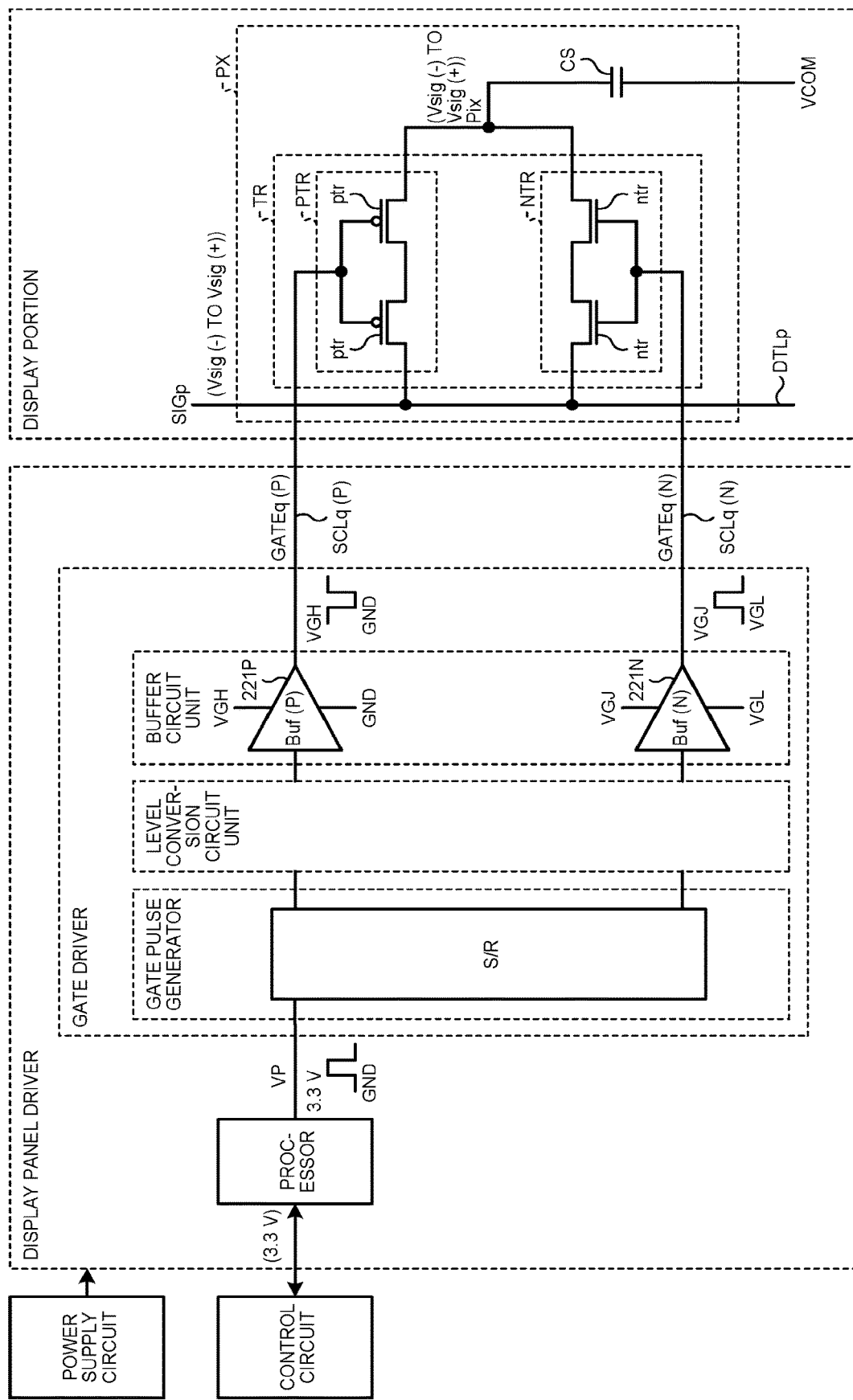
FIG. 5 is a diagram illustrating a configuration example of a gate driver for one pixel in a display device according to a comparative example of the first embodiment.
Figure 6:
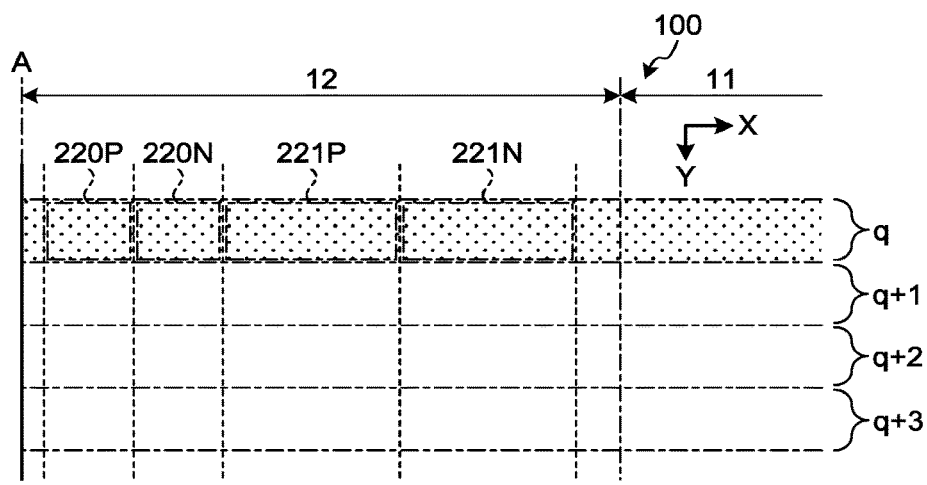
FIG. 6 is a diagram illustrating an arrangement example of the gate driver in a bezel area of the display device according to the first embodiment.
Figure 7:
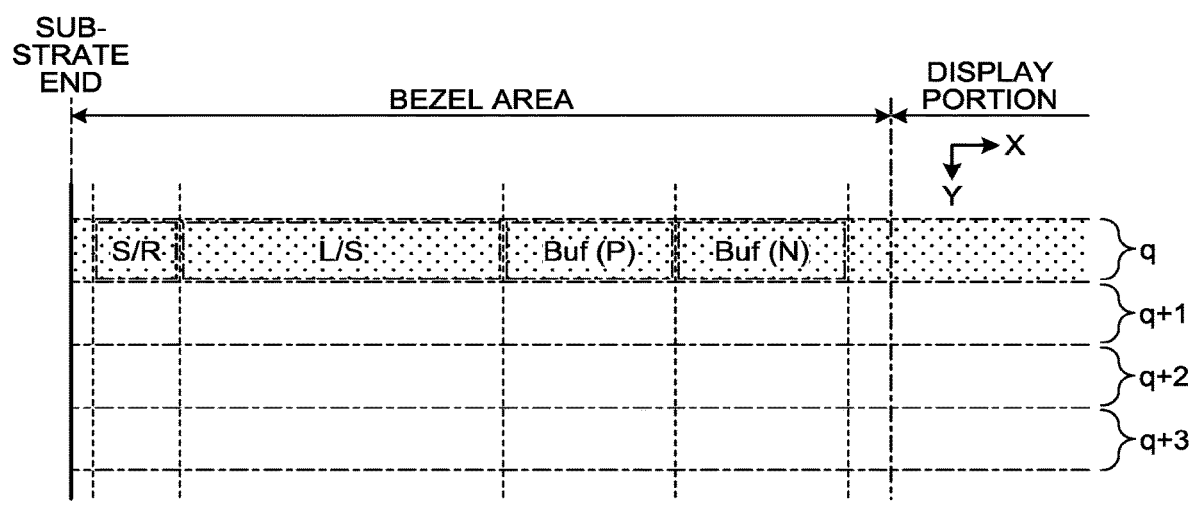
FIG. 7 is a diagram illustrating an arrangement example of the gate driver in the bezel area of the display device according to the comparative example of the first embodiment illustrated in FIG. 5.

FIG. 5 is a diagram illustrating a configuration example of a gate driver for one pixel in a display device according to a comparative example of the first embodiment. FIG. 6 is a diagram illustrating an arrangement example of the gate driver in the bezel area of the display device according to the first embodiment. FIG. 7 is a diagram illustrating an arrangement example of the gate driver in the bezel area of the display device according to the comparative example of the first embodiment illustrated in FIG. 5. The examples illustrated in FIGS. 6 and 7 represent the arrangement examples of the gate driver 22 in the bezel area 12 extending from a substrate end A on one side in the first direction (X-direction) of the TFT substrate 100 to the display portion 11.

The comparative example illustrated in FIG. 5 illustrates an example in which the gate driver receives the start pulse VP having the high potential of 3.3 V and the low potential of the GND potential from the processor. In this case, to generate the first gate drive signal (first scan signal) GATEq (P) switched between the high potential of the first positive potential and the low potential of the GND potential, a level conversion circuit unit of one or a plurality of stages needs to be provided at the previous stage of the buffer circuit unit. Also, to generate the second gate drive signal (second scan signal) GATEq (N) switched between the high potential of the second positive potential VGJ and the low potential of the negative potential VGL, the level conversion circuit unit of one or a plurality of stages needs to be provided at the previous stage of the buffer circuit unit. This configuration increases the number of the supplied power supply voltages having different voltage values. As a result, cost for the power supply circuit increases, and the display device may increase in price. In addition, an increase in size of the level conversion circuit causes hindrance to narrowing of the bezel area 12 in the first direction (X-direction in FIG. 7) of the TFT substrate 100 (refer to FIG. 7).

The circuit configuration of the display device 10 according to the present embodiment can be limited to the necessary minimum circuit configuration in either case of not requiring the level conversion circuit unit or providing also the level conversion circuit unit. Accordingly, the number of the supplied power supply voltages having different voltage values can be smaller and the cost for the power supply circuit 200 can be lower than in the comparative example illustrated in FIG. 5. In addition, the bezel area 12 can be narrowed in the first direction (X-direction in FIG. 6) of the TFT substrate 100 (refer to FIG. 6).

Figure 8:
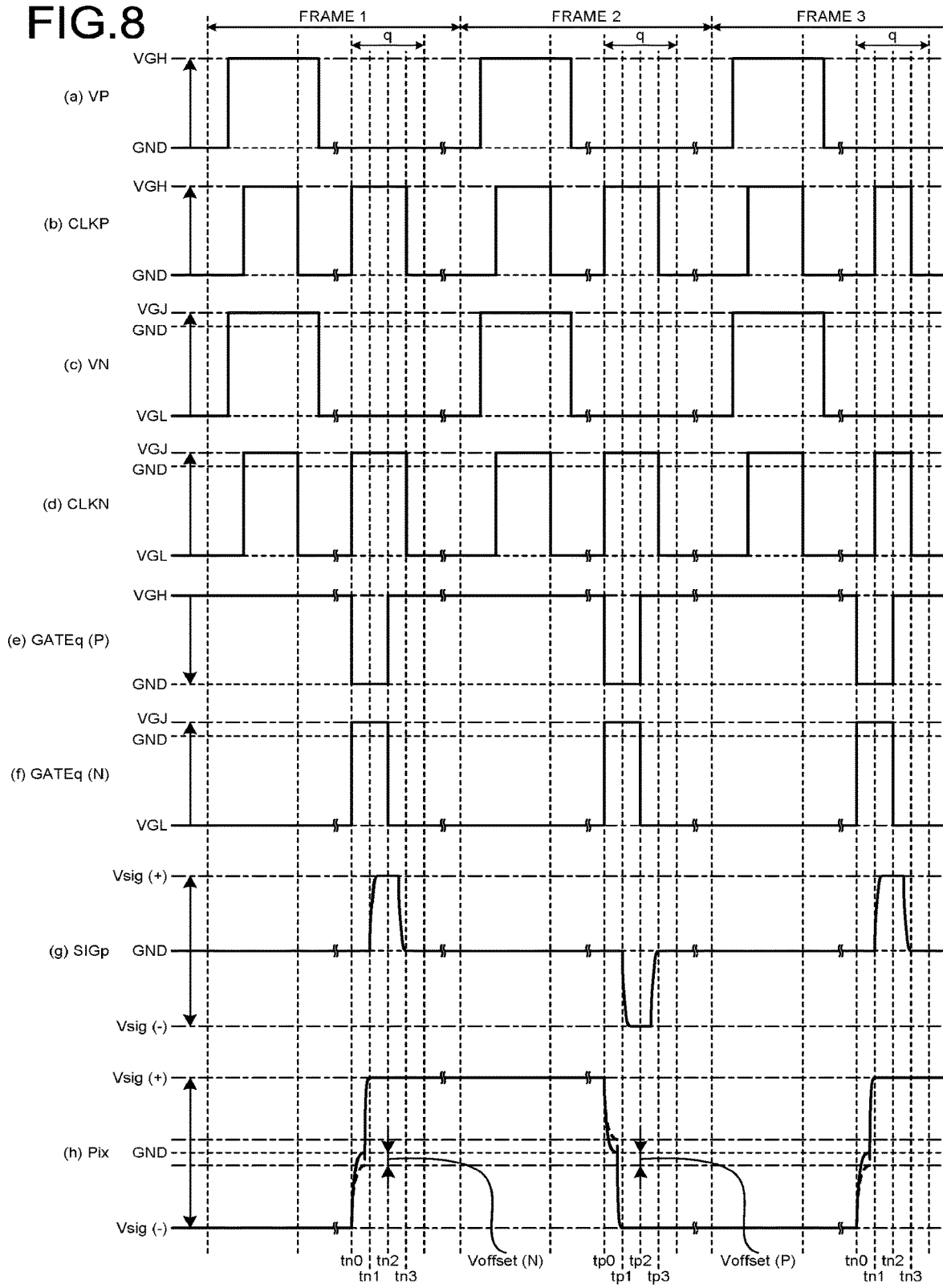
FIG. 8 is a timing diagram in the configuration of the display device according to the first embodiment illustrated in FIG. 4.

The following describes an operation example in the display device 10 according to the present embodiment with reference to FIG. 8. FIG. 8 is a timing diagram for the configuration of the display device according to the first embodiment illustrated in FIG. 4.

Diagram (a) illustrated in FIG. 8 represents the first start pulse VP. Diagram (b) illustrated in FIG. 8 represents the p-ch clock pulse CLKP. Diagram (c) illustrated in FIG. 8 represents the second start pulse VN. Diagram (d) illustrated in FIG. 8 represents the n-ch clock pulse CLKN. Diagram (e) illustrated in FIG. 8 represents the first gate drive signal (first scan signal) GATEq (P). Diagram (f) illustrated in FIG. 8 represents the second gate drive signal (second scan signal) GATEq (N). Diagram (g) illustrated in FIG. 8 represents the video signal SIGp. Diagram (h) illustrated in FIG. 8 represents the potential of the pixel electrode Pix of the pixel PX in the q-th row of the p-th column.

FIG. 8 illustrates an example in which the pixel PX in the q-th row of the p-th column is supplied with the source drive signal (video signal) SIGp having the voltage upper limit value Vsig(+) during frame 1, and the pixel PX in the q-th row of the p-th column is supplied with the source drive signal (video signal) SIGp having the voltage lower limit value Vsig(−) during frame 2.

At time tn0, the first gate drive signal (first scan signal) GATEq (P) is switched to the low potential (GND potential), and the second gate drive signal (second scan signal) GATEq (N) is switched to the high potential (second positive potential VGJ). Then, the PMOS transistor (first pixel transistor) PTR and the NMOS transistor (second pixel transistor) NTR are placed in the on standby state. At this time, the electrical charge accumulated in the pixel electrode Pix of the pixel PX in the q-th row of the p-th column is discharged, and the potential of the pixel electrode Pix is switched to the GND potential.

At time tn1 of frame 1, the source drive signal (video signal) SIGp having the voltage upper limit value Vsig(+) is supplied to the pixel PX. Then, the pixel electrode Pix of the pixel PX in the q-th row of the p-th column is supplied with the voltage upper limit value Vsig(+) of the source drive signal (video signal) SIGp, and the pixel capacitor CS is charged with an electrical charge corresponding to the voltage upper limit value Vsig(+) of the source drive signal (video signal) SIGp.

Then, at time tn2, the first gate drive signal (first scan signal) GATEq (P) is switched to the high potential (first positive potential VGH), and the second gate drive signal (second scan signal) GATEq (N) is switched to the low potential (negative potential VGL). Then, the PMOS transistor (first pixel transistor) PTR and the NMOS transistor (second pixel transistor) NTR are placed in an off state. As a result, the pixel capacitor CS keeps the potential of the pixel electrode Pix at the voltage upper limit value Vsig(+) of the source drive signal (video signal) SIGp even after the source drive signal (video signal) SIGp is switched to the GND potential at time tn3.

At time tp0 of frame 2, the first gate drive signal (first scan signal) GATEq (P) is switched to the low potential (GND potential), and the second gate drive signal (second scan signal) GATEq (N) is switched to the high potential (second positive potential VGJ). Then, the PMOS transistor (first pixel transistor) PTR and the NMOS transistor (second pixel transistor) NTR are placed in the on standby state. At this time, the electrical charge accumulated in the pixel electrode Pix of the pixel PX in the q-th row of the p-th column is discharged, and the potential of the pixel electrode Pix is switched to the GND potential.

At time tp1, the source drive signal (video signal) SIGp having the voltage lower limit value Vsig(−) is supplied to the pixel PX. Then, the pixel electrode Pix of the pixel PX in the q-th row of the p-th column is supplied with the voltage lower limit value Vsig(−) of the source drive signal (video signal) SIGp, and the pixel capacitor CS is charged with an electrical charge corresponding to the voltage lower limit value Vsig(−) of the source drive signal (video signal) SIGp.

Then, at time tp2, the first gate drive signal (first scan signal) GATEq (P) is switched to the high potential (first positive potential VGH) and the second gate drive signal (second scan signal) GATEq (N) is switched to the low potential (negative potential VGL). Then, the PMOS transistor (first pixel transistor) PTR and the NMOS transistor (second pixel transistor) NTR are placed in the off state. As a result, the pixel capacitor CS keeps the potential of the pixel electrode Pix at the voltage lower limit value Vsig(−) of the source drive signal (video signal) SIGp even after the source drive signal (video signal) SIGp is switched to the GND potential at time tp3.

In this manner, the display device 10 can drive the pixel transistor TR using the first gate drive signal (first scan signal) GATEq (P) and the second gate drive signal (second scan signal) GATEq (N) that have voltage amplitude values smaller than the voltage range (|Vsig(+)−Vsig (−)|) of the source drive signal (video signal) SIGp.

Accordingly, the PMOS transistor (first pixel transistor) PTR and the NMOS transistor (second pixel transistor) NTR constituting the pixel transistor TR can be less likely to deteriorate in characteristics, and can be restrained from deteriorating in reliability.

In the present embodiment, the source drive signal (video signal) SIGp is at the GND potential at the times (time tn0 and time tp0) when the PMOS transistor (first pixel transistor) PTR and the NMOS transistor (second pixel transistor) NTR are switched on.

For example, in the state where the pixel electrode Pix is kept at the voltage lower limit value Vsig(−) of the source drive signal (video signal) SIGp, if the source drive signal (video signal) SIGp is switched to the upper limit voltage Vsig(+) and the PMOS transistor (first pixel transistor) PTR and the NMOS transistor (second pixel transistor) NTR are switched on, the electrical charge accumulated in the pixel capacitor CS is instantaneously transferred (a large current flows) in the state where a voltage of |Vsig(+)−Vsig(−)|(2× Vsig when assuming that |Vsig(+)|=|Vsig(−)|=Vsig) is applied between the source and the drain of the pixel transistor TR. This phenomenon can cause the deterioration of the PMOS transistor (first pixel transistor) PTR and the NMOS transistor (second pixel transistor) NTR constituting the pixel transistor TR.

In the present embodiment, as described above, the potential of the pixel electrode Pix is switched to the GND potential by placing the PMOS transistor (first pixel transistor) PTR and the NMOS transistor (second pixel transistor) NTR in the on standby state to discharge the electrical charge accumulated in the pixel capacitor CS (at time tn0 and time tp0), and then the source drive signal (video signal) SIGp is supplied (at time tn1 and time tp1).

This operation can prevent the electrical charge accumulated in the pixel capacitor CS from being transferred (prevent the current from flowing) at the times (time tn1 and time tp1) when the PMOS transistor (first pixel transistor) PTR and the NMOS transistor (second pixel transistor) NTR are switched on, and thus can restrain the deterioration of the PMOS transistor (first pixel transistor) PTR and the NMOS transistor (second pixel transistor) NTR constituting the pixel transistor TR.

In the present embodiment, the high potential of the second gate drive signal (second scan signal) GATEq (N) is set to the second positive voltage VGJ lower than the first positive voltage VGH.

For example, if both the low potential of the first gate drive signal (first scan signal) GATEq (P) and the high potential of the second gate drive signal (second scan signal) GATEq (N) are set to the GND potential, the GND potential cannot be written to the pixel PX due to an offset voltage between the source and the gate of each of the PMOS transistor (first pixel transistor) PTR and the NMOS transistor (second pixel transistor) NTR constituting the pixel transistor TR, and as a result, a discharge residual voltage Voffset (Voffset(P) and Voffset(N)) appears at the pixel electrode Pix (dashed line in FIG. 8).

In the present embodiment, as described above, the high potential of the second gate drive signal (second scan signal) GATEq (N) is set to the second positive potential VGJ lower than the first positive potential VGH.

The GND potential can be written to the pixel PX through the NMOS transistor (second pixel transistor) NTR by setting the second positive potential VGJ to a value higher by the offset voltage between the source and the gate of the NMOS transistor (second pixel transistor) NTR than the GND potential that is the middle value of the potential difference between the voltage upper limit value and the voltage lower limit value of the source drive signal (video signal) SIGp.

Instead of the above-described configuration, a configuration may be employed in which the low potential of the first gate drive signal (first scan signal) GATEq (P) is set to a value lower by the offset voltage between the source and the gate of the PMOS transistor (first pixel transistor) PTR than the GND potential that is the middle value of the potential difference between the voltage upper limit value Vsig(+) and the voltage lower limit value Vsig(−) of the source drive signal (video signal) SIGp. This configuration allows the GND potential to be written to the pixel PX through the PMOS transistor (first pixel transistor) PTR.

The following describes the structure of the TFT substrate 100 in the display device 10 according to the present embodiment.

Figure 9:
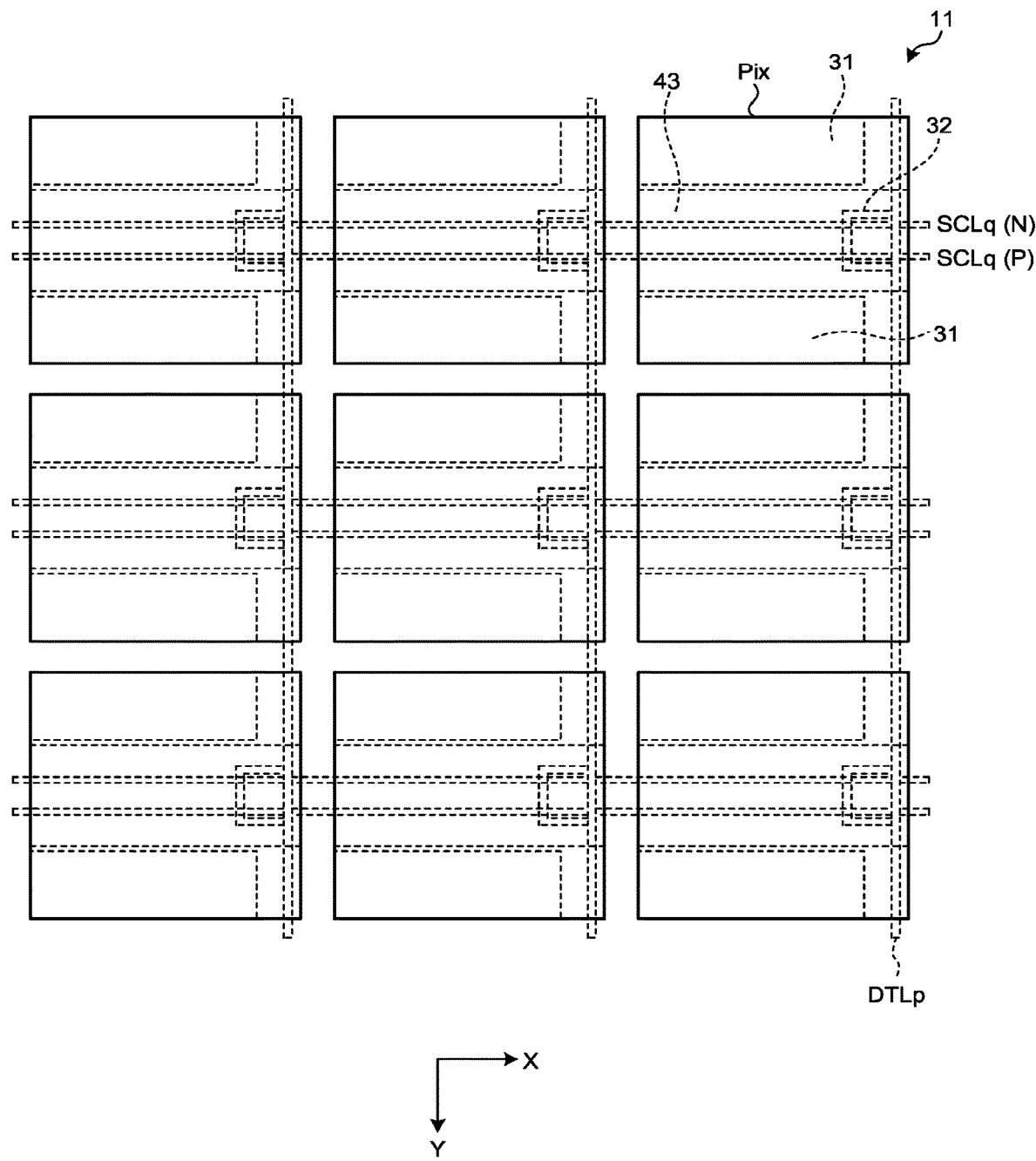
FIG. 9 is a diagram illustrating an arrangement example of the pixels in the display portion of the display device according to the first embodiment.
Figure 10:
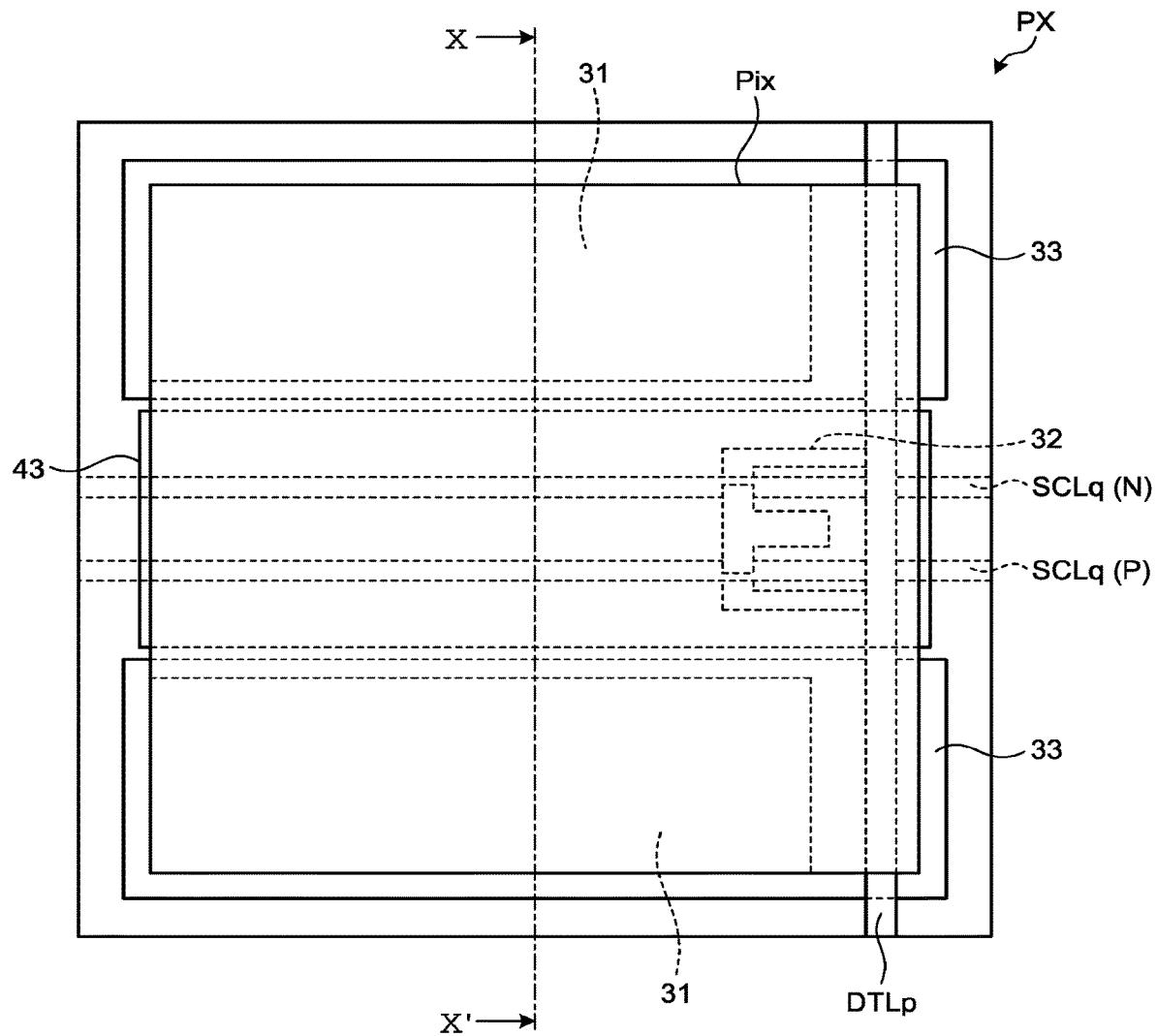
FIG. 10 is a diagram illustrating a configuration example of one of the pixels of the display device according to the first embodiment.
Figure 11:
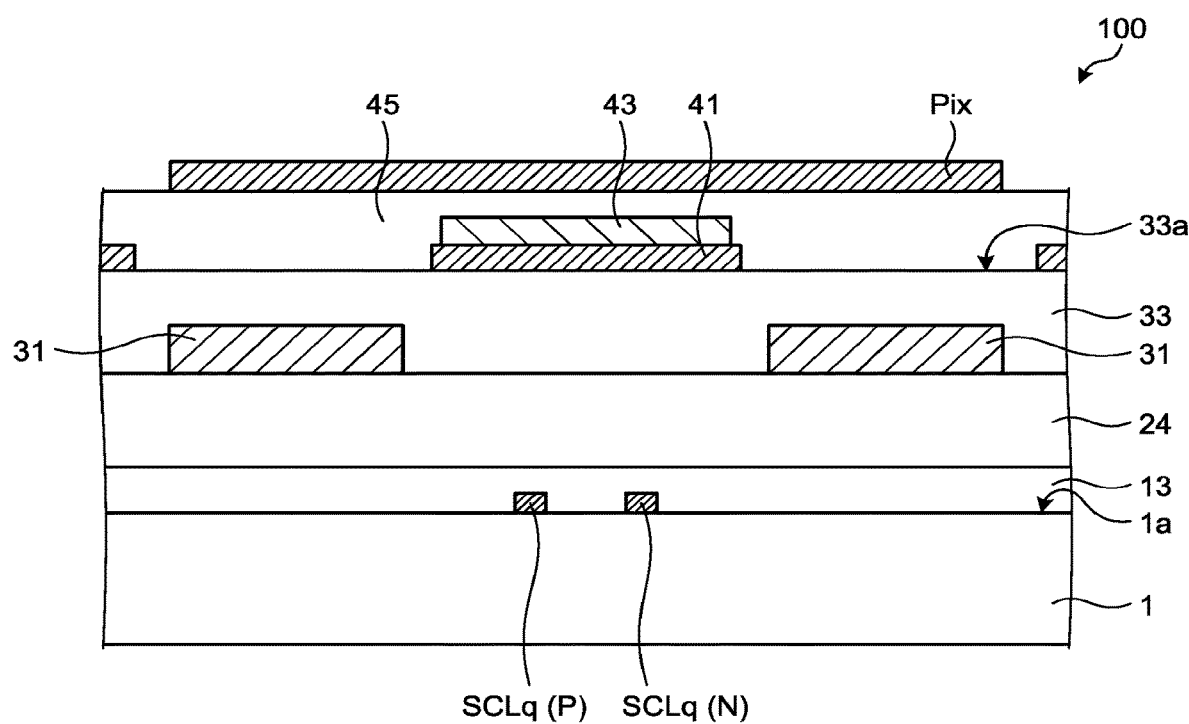
FIG. 11 is a sectional view obtained by cutting the plan view illustrated in FIG. 10 along line X-X'.

FIG. 9 is a diagram illustrating an arrangement example of the pixels in the display portion of the display device according to the first embodiment. FIG. 10 is a diagram illustrating a configuration example of one of the pixels of the display device according to the first embodiment. FIG. 11 is a sectional view obtained by cutting the plan view illustrated in FIG. 10 along line X-X'.

As illustrated in FIG. 11, the TFT substrate 100 includes a base material 1, and includes the first gate bus line (first scan line) SCLq(P), the second gate bus line (second scan line) SCLq(N), and the gate of the thin-film transistor (TFT) constituting the gate driver 22 that are provided on one surface 1a of the base material 1, and a gate insulating film 13 provided on the surface 1a of the base material 1. The gate insulating film 13 covers the first gate bus line (first scan line) SCLq(P), the second gate bus line (second scan line) SCLq(N), and the gate of the thin-film transistor (TFT).

As illustrated in FIG. 11, the TFT substrate 100 includes a semiconductor film 32 provided on the gate insulating film 13 and an interlayer insulating film 24 provided on the gate insulating film 13. The interlayer insulating film 24 covers the semiconductor film 32. The semiconductor film 32 is provided corresponding to the pixel transistor TR. A portion of the first gate bus line (first scan line) SCLq(P) intersecting the semiconductor film 32 constitutes the gate of the PMOS transistor (first pixel transistor) PTR, and a portion of the second gate bus line (second scan line) SCLq(N) intersecting the semiconductor film 32 constitutes the gate of the NMOS transistor (second pixel transistor) NTR.

As illustrated in FIGS. 9, 10, and 11, the TFT substrate 100 also includes the source and the drain of the thin-film transistor (TFT) and second reflective films 31. The second reflective films 31 are provided on the interlayer insulating film 24.

The second reflective films 31 are made of, for example, conductive films having the same composition as that of the source and the drain.

The TFT substrate 100 also includes the source bus line (video signal line) DTLp and the source and the drain of the pixel transistor TR. In the same manner as the second reflective films 31, the source bus line (video signal line) DTLp and the source and the drain of the pixel transistor TR are provided on the interlayer insulating film 24, and are made of, for example, conductive films having the same composition. The examples illustrated in FIGS. 9 and 10 do not illustrate the source and the drain of the pixel transistor TR.

As illustrated in FIG. 11, the TFT substrate 100 also includes an insulating planarizing film 33 provided on the interlayer insulating film 24. The planarizing film 33 covers the second reflective films 31. The planarizing film 33 covers the source bus line (video signal line) DTLp, and also covers the source and the drain of the pixel transistor TR, which are not illustrated in FIG. 11. An upper surface 33a of the planarizing film 33 is flat and parallel to the surface 1a of the base material 1.

As illustrated in FIG. 11, the TFT substrate 100 also includes a common electrode 41 provided on the planarizing film 33, a first reflective film 43 provided on the common electrode 41, and an insulating film 45 provided on the planarizing film 33.

As illustrated in FIG. 10, the first reflective film 43 and the second reflective film 31 are arranged side by side in the plan view in each of the pixels PX.

As illustrated in FIG. 11, the insulating film 45 covers the common electrode 41 and the first reflective film 43. The insulating film 45 serves as a dielectric material of the pixel capacitor CS in the pixel PX (refer to FIG. 2). The pixel capacitor CS only needs to be provided by both or either one of the pixel electrode Pix and the second reflective film 31 of the common electrode 41, and may have a structure that does not include either one of the common electrode 41 and the first reflective film 43.

As illustrated in FIGS. 10 and 11, the TFT substrate 100 includes the pixel electrode Pix provided on the insulating film 45. The pixel electrode Pix covers the common electrode 41 with the insulating film 45 interposed therebetween. The pixel electrode Pix is coupled to the drain of the pixel transistor TR, which is not illustrated in FIGS. 10 and 11.

The shape in the plan view of the pixel electrode Pix is, for example, a rectangle. As illustrated in FIG. 9, in the display portion 11, the pixel electrodes Pix are arranged in the X-direction and the Y-direction intersecting the X-direction, and are arranged in a two-dimensional matrix. In the present embodiment, an area overlapping each of the pixel electrodes Pix in the plan view serves as one of the pixels PX.

The following describes materials constituting portions of the TFT substrate 100, by way of examples. The base material 1 is made of glass or a flexible resin substrate. The first gate bus line (first scan line) SCLq(P), the second gate bus line (second scan line) SCLq(N), and the gate of the thin-film transistor (TFT) are made of a material containing molybdenum. The gate insulating film 13 is constituted by a silicon oxide film and a silicon nitride film. The gate insulating film 13 is constituted by, for example, a laminated structure film obtained by stacking a silicon oxide film and a silicon nitride film in this order from the base material 1 side.

The semiconductor film 32 is an organic insulating film made of polysilicon. The interlayer insulating film 24 is constituted by a silicon oxide film and a silicon nitride film. The interlayer insulating film 24 is constituted by, for example, a laminated structure film obtained by stacking a silicon oxide film, a silicon nitride film, and another silicon oxide film in this order from the base material 1 side.

The second reflective film 31 is made of titanium and aluminum. The second reflective film 31 is constituted by, for example, a multilayered structure film obtained by stacking titanium, aluminum, and titanium in this order from the base material 1 side.

The planarizing film 33 is made of an acrylic resin. The common electrode 41 is made of indium tin oxide (ITO) to serve as a light-transmitting conductive film. The first reflective film 43 is made of molybdenum and aluminum. The first reflective film 43 is constituted by, for example, a multilayered structure film obtained by stacking molybdenum, aluminum, and molybdenum in this order from the base material 1 side.

The insulating film 45 is constituted by a silicon nitride film. The pixel electrode Pix is made of ITO.

The above-mentioned materials are mere examples. In the present embodiment, the portions of the TFT substrate 100 may be made of materials other than those mentioned above. For example, the first gate bus line (first scan line) SCLq(P), the second gate bus line (second scan line) SCLq(N), and the gate of the thin-film transistor (TFT) may each be constituted by a film of aluminum, copper, silver, molybdenum, or an alloy thereof. For example, the second reflective films 31 may be made of a titanium-aluminum alloy, which is an alloy of titanium and aluminum.

As described above, in the present embodiment, in the plan view of each of the pixels PX, the second reflective films 31 are provided in an area without the common electrode 41, and the first reflective film 43 is provided on the common electrode 41. Specifically, as illustrated in FIG. 10, in the plan view of each of the pixels PX, the first reflective film 43 and the second reflective films 31 are arranged in the plan view. Of these films, the first reflective film 43 has a function to shield a channel area of the pixel transistor TR from light.

Under environments, such as outdoors, where the display device 10 is exposed to intense light, when the light incident on the display surface passes through the electrophoretic layer and enters the channel area of the pixel transistor TR, a photo leakage current flows in the pixel transistor TR due to a photoconductivity effect. This phenomenon raises a concern that the operation of the pixel transistor TR may be destabilized, and defective display or malfunction may occur. In the present embodiment, the first reflective film 43 shields the channel area of the pixel transistor TR from the light to restrain the defective display and the malfunction caused by the photo leakage current.

Figure 12:
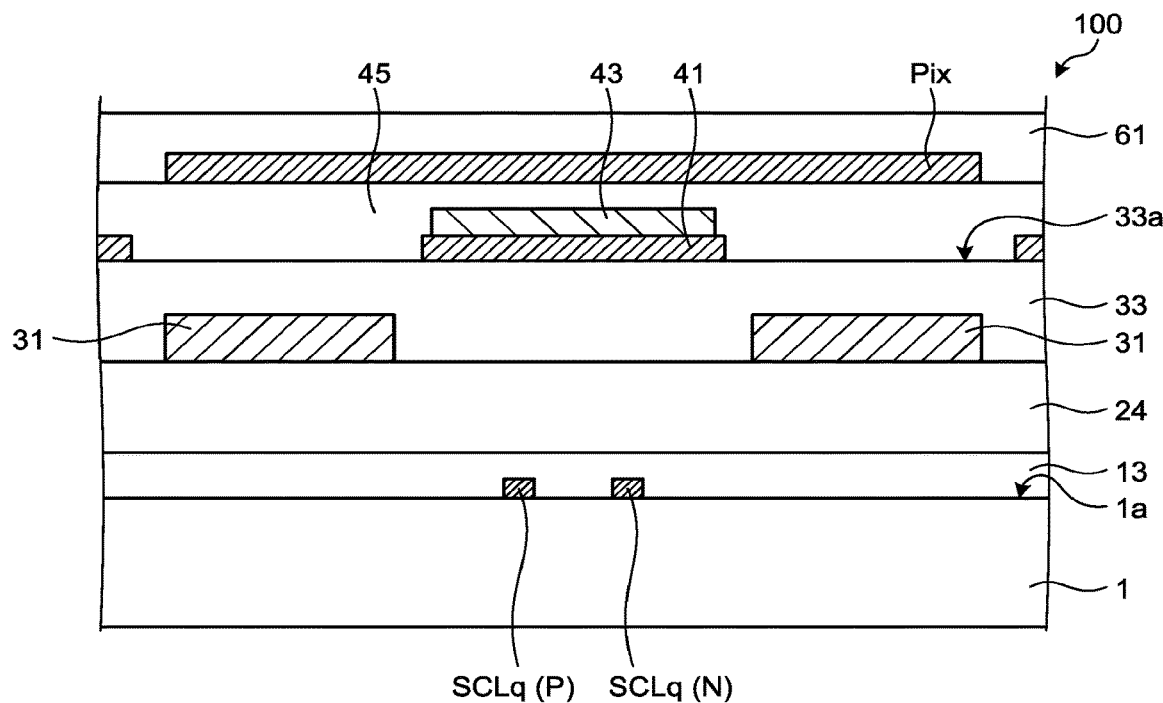
FIG. 12 is a view illustrating a modification of the sectional view illustrated in FIG. 11.

FIG. 12 is a view illustrating a modification of the sectional view illustrated in FIG. 11. As illustrated in FIG. 12, the TFT substrate 100 includes a protective film 61 provided on the pixel electrode Pix. The protective film 61 is, for example, a resist. With such a configuration, the pixel electrode Pix is covered and protected by the protective film 61. As a result, if, for example, a situation occurs where an external object comes into contact with the TFT substrate 100 while the TFT substrate 100 is carried, the external object can be prevented from coming into direct contact with the pixel electrode Pix. Also, if a plurality of TFT substrates 100 are stacked, the pixel electrode Pix of one of the TFT substrates 100 can be prevented from coming into direct contact with another of the TFT substrates 100. Accordingly, the pixel electrode Pix can be prevented from being damaged.

Figure 13:
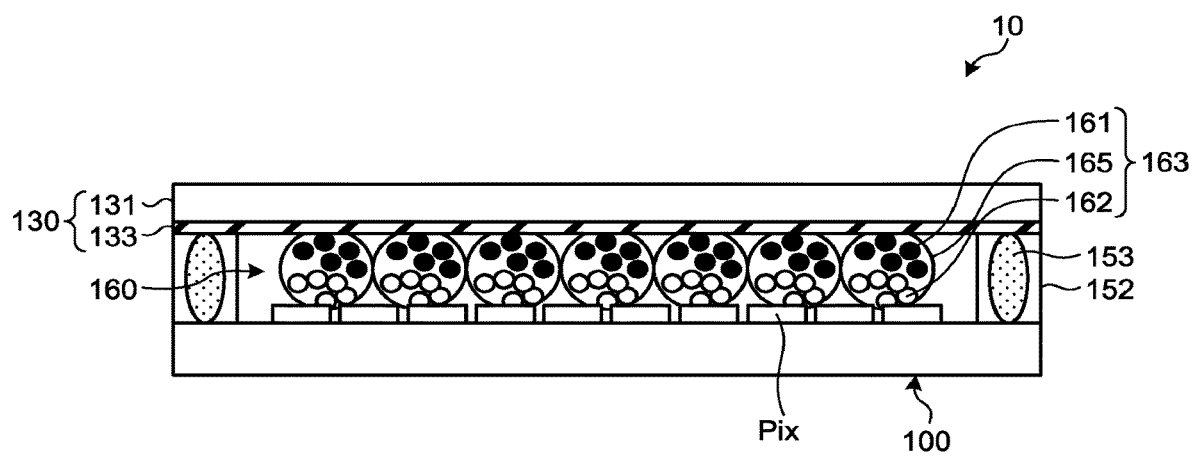
FIG. 13 is a sectional view illustrating a structure example of the display device according to the first embodiment.

The following describes the structure of the display device 10 according to the first embodiment. FIG. 13 is a sectional view illustrating a configuration example of the display device 10 according to the first embodiment. As illustrated in FIG. 13, the display device 10 according to the first embodiment includes the above-described TFT substrate 100, a counter substrate 130 disposed so as to be opposed to the TFT substrate 100, an electrophoretic layer 160 disposed between the TFT substrate 100 and the counter substrate 130, and a seal portion 152.

The counter substrate 130 includes a base material 131 and a counter electrode 133. The base material 131 is a light-transmitting glass substrate, a light-transmitting resin substrate, or a light-transmitting resin film. The counter electrode 133 is provided on a surface of the base material 131 opposed to the TFT substrate 100. The counter electrode 133 is made of ITO to serve as a light-transmitting conductive film. The counter electrode 133 is opposed to the pixel electrode Pix with the electrophoretic layer 160 interposed therebetween.

The seal portion 152 is provided between the TFT substrate 100 and the counter substrate 130. The electrophoretic layer 160 is sealed in an internal space surrounded by the TFT substrate 100, the counter substrate 130, and the seal portion 152. The seal portion 152 is provided with a coupling member 153. The counter electrode 133 is coupled to the common electrode 41 or the first reflective film 43 of the TFT substrate 100 through the coupling member 153. With this configuration, the common potential VCOM is supplied to the counter electrode 133.

The electrophoretic layer 160 includes a plurality of microcapsules 163. A plurality of black fine particles 161, a plurality of white fine particles 162, and a dispersion liquid 165 are encapsulated in each of the microcapsules 163. The black fine particles 161 and the white fine particles 162 are dispersed in the dispersion liquid 165. The dispersion liquid 165 is a light-transmitting liquid, such as silicone oil. The black fine particles 161 are electrophoretic particles, and are made using, for example, negatively charged graphite. The white fine particles 162 are electrophoretic particles, and are made using, for example, a positively charged titanium oxide ($TiO_2$).

The dispersion states of the black fine particles 161 and the white fine particles 162 are changed by an electric field generated between the pixel electrode Pix and the counter electrode 133. The transmission state of light transmitted through the electrophoretic layer 160 changes with the dispersion states of the black fine particles 161 and the white fine particles 162. Thus, an image is displayed on a display surface. For example, when the common potential VCOM (GND potential, for example) is supplied to the counter electrode 133 and a negative potential is supplied to the pixel electrode Pix, the negatively charged black fine particles 161 move toward the counter substrate 130, and the positively charged white fine particles 162 move toward the TFT substrate 100. As a result, when the TFT substrate 100 is viewed from the counter substrate 130 side, an area (pixel) overlapping the pixel electrode Pix in the plan view is displayed in black.

Modification

Figure 14:
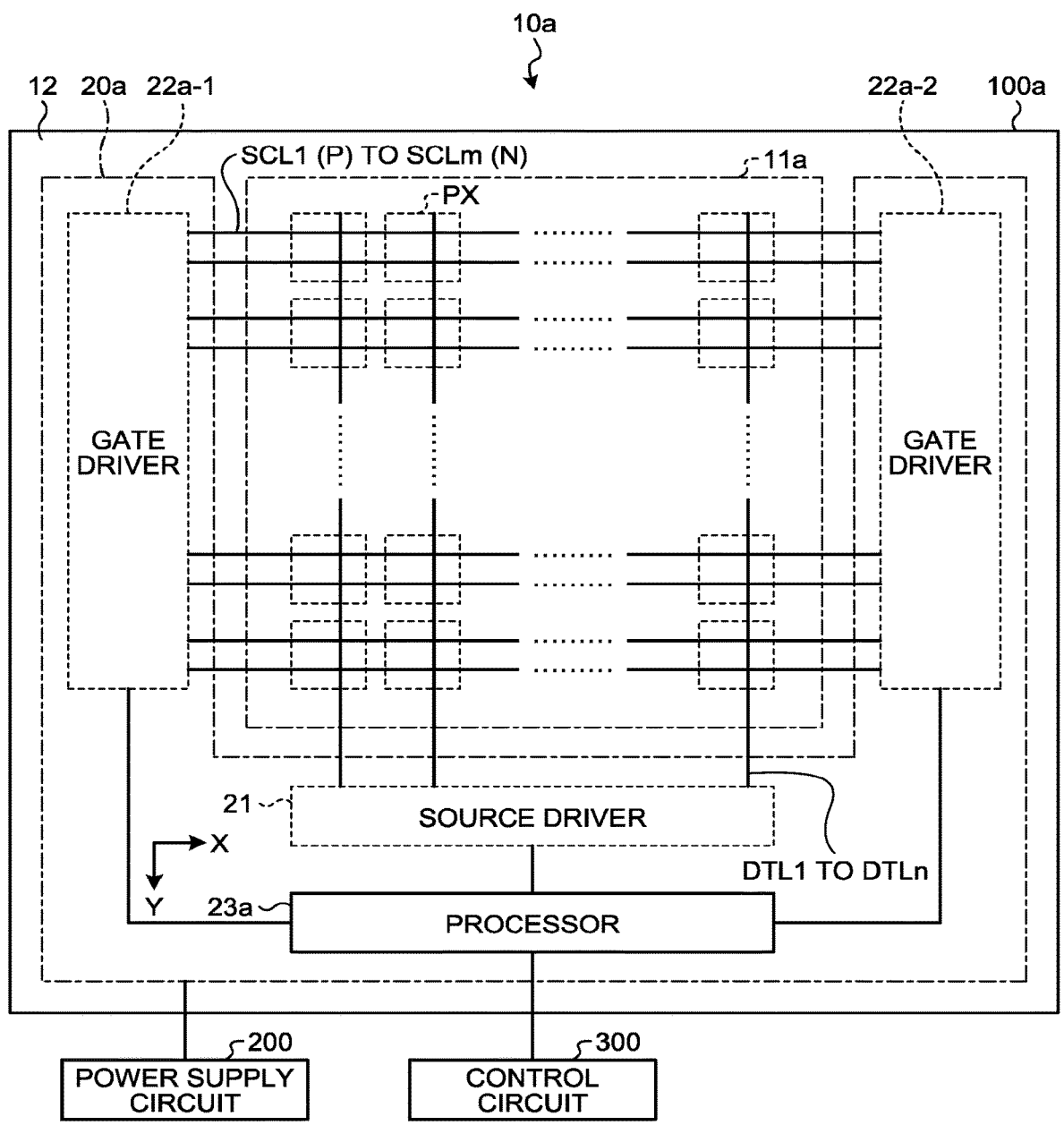
FIG. 14 is a diagram illustrating an exemplary schematic configuration of a display device according to a modification of the first embodiment.
Figure 15:
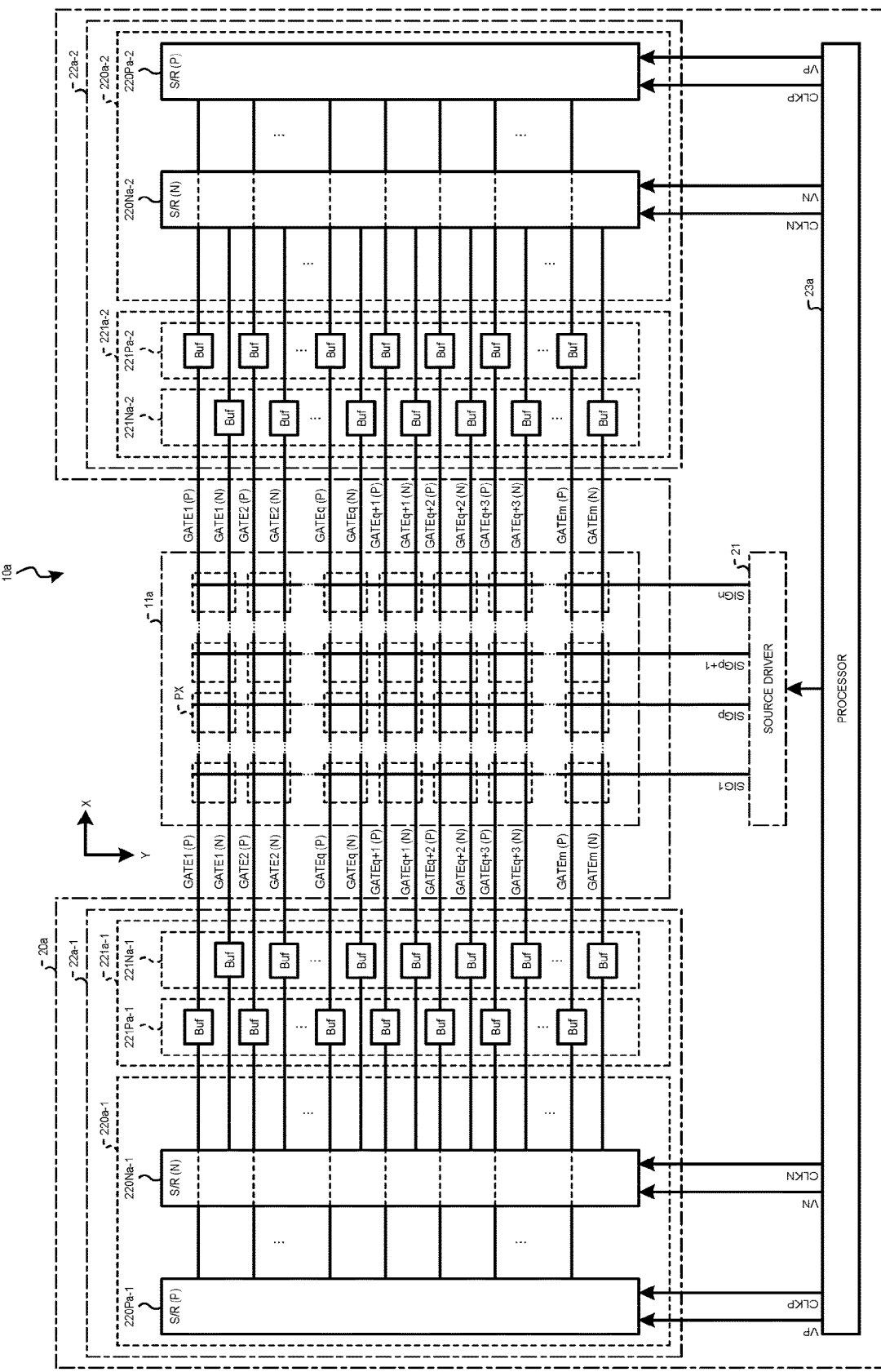
FIG. 15 is a diagram illustrating an exemplary overall configuration of a display portion and a display panel driver of the display device according to the modification of the first embodiment.
Figure 16:
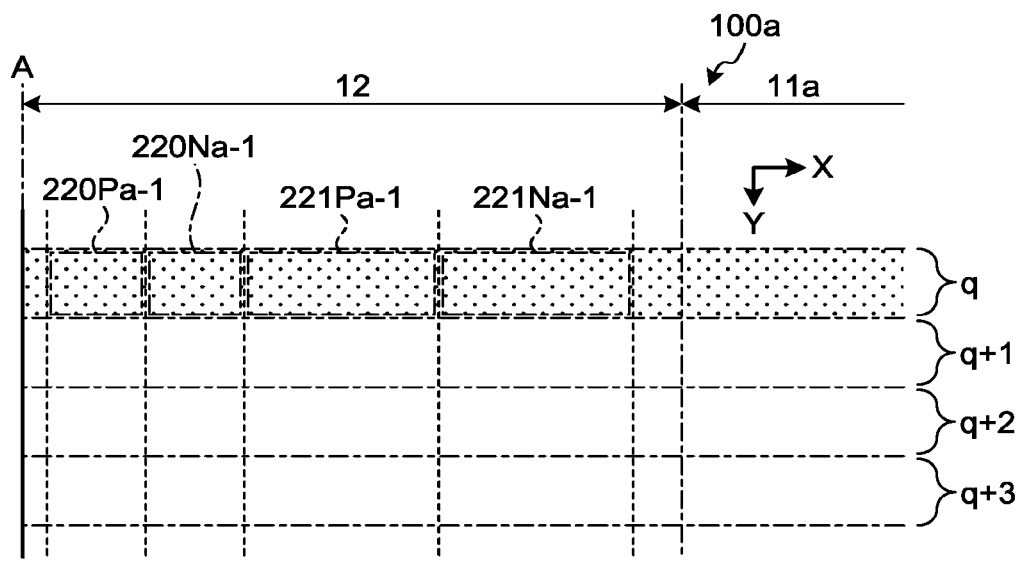
FIG. 16 is a diagram illustrating an arrangement example of a first gate driver in the bezel area on one side in a first direction (X-direction) of the display device according to the modification of the first embodiment.
Figure 17:
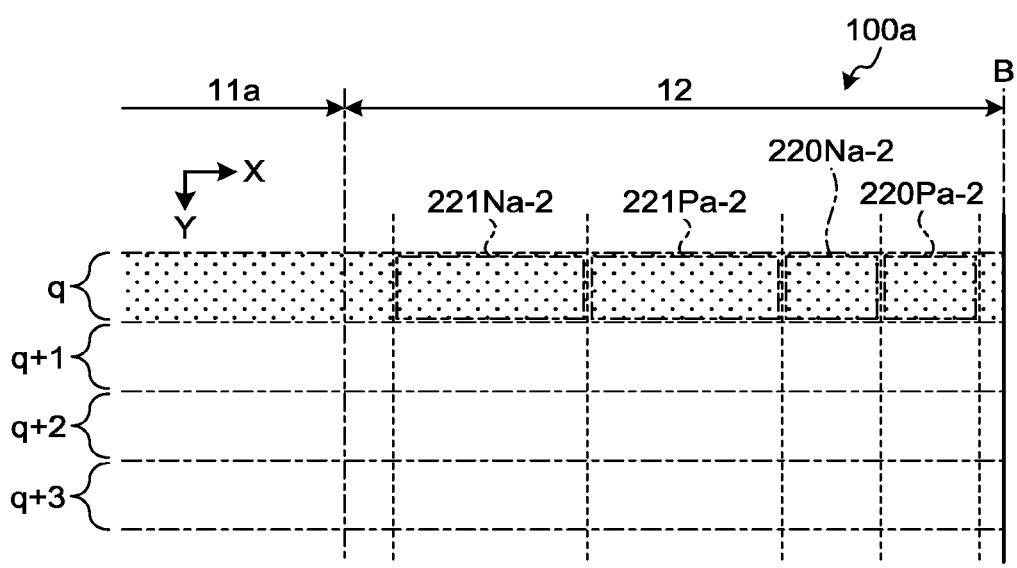
FIG. 17 is a diagram illustrating an arrangement example of a second gate driver in the bezel area on the other side in the first direction (X-direction) of the display device according to the modification of the first embodiment.

FIG. 14 is a diagram illustrating an exemplary schematic configuration of a display device according to a modification of the first embodiment. FIG. 15 is a diagram illustrating an exemplary overall configuration of a display portion and a display panel driver of the display device according to the modification of the first embodiment. FIG. 16 is a diagram illustrating an arrangement example of a first gate driver in the bezel area on one side in the first direction (X-direction) of the display device according to the modification of the first embodiment. FIG. 17 is a diagram illustrating an arrangement example of a second gate driver in the bezel area on the other side in the first direction (X-direction) of the display device according to the modification of the first embodiment. The example illustrated in FIG. 16 illustrates an arrangement example of a first gate driver 22a-1 in the bezel area 12 extending from a substrate end A on one side in the first direction (X-direction) of a TFT substrate 100a to a display portion 11a. The example illustrated in FIG. 17 illustrates an arrangement example of a second gate driver 22a-2 in the bezel area 12 extending from a substrate end B on the other side in the first direction (X-direction) of the TFT substrate 100a to the display portion 11a.

While the above-described first embodiment has illustrated the example in which the gate driver 22 is provided in the bezel area 12 on one side in the first direction (X-direction in FIG. 1), the modification of the first embodiment illustrated in FIGS. 14 to 17 illustrates the example in which the first gate driver 22a-1 is provided in the bezel area 12 on one side in the first direction (X-direction in FIGS. 14 to 17), and the second gate driver 22a-2 is provided in the bezel area 12 on the other side in the first direction (X-direction in FIGS. 14 to 17).

In the modification of the first embodiment illustrated in FIGS. 14 to 17, components constituting the first gate driver 22a-1 are identical to components constituting the second gate driver 22a-2. Specifically, a first shift register 220Pa-1 included in a first gate pulse generator 220a-1 is identical to a first shift register 220Pa-2 included in a second gate pulse generator 220a-2. A second shift register 220Na-1 included in the first gate pulse generator 220a-1 is identical to a second shift register 220Na-2 included in the second gate pulse generator 220a-2. A first buffer circuit 221Pa-1 included in a buffer circuit unit 221a-1 is identical to a first buffer circuit 221Pa-2 included in a buffer circuit unit 221a-2. A second buffer circuit 221Na-1 included in the buffer circuit unit 221a-1 is identical to a second buffer circuit 221Na-2 included in the buffer circuit unit 221a-2. That is, the first gate bus line (first scan line) SCLq(P) is supplied with the first gate drive signal (first scan signal) GATEq (P) from both the first gate driver 22a-1 and the second gate driver 22a-2, and the second gate bus line (second scan line) SCLq(N) is supplied with the second gate drive signal (second scan signal) GATEq (N) from both the first gate driver 22a-1 and the second gate driver 22a-2.

A processor 23a outputs the first start pulse VP, the second start pulse VN, the p-ch clock pulse CLKP, and the n-ch clock pulse CLKN to both the first gate driver 22a-1 and the second gate driver 22a-2.

In the modification of the first embodiment illustrated in FIGS. 14 to 17, loads on the first gate bus line (first scan line) SCLq(P) and the second gate bus line (second scan line) SCLq(N) are shared between the first gate driver 22a-1 and the second gate driver 22a-2. This feature reduces the time constant of the first gate bus line (first scan line) SCLq(P) and the second gate bus line (second scan line) SCLq(N) from the viewpoint of each of the first gate driver 22a-1 and the second gate driver 22a-2. As a result, one horizontal period can be shortened, and, for example, the resolution of the display portion 11a can be increased.

In the comparative example illustrated in FIG. 5, the resolution of the display portion can also be increased in the same manner if the gate drivers having the same configuration are provided in the bezel area 12 on both sides in the first direction (X-direction). However, the modification of the first embodiment illustrated in FIGS. 14 to 17 can increase the resolution of the display portion 11a while reducing the number of the supplied power supply voltages having different voltage values. In addition, the bezel area 12 can be narrowed in the first direction (X-direction in FIGS. 16 and 17) of the TFT substrate 100a, as illustrated in FIGS. 16 and 17.

As described above, in the display device 10 according to the first embodiment, the pixel transistor TR included in the pixel PX has the complementary MOS (CMOS) configuration in which the PMOS transistor (first pixel transistor) PTR is coupled in parallel to the NMOS transistor (second pixel transistor) NTR, and the display device 10 includes the first shift register 220P that supplies the first gate drive signal (first scan signal) GATEq (P) to the gate of the PMOS transistor (first pixel transistor) PTR and the second shift register 220N that supplies the second gate drive signal (second scan signal) GATEq (N) to the gate of the NMOS transistor (second pixel transistor) NTR. The first shift register 220P works by being supplied with the first positive potential VGH higher than the voltage upper limit value Vsig(+) of the source drive signal (video signal) SIGp supplied to the source of the PMOS transistor (first pixel transistor) PTR and the GND potential in the display portion 11, and sets the high potential of the first gate drive signal (first scan signal) GATEq (P) to the first positive potential VGH and the low potential thereof to the GND potential. The second shift register 220N works by being supplied with the second positive potential VGJ lower than the first positive potential VGH and the negative potential VGL lower than the voltage lower limit value Vsig(−) of the source drive signal (video signal) SIGp supplied to the source of the NMOS transistor (second pixel transistor) NTR, and sets the high potential of the second gate drive signal (second scan signal) GATEq (N) to the second positive potential VGJ and the low potential thereof to the negative potential VGL.

Accordingly, the number of the supplied power supply voltages having different voltage values can be reduced, and the cost for the power supply circuit 200 can be reduced. In addition, the number of circuits disposed in the bezel area 12 in the first direction (X-direction) of the TFT substrate 100 can be reduced, and the bezel area 12 can be narrowed in the first direction (X-direction) of the TFT substrate 100.

The GND potential can be written to the pixel PX through the NMOS transistor (second pixel transistor) NTR by setting the second positive potential VGJ to the value higher by the offset voltage between the source and the gate of the NMOS transistor (second pixel transistor) NTR than the GND potential that is the middle value of the potential difference between the voltage upper limit value Vsig(+) and the voltage lower limit value Vsig(−) of the source drive signal (video signal) SIGp.

A display device 10a according to the modification of the first embodiment is provided with the first shift register 220Pa-1 and the second shift register 220Na-1 in the bezel area 12 on one side in the first direction (X-direction) of the TFT substrate 100a and with the first shift register 220Pa-2 and the second shift register 220Na-2 in the bezel area 12 on the other side in the first direction (X-direction) of the TFT substrate 100a, and supplies the first gate drive signal (first scan signal) GATEq (P) from both the first shift register 220Pa-1 and the first shift register 220Pa-2 and the second gate drive signal (second scan signal) GATEq (N) from both the second shift register 220Na-1 and the second shift register 220Na-2. This configuration reduces the time constant of the first gate bus line (first scan line) SCLq(P) and the second gate bus line (second scan line) SCLq(N), and can thereby shorten one horizontal period. As a result, the resolution of the display portion 11a can be increased while the number of the supplied power supply voltages having different voltage values can be reduced. In addition, the bezel area 12 can be narrowed in the first direction (X-direction) of the TFT substrate 100a.

The present embodiment can provide the display devices 10 and 10a capable of reducing the number of the supplied power supply voltages having different voltage values.

Second Embodiment

Hereinafter, components having the same functions as those of the above-described first embodiment will be assigned with reference numerals identical thereto, and will not be described. A display device of a second embodiment of the present disclosure will be described mainly in terms of differences from that of the first embodiment.

Figure 18:
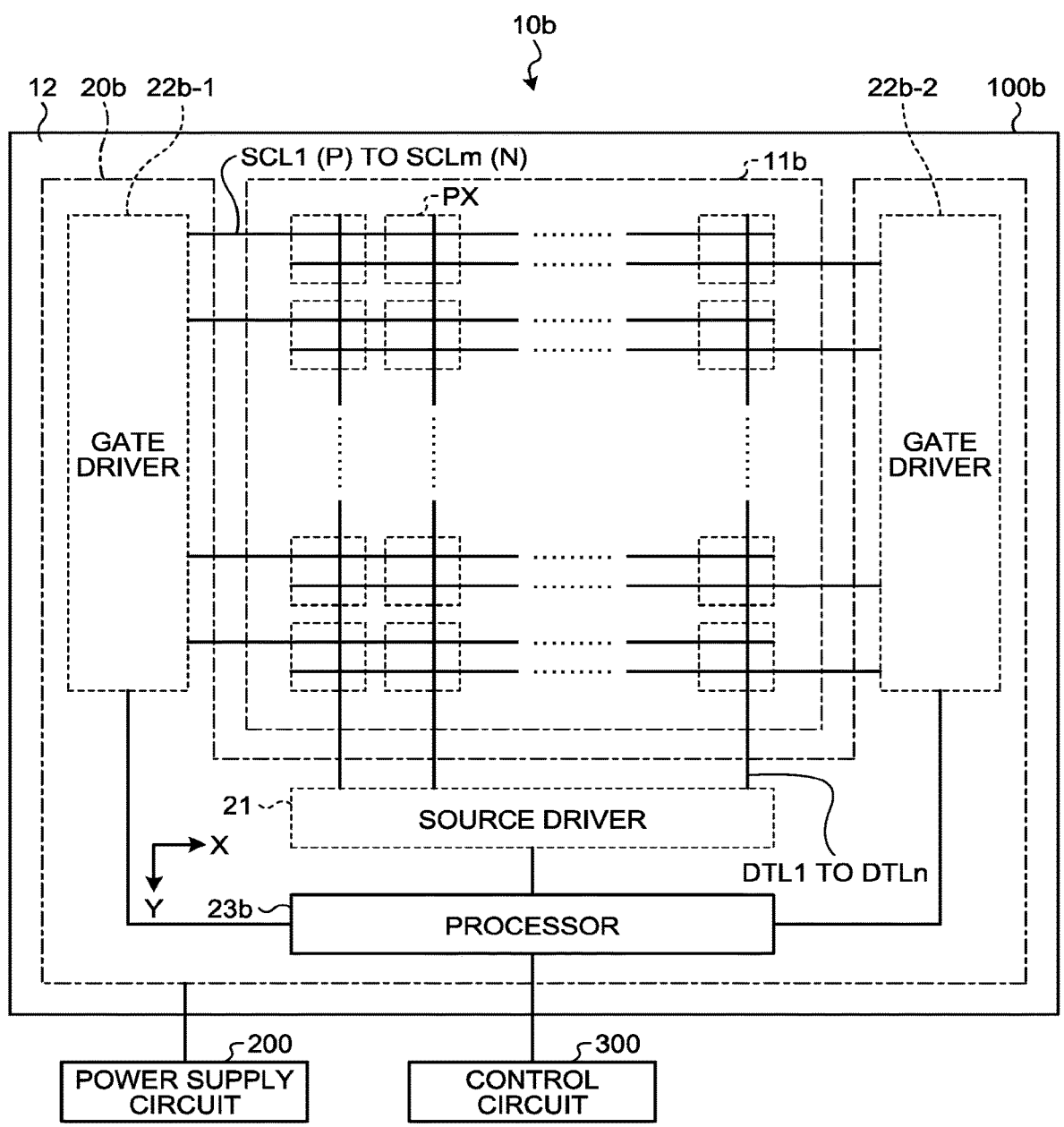
FIG. 18 is a diagram illustrating an exemplary schematic configuration of a display device according to a second embodiment of the present disclosure.
Figure 19:
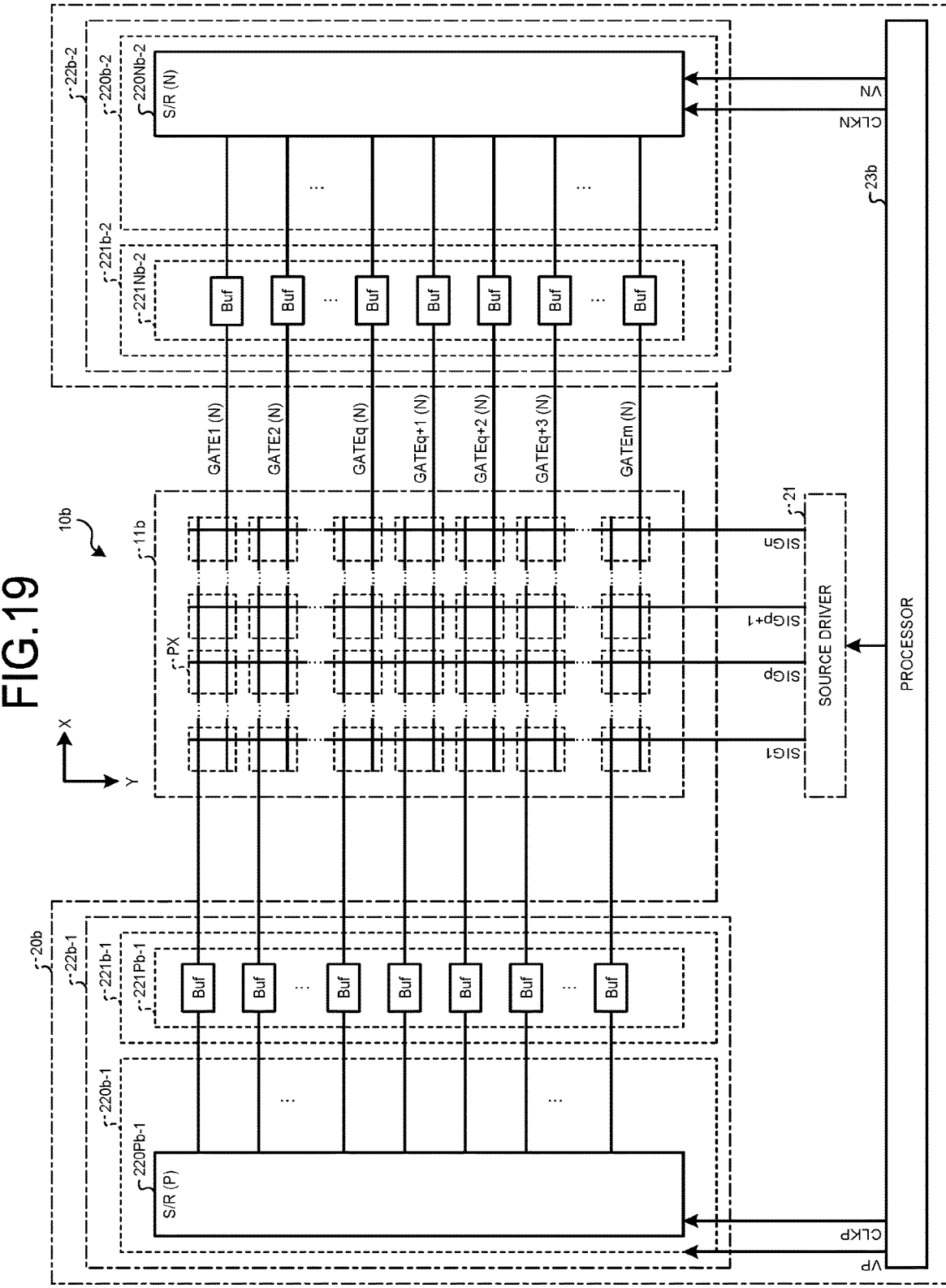
FIG. 19 is a diagram illustrating an exemplary overall configuration of a display portion and a display panel driver of the display device according to the second embodiment.
Figure 20:
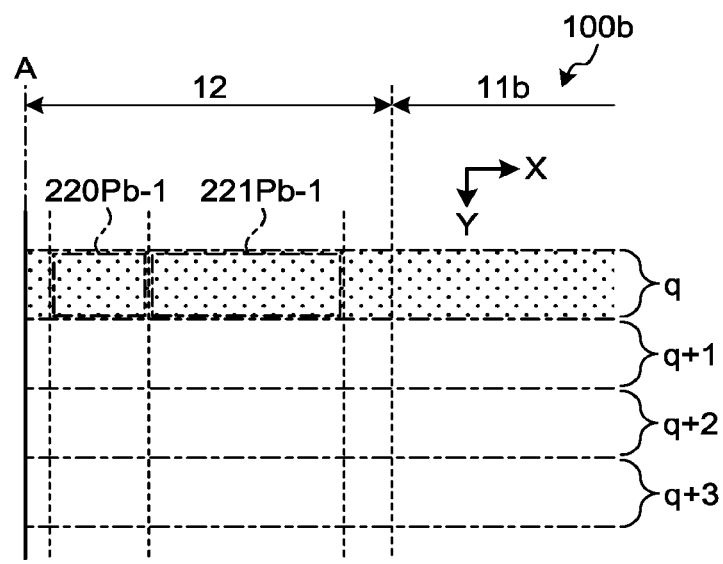
FIG. 20 is a diagram illustrating an arrangement example of a first gate driver in the bezel area on one side in the first direction (X-direction) of the display device according to the second embodiment.
Figure 21:
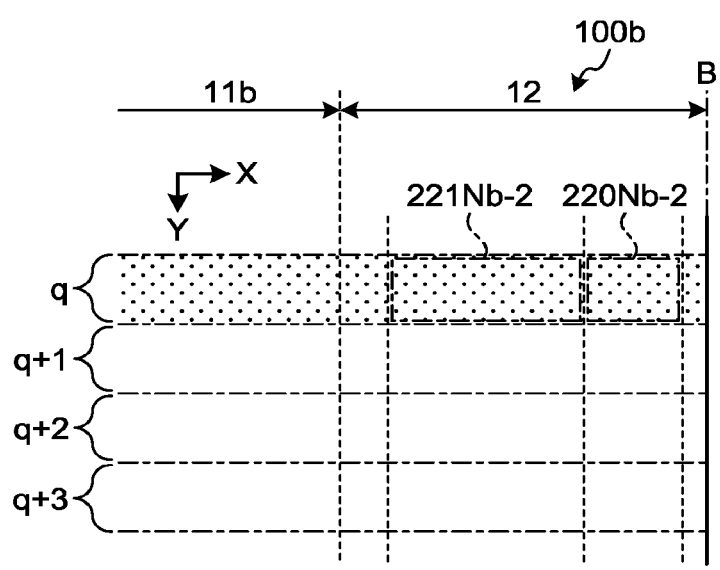
FIG. 21 is a diagram illustrating an arrangement example of a second gate driver in the bezel area on the other side in the first direction (X-direction) of the display device according to the second embodiment.

FIG. 18 is a diagram illustrating an exemplary schematic configuration of the display device according to the second embodiment. FIG. 19 is a diagram illustrating an exemplary overall configuration of a display portion and a display panel driver of the display device according to the second embodiment. FIG. 20 is a diagram illustrating an arrangement example of a first gate driver in the bezel area on one side in the first direction (X-direction) of the display device according to the second embodiment. FIG. 21 is a diagram illustrating an arrangement example of a second gate driver in the bezel area on the other side in the first direction (X-direction) of the display device according to the second embodiment. The example illustrated in FIG. 20 illustrates an arrangement example of a first gate driver 22b-1 in the bezel area 12 extending from the substrate end A on one side in the first direction (X-direction) of a TFT substrate 100b to a display portion 11b. The example illustrated in FIG. 21 illustrates an arrangement example of a second gate driver 22b-2 in the bezel area 12 extending from the substrate end B on the other side in the first direction (X-direction) of the TFT substrate 100b to the display portion 11b.

A display device 10b according to the present embodiment illustrated in FIGS. 18 to 21 is configured to supply the first gate drive signal (first scan signal) GATEq (P) from the first gate driver 22b-1 provided in the bezel area 12 on one side in the first direction (X-direction in FIGS. 18 to 21) of the TFT substrate 100b to the first gate bus line (first scan line) SCLq(P), and to supply the second gate drive signal (second scan signal) GATEq (N) from the second gate driver 22b-2 provided in the bezel area 12 on the other side in the first direction (X-direction in FIGS. 18 to 21) of the TFT substrate 100b to the second gate bus line (second scan line) SCLq(N).

The first gate driver 22b-1 includes a first gate pulse generator 220b-1 and a buffer circuit unit 221b-1.

The first gate pulse generator 220b-1 includes a first shift register 220Pb-1 that generates the first gate drive signal (first scan signal) GATEq (P).

The buffer circuit unit 221b-1 includes a first buffer circuit 221Pb-1 that supplies the first gate drive signal (first scan signal) GATEq (P) generated by the first shift register 220Pb-1 to the first gate bus line (first scan line) SCLq(P).

The second gate driver 22b-2 includes a second gate pulse generator 220b-2 and a buffer circuit unit 221b-2.

The second gate pulse generator 220b-2 includes a second shift register 220Nb-2 that generates the second gate drive signal (second scan signal) GATEq (N).

The buffer circuit unit 221b-2 includes a second buffer circuit 221Nb-2 that supplies the second gate drive signal (second scan signal) GATEq (N) generated by the second shift register 220Nb-2 to the second gate bus line (second scan line) SCLq(N).

A processor 23b outputs the first start pulse VP and the p-ch clock pulse CLKP to the first gate driver 22b-1, and outputs the second start pulse VN and the n-ch clock pulse CLKN to the second gate driver 22b-2.

As described above, the display device 10b according to the present embodiment is provided with the first shift register 220Pb-1 and the first buffer circuit 221Pb-1 in the bezel area 12 on one side in the first direction (X-direction in FIG. 19) of the TFT substrate 100b, and provided with the second shift register 220Nb-2 and the second buffer circuit 221Nb-2 in the bezel area 12 on the other side in the first direction (X-direction in FIG. 19) of the TFT substrate 100b. With this configuration, as illustrated in FIGS. 20 and 21, the bezel area 12 can be narrower in the first direction (X-direction in FIGS. 20 and 21) of the TFT substrate 100b than that in the configuration of the first embodiment. Also, in the same manner as in the first embodiment, the number of the supplied power supply voltages having different voltage values can be reduced, and the cost for the power supply circuit 200 can be reduced.

As described above, the display device 10b according to the second embodiment is provided with the first shift register 220Pb-1 in the bezel area 12 on one side in the first direction (X-direction), and provided with the second shift register 220Nb-2 in the bezel area 12 on the other side in the first direction (X-direction). With this configuration, the bezel area 12 can be narrower in the first direction (X-direction) of the TFT substrate 100b than that in the first embodiment.

In the same manner as in the first embodiment, the number of the supplied power supply voltages having different voltage values can be reduced, so that the cost for the power supply circuit 200 can be reduced and the price of the display device 10b can be reduced.

The present embodiment can provide the display device 10b capable of reducing the number of the supplied power supply voltages having different voltage values.

Third Embodiment

Hereinafter, components having the same functions as those of the above-described first and second embodiments will be assigned with reference numerals identical thereto, and will not be described. A display device of a third embodiment of the present disclosure will be described mainly in terms of differences from those of the first and second embodiments.

Figure 22:
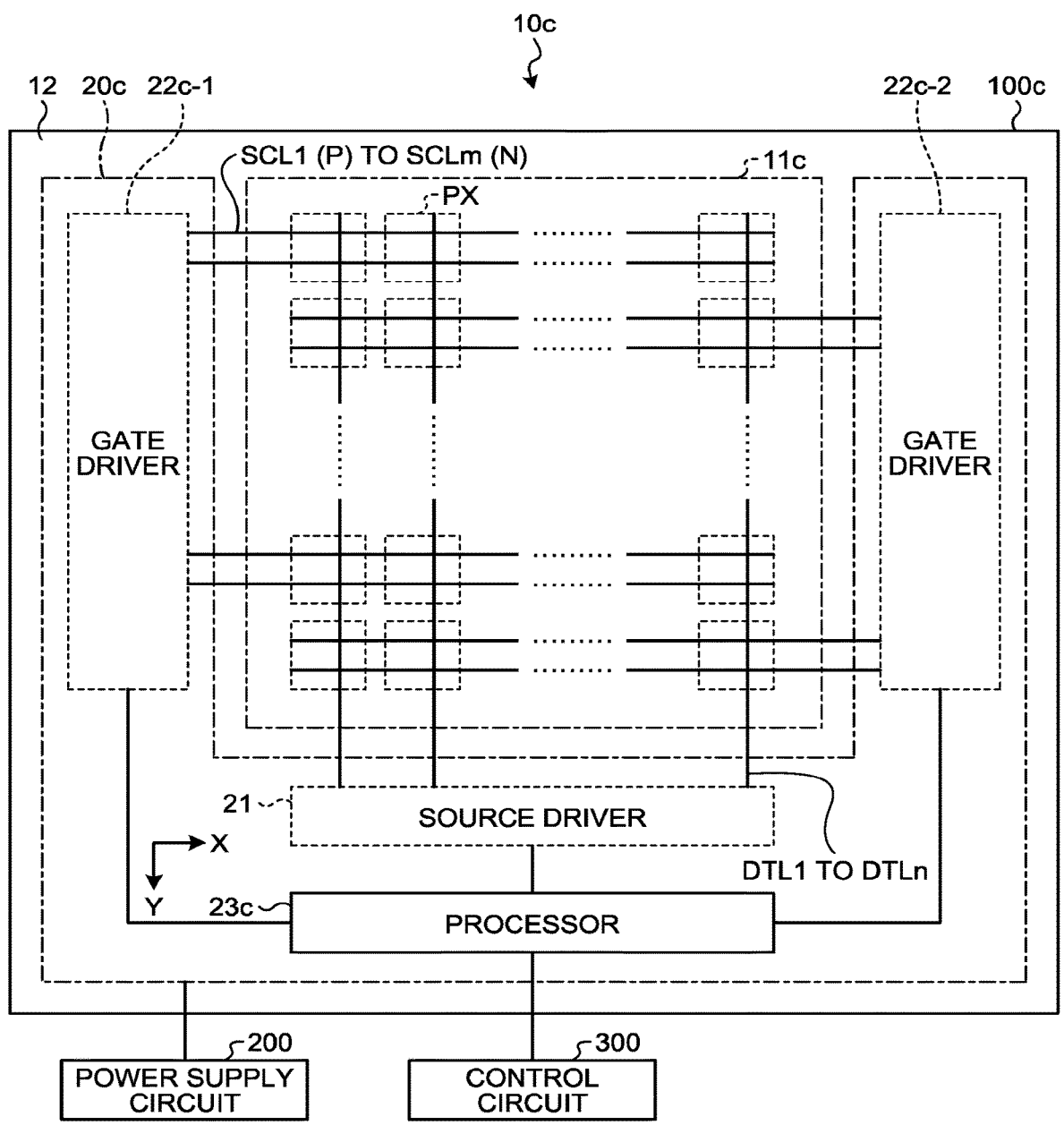
FIG. 22 is a diagram illustrating an exemplary schematic configuration of a display device according to a third embodiment of the present disclosure.
Figure 23:
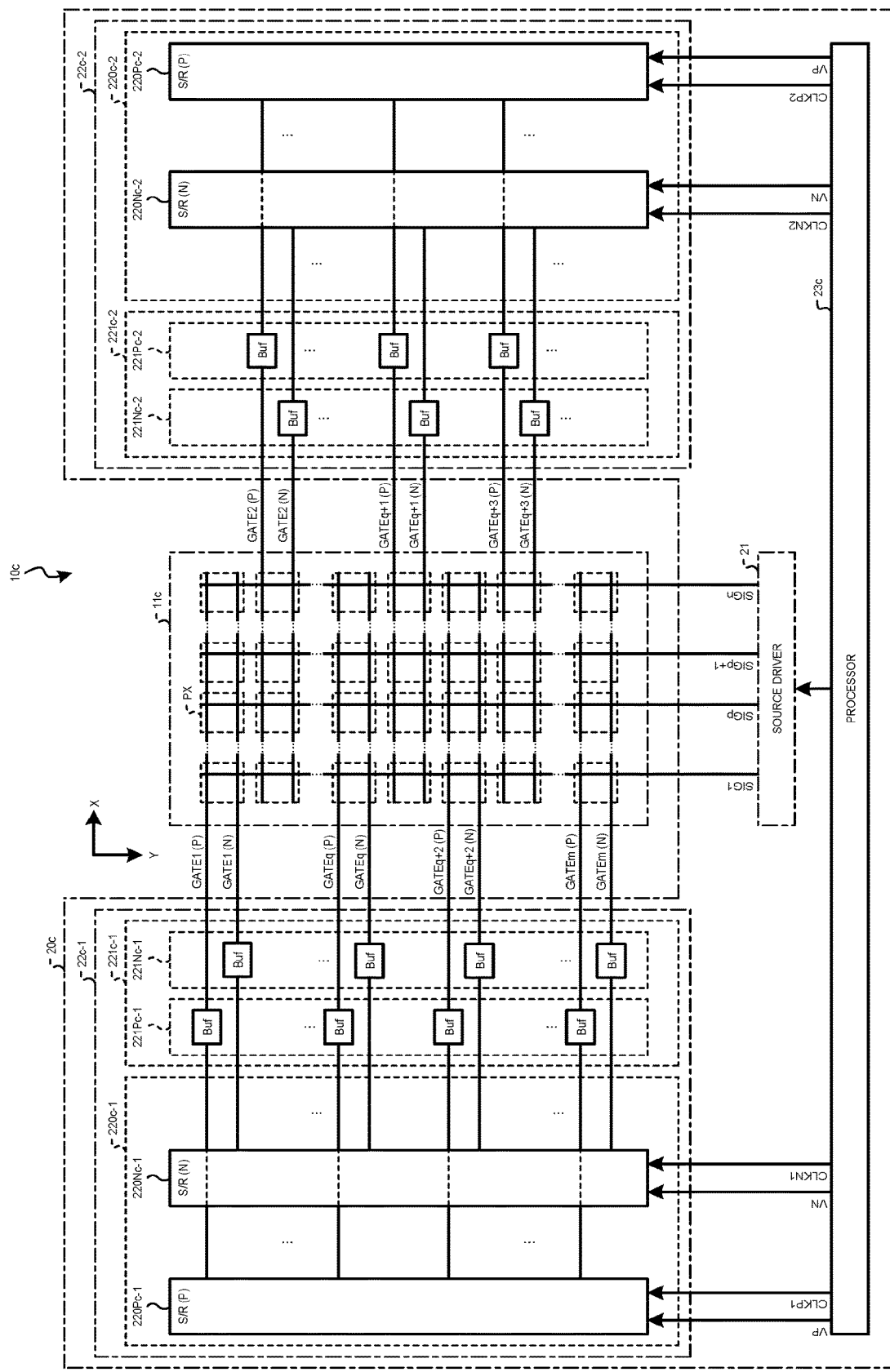
FIG. 23 is a diagram illustrating an exemplary overall configuration of a display portion and a display panel driver of the display device according to the third embodiment.
Figure 24:
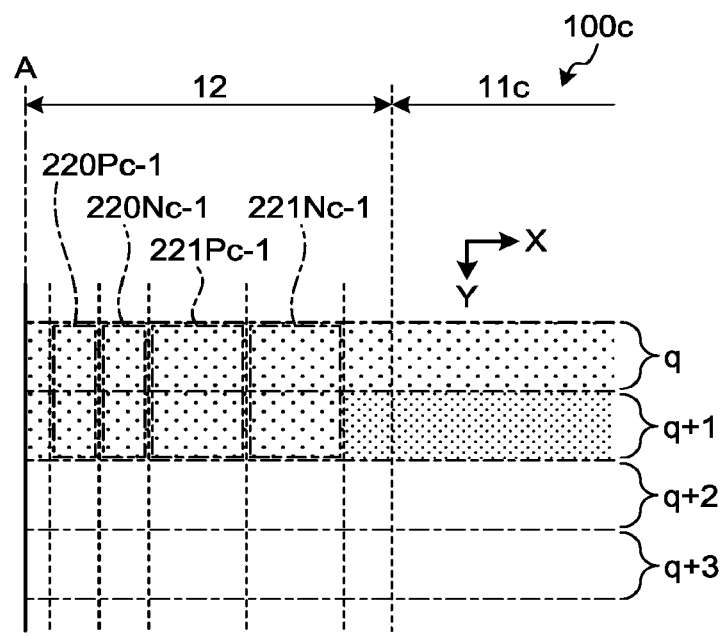
FIG. 24 is a diagram illustrating an arrangement example of a first gate driver in the bezel area on one side in the first direction (X-direction) of the display device according to the third embodiment.
Figure 25:
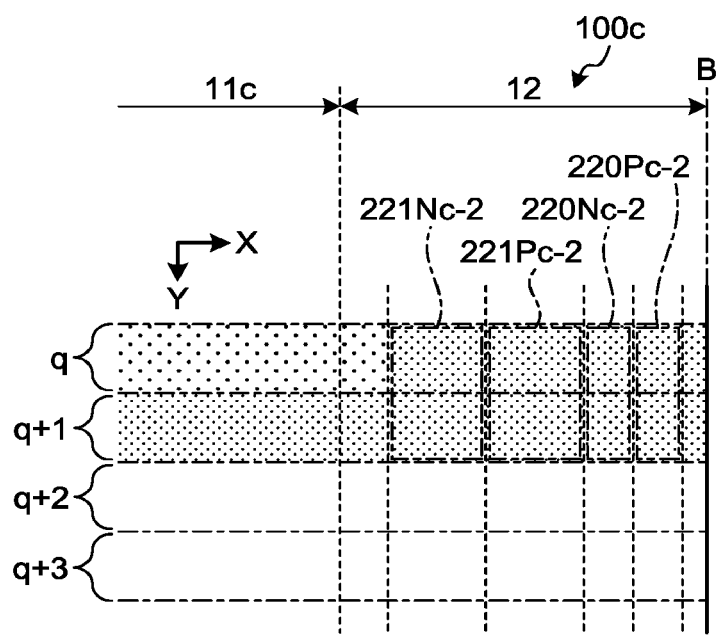
FIG. 25 is a diagram illustrating an arrangement example of a second gate driver in the bezel area on the other side in the first direction (X-direction) of the display device according to the third embodiment.

FIG. 22 is a diagram illustrating an exemplary schematic configuration of the display device according to the third embodiment. FIG. 23 is a diagram illustrating an exemplary overall configuration of a display portion and a display panel driver of the display device according to the third embodiment. FIG. 24 is a diagram illustrating an arrangement example of a first gate driver in the bezel area on one side in the first direction (X-direction) of the display device according to the third embodiment. FIG. 25 is a diagram illustrating an arrangement example of a second gate driver in the bezel area on the other side in the first direction (X-direction) of the display device according to the third embodiment. The example illustrated in FIG. 24 illustrates an arrangement example of a first gate driver 22c-1 in the bezel area 12 extending from the substrate end A on one side in the first direction (X-direction) of a TFT substrate 100c to a display portion 11c. The example illustrated in FIG. 25 illustrates an arrangement example of a second gate driver 22c-2 in the bezel area 12 extending from the substrate end B on the other side in the first direction (X-direction) of the TFT substrate 100c to the display portion 11c.

In the configuration illustrated in FIGS. 22 to 25, the first gate drive signal (first scan signal) GATEq (P) and the second gate drive signal (second scan signal) GATEq (N) are supplied from the first gate driver 22c-1 provided in the bezel area 12 on one side in the first direction (X-direction in FIG. 22) of the TFT substrate 100c to the pixels PX arranged in an odd-numbered row, and the first gate drive signal (first scan signal) GATEq+1 (P) and the second gate drive signal (second scan signal) GATEq+1 (N) are supplied from the second gate driver 22c-2 provided in the bezel area 12 on the other side in the first direction (X-direction in FIG. 22) of the TFT substrate 100c to the pixels PX arranged in an even-numbered row.

In the configuration illustrated in FIGS. 22 to 25, the first gate driver 22c-1 includes a first gate pulse generator 220c-1 and a buffer circuit unit 221c-1.

The first gate pulse generator 220c-1 includes a first shift register 220Pc-1 that supplies the first gate drive signal (first scan signal) GATEq (P) to the first gate bus line (first scan line) SCLq(P) coupled to the gates of the PMOS transistors (first pixel transistors) PTR of the pixels PX belonging to the odd-numbered row, and includes a second shift register 220Nc-1 that supplies the second gate drive signal (second scan signal) GATEq (N) to the second gate bus line (second scan line) SCLq(N) coupled to the gates of the NMOS transistors (second pixel transistors) NTR of the pixels PX belonging to the odd-numbered row.

The buffer circuit unit 221c-1 includes a first buffer circuit 221Pc-1 that supplies the first gate drive signal (first scan signal) GATEq (P) generated by the first shift register 220Pc-1 to the first gate bus line (first scan line) SCLq(P) coupled to the gates of the PMOS transistors (first pixel transistors) PTR of the pixels PX belonging to the odd-numbered row, and includes a second buffer circuit 221Nc-1 that supplies the second gate drive signal (second scan signal) GATEq (N) generated by the second shift register 220Nc-1 to the second gate bus line (second scan line) SCLq(N) coupled to the gates of the NMOS transistors (second pixel transistors) NTR of the pixels PX belonging to the odd-numbered row.

In the configuration illustrated in FIGS. 22 to 25, the second gate driver 22c-2 includes a second gate pulse generator 220c-2 and a buffer circuit unit 221c-2.

The second gate pulse generator 220c-2 includes a first shift register 220Pc-2 that supplies the first gate drive signal (first scan signal) GATEq+1 (P) to the first gate bus line (first scan line) SCLq+1 (P) coupled to the gates of the PMOS transistors (first pixel transistors) PTR of the pixels PX belonging to the even-numbered row, and includes a second shift register 220Nc-2 that supplies the second gate drive signal (second scan signal) GATEq+1 (N) to the second gate bus line (second scan line) SCLq+1 (N) coupled to the gates of the NMOS transistors (second pixel transistors) NTR of the pixels PX belonging to the even-numbered row.

The buffer circuit unit 221c-2 includes a first buffer circuit 221Pc-2 that supplies the first gate drive signal (first scan signal) GATEq+1 (P) generated by the first shift register 220Pc-2 to the first gate bus line (first scan line) SCLq+1 (P) coupled to the gates of the PMOS transistors (first pixel transistors) PTR of the pixels PX belonging to the even-numbered row, and includes a second buffer circuit 221Nc-2 that supplies the second gate drive signal (second scan signal) GATEq+1 (N) generated by the second shift register 220Nc-2 to the second gate bus line (second scan line) SCLq+1 (N) coupled to the gates of the NMOS transistors (second pixel transistors) NTR of the pixels PX belonging to the even-numbered row.

A processor 23c outputs the first start pulse VP and a first p-ch clock pulse CLKP1 to the first shift register 220Pc-1 of the first gate driver 22c-1. The processor 23c outputs the second start pulse VN and a first n-ch clock pulse CLKN1 to the second shift register 220Nc-1 of the first gate driver 22c-1. The processor 23c outputs the first start pulse VP and a second p-ch clock pulse CLKP2 to the first shift register 220Pc-2 of the second gate driver 22c-2. The processor 23c outputs the second start pulse VN and a second n-ch clock pulse CLKN2 to the second shift register 220Nc-2 of the second gate driver 22c-2.

In a display device 10c according to the present embodiment, as illustrated in FIG. 24, a circuit of the first gate driver 22c-1 for one row can be disposed in a portion of the bezel area 12 having a width of two rows of the pixels PX. In the display device 10c according to the present embodiment, as illustrated in FIG. 25, a circuit of the second gate driver 22c-2 for one row can be disposed in a portion of the bezel area 12 having a width of two rows of the pixels PX. As a result, the bezel area 12 can be narrower in the first direction (X-direction in FIGS. 24 and 25) of the TFT substrate 100c than that in the first embodiment. Also, in the same manner as in the first embodiment, the number of the supplied power supply voltages having different voltage values can be reduced, and the cost for the power supply circuit 200 can be reduced.

Figure 26:
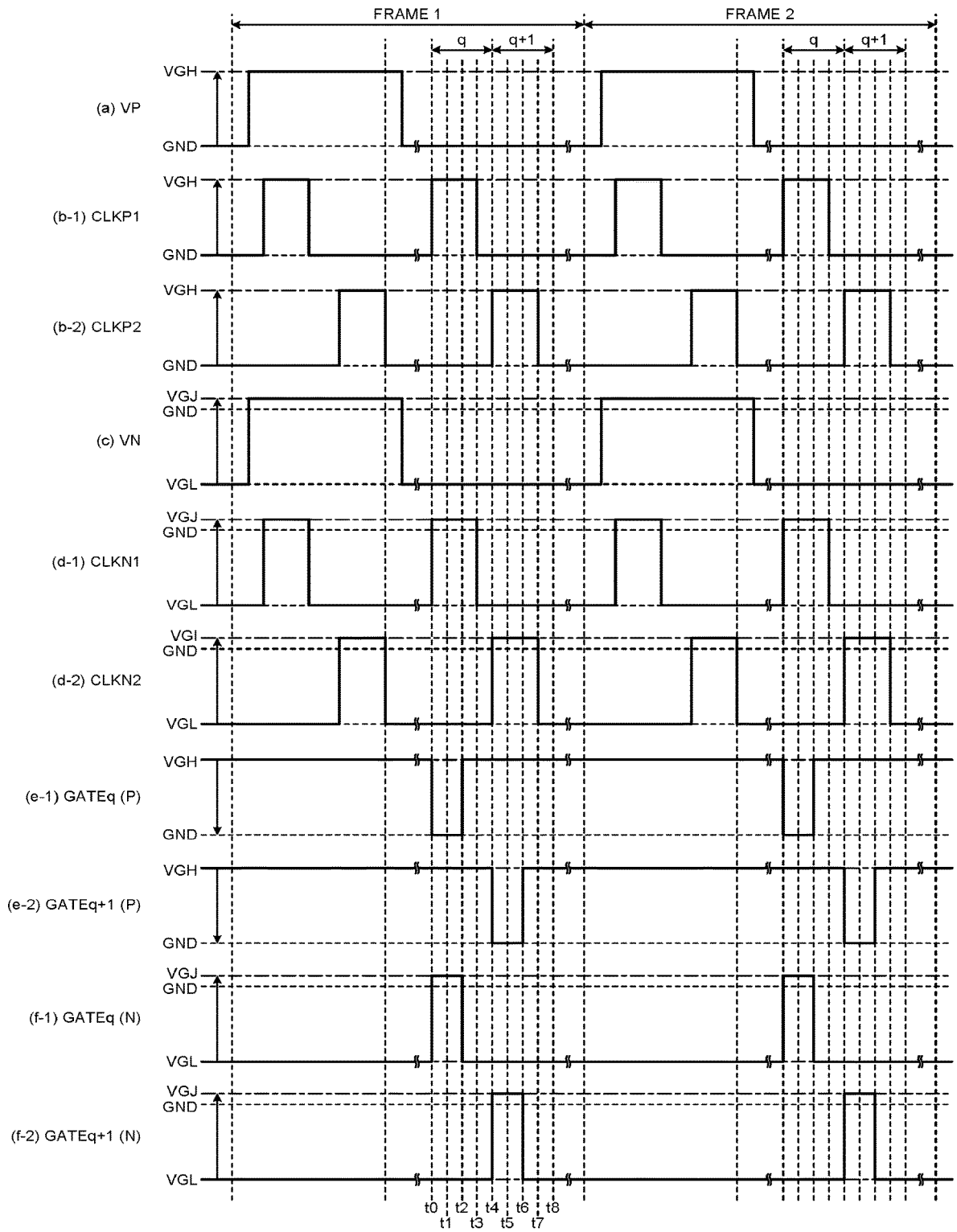
FIG. 26 is a timing diagram for the configuration of the display device according to the third embodiment illustrated in FIGS. 22 to 25.

The following describes an operation example in the display device 10c according to the present embodiment with reference to FIG. 26. FIG. 26 is a timing diagram for the configuration of the display device according to the third embodiment illustrated in FIGS. 22 to 25.

Diagram (a) illustrated in FIG. 26 represents the first start pulse VP.

Diagram (b-1) illustrated in FIG. 26 represents the first p-ch clock pulse CLKP1. Diagram (b-2) illustrated in FIG. 26 represents the second p-ch clock pulse CLKP2.

Diagram (c) illustrated in FIG. 26 represents the second start pulse VN. Diagram (d-1) illustrated in FIG. 26 represents the first n-ch clock pulse CLKN1. Diagram (d-2) illustrated in FIG. 26 represents the second n-ch clock pulse CLKN2.

Diagram (e-1) illustrated in FIG. 26 represents the first gate drive signal (first scan signal) GATEq (P) output from the first gate pulse generator 220c-1. Diagram (e-2) illustrated in FIG. 26 represents the first gate drive signal (first scan signal) GATEq+1 (P) output from the second gate pulse generator 220c-2.

Diagram (f-1) illustrated in FIG. 26 represents the second gate drive signal (second scan signal) GATEq (N) output from the first gate pulse generator 220c-1. Diagram (f-2) illustrated in FIG. 26 represents the second gate drive signal (second scan signal) GATEq+1 (N) output from the second gate pulse generator 220c-2.

In the example illustrated in FIG. 26, a period from time t0 to time t4 represents a horizontal period in which the source drive signals (video signals) are written to the pixels PX in the q-th row that is an odd-numbered row, and a period from time t4 to time t8 represents a horizontal period in which the source drive signals (video signals) are written to the pixels PX in the (q+1)th row that is an even-numbered row.

At time t0, the first gate drive signal (first scan signal) GATEq (P) is switched to the low potential (GND potential), and the second gate drive signal (second scan signal) GATEq (N) is switched to the high potential (second positive potential VGJ). Then, the PMOS transistors (first pixel transistors) PTR and the NMOS transistors (second pixel transistors) NTR of the pixels PX in the q-th row are placed in the on standby state.

At time t1, the source drive signals (video signals) are supplied to the pixels PX in the q-th row. Then, the pixel electrodes Pix of the pixels PX in the q-th row are supplied with the source drive signals (video signals), and the pixel capacitors CS are charged with electrical charges corresponding to the source drive signals (video signals).

Then, at time t2, the first gate drive signal (first scan signal) GATEq (P) is switched to the high potential (first positive potential VGH), and the second gate drive signal (second scan signal) GATEq (N) is switched to the low potential (negative potential VGL). Then, the PMOS transistors (first pixel transistors) PTR and the NMOS transistors (second pixel transistors) NTR of the pixels PX in the q-th row are placed in the off state. As a result, the pixel capacitors CS keep the potentials of the pixel electrodes Pix even after the source drive signals (video signals) are switched to the GND potential at time t3.

At time t4, the first gate drive signal (first scan signal) GATEq+1 (P) is switched to the low potential (GND potential), and the second gate drive signal (second scan signal) GATEq+1 (N) is switched to the high potential (second positive potential VGJ). Then, the PMOS transistors (first pixel transistors) PTR and the NMOS transistors (second pixel transistors) NTR in the (q+1)th row are placed in the on standby state.

At time t5, the source drive signals (video signals) are supplied to the pixels PX in the (q+1)th row. Then, the pixel electrodes Pix of the pixels PX in the (q+1)th row are supplied with the source drive signals (video signals), and the pixel capacitors CS are charged with electrical charges corresponding to the source drive signals (video signals).

Then, at time t6, the first gate drive signal (first scan signal) GATEq+1 (P) is switched to the high potential (first positive potential VGH), and the second gate drive signal (second scan signal) GATEq+1 (N) is switched to the low potential (negative potential VGL). Then, the PMOS transistors (first pixel transistors) PTR and the NMOS transistors (second pixel transistors) NTR of the pixels PX in the (q+1)th row are placed in the off state. As a result, the pixel capacitors CS keep the potentials of the pixel electrodes Pix even after the source drive signals (video signals) are switched to the GND potential at time t7.

Modification

Figure 27:
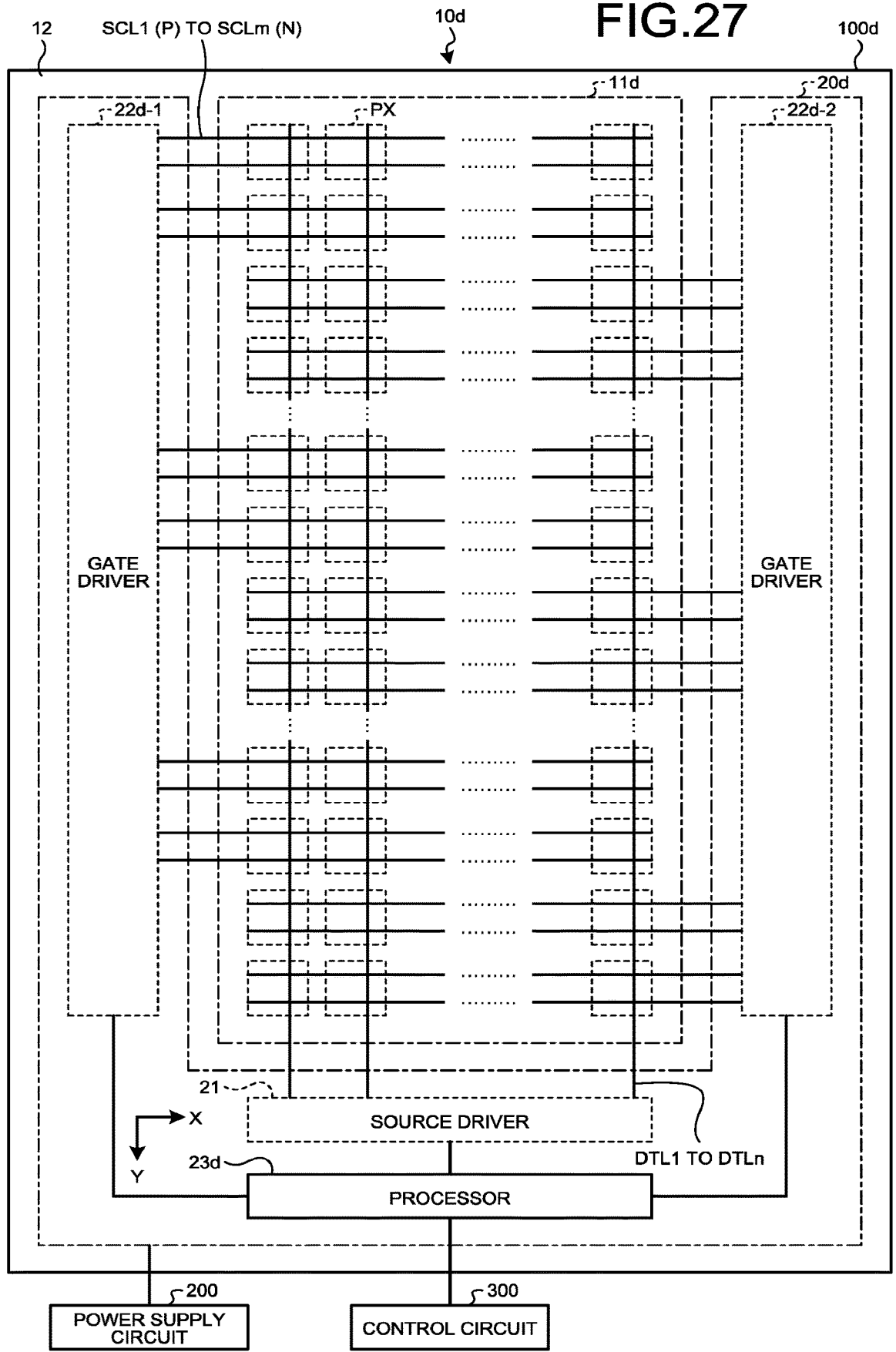
FIG. 27 is a diagram illustrating an exemplary schematic configuration of a display device according to a modification of the third embodiment.
Figure 28:
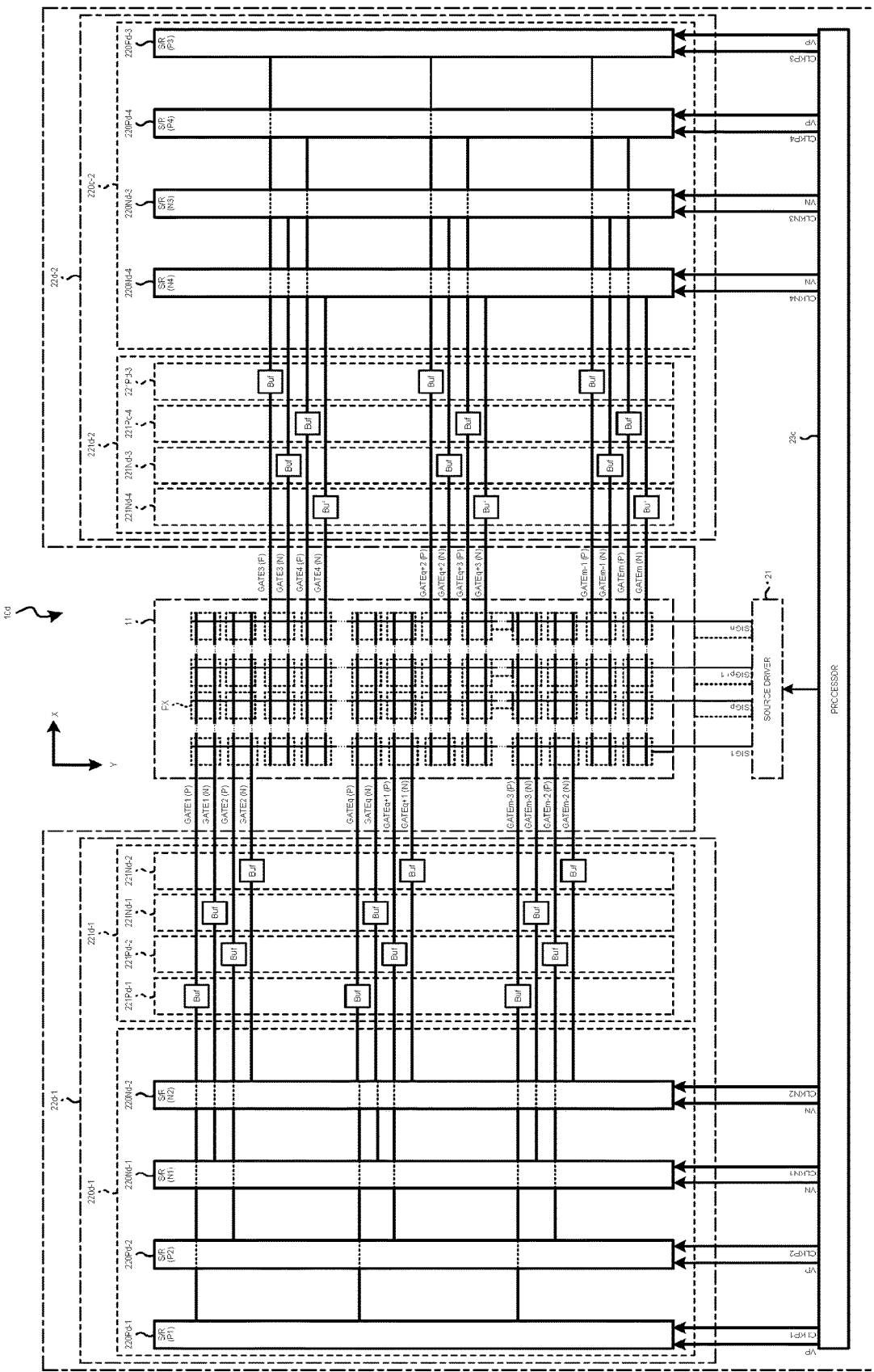
FIG. 28 is a diagram illustrating an exemplary overall configuration of a display portion and a display panel driver of the display device according to the modification of the third embodiment.
Figure 29:
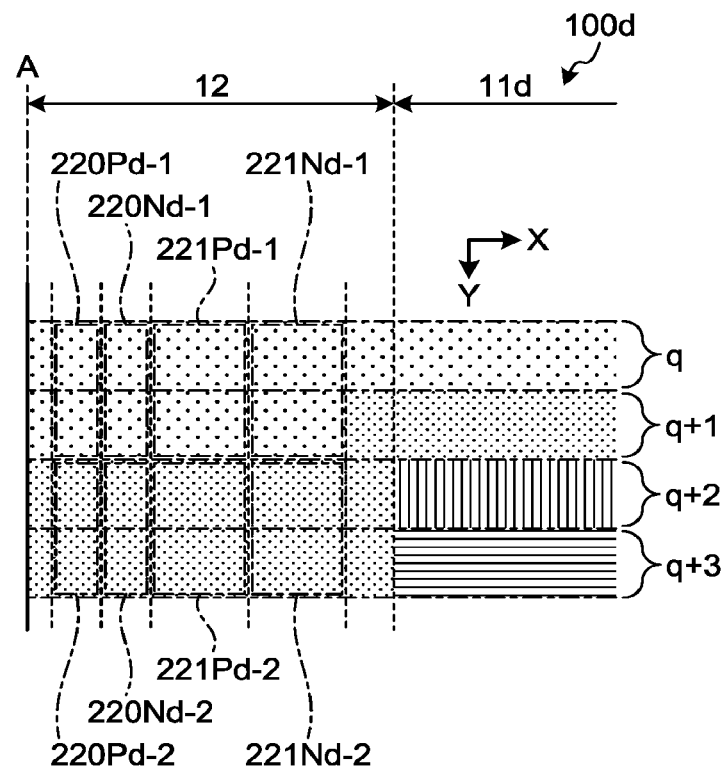
FIG. 29 is a diagram illustrating an arrangement example of a first gate driver in the bezel area on one side in the first direction (X-direction) of the display device according to the modification of the third embodiment.
Figure 30:
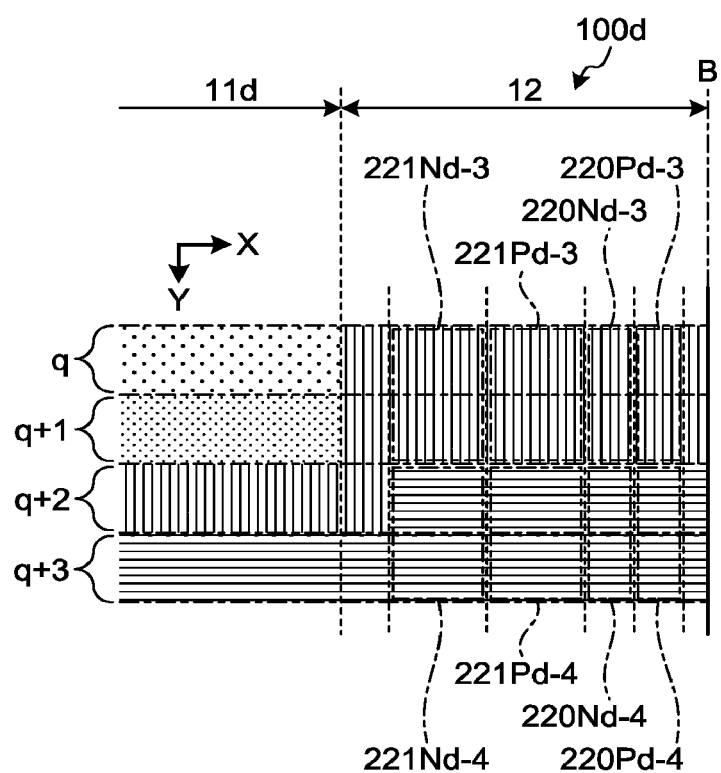
FIG. 30 is a diagram illustrating an arrangement example of a second gate driver in the bezel area on the other side in the first direction (X-direction) of the display device according to the modification of the third embodiment.

FIG. 27 is a diagram illustrating an exemplary schematic configuration of a display device according to a modification of the third embodiment. FIG. 28 is a diagram illustrating an exemplary overall configuration of a display portion and a display panel driver of the display device according to the modification of the third embodiment. FIG. 29 is a diagram illustrating an arrangement example of a first gate driver in the bezel area on one side in the first direction (X-direction) of the display device according to the modification of the third embodiment. FIG. 30 is a diagram illustrating an arrangement example of a second gate driver in the bezel area on the other side in the first direction (X-direction) of the display device according to the modification of the third embodiment. The example illustrated in FIG. 29 illustrates an arrangement example of a first gate driver 22d-1 in the bezel area 12 extending from the substrate end A on one side in the first direction (X-direction) of a TFT substrate 100d to a display portion 11d. The example illustrated in FIG. 30 illustrates an arrangement example of a second gate driver 22d-2 in the bezel area 12 extending from the substrate end B on the other side in the first direction (X-direction) of the TFT substrate 100d to the display portion 11d.

In the configuration of a display device 10d according to the modification of the third embodiment illustrated in FIGS. 27 to 30, the first gate drive signals (first scan signals) GATEq (P) and GATEq+1 (P) and the second gate drive signals (second scan signals) GATEq (N) and GATEq+1 (N) are supplied from the first gate driver 22d-1 provided in the bezel area 12 on one side in the first direction (X-direction in FIG. 27) of the TFT substrate 100d to the pixels PX arranged in the (b+2×c×a)th row (where a is an integer of 1 or greater, b is an integer from 1 to a, and c is an integer of 0 or greater, and in this example, a=2), and the first gate drive signals (first scan signals) GATEq+2 (P) and GATEq+3 (P) and the second gate drive signals (second scan signals) GATEq+2 (N) and GATEq+3 (N) are supplied from the second gate driver 22d-2 provided in the bezel area 12 on the other side in the first direction (X-direction in FIG. 27) of the TFT substrate 100d to the pixels PX arranged in the (b+2×c+1)×a)th row. The above-described display device 10c according to the third embodiment represents the example in which a=1.

In the configuration illustrated in FIGS. 27 to 30, the first gate driver 22d-1 includes a first gate pulse generator 220d-1 and a buffer circuit unit 221d-1.

The first gate pulse generator 220d-1 includes: a first shift register 220Pd-1 that supplies the first gate drive signal (first scan signal) GATEq (P) to the first gate bus line (first scan line) SCLq(P) coupled to the gates of the PMOS transistors (first pixel transistors) PTR of some of the pixels PX arranged in the (b+2×c×a)th row that belongs to a row where the value of b is 1; a first shift register 220Pd-2 that supplies the first gate drive signal (first scan signal) GATEq+1 (P) to the first gate bus line (first scan line) SCLq+1 (P) coupled to the gates of the PMOS transistors (first pixel transistors) PTR of some of the pixels PX arranged in the (b+2×c×a)th row that belongs to a row where the value of b is 2; a second shift register 220Nd-1 that supplies the second gate drive signal (second scan signal) GATEq (N) to the second gate bus line (second scan line) SCLq(N) coupled to the gates of the NMOS transistors (second pixel transistors) NTR of some of the pixels PX arranged in the (b+2×c×a)th row that belongs to the row where the value of b is 1; and a second shift register 220Nd-2 that supplies the second gate drive signal (second scan signal) GATEq+1 (N) to the second gate bus line (second scan line) SCLq+1 (N) coupled to the gates of the NMOS transistors (second pixel transistors) NTR of some of the pixels PX arranged in the (b+2×c×a)th row that belongs to the row where the value of b is 2.

The buffer circuit unit 221d-1 includes: a first buffer circuit 221Pd-1 that supplies the first gate drive signal (first scan signal) GATEq (P) generated by the first shift register 220Pd-1 to the first gate bus line (first scan line) SCLq(P) coupled to the gates of the PMOS transistors (first pixel transistors) PTR of some of the pixels PX arranged in the (b+2×c×a)th row that belongs to the row where the value of b is 1; a first buffer circuit 221Pd-2 that supplies the first gate drive signal (first scan signal) GATEq+1 (P) generated by the first shift register 220Pd-2 to the first gate bus line (first scan line) SCLq+1 (P) coupled to the gates of the PMOS transistors (first pixel transistors) PTR of some of the pixels PX arranged in the (b+2×c×a)th row that belongs to the row where the value of b is 2; a second buffer circuit 221Nd-1 that supplies the second gate drive signal (second scan signal) GATEq (N) generated by the second shift register 220Nd-1 to the second gate bus line (second scan line) SCLq(N) coupled to the gates of the NMOS transistors (second pixel transistors) NTR of some of the pixels PX arranged in the (b+2×c×a)th row that belongs to the row where the value of b is 1; and a second buffer circuit 221Nd-2 that supplies the second gate drive signal (second scan signal) GATEq+1 (N) generated by the second shift register 220Nd-2 to the second gate bus line (second scan line) SCLq+1 (N) coupled to the gates of the NMOS transistors (second pixel transistors) NTR of some of the pixels PX arranged in the (b+2×c×a)th row that belongs to the row where the value of b is 2.

In the configuration illustrated in FIGS. 27 to 30, the second gate driver 22d-2 includes a second gate pulse generator 220d-2 and a buffer circuit unit 221d-2.

The second gate pulse generator 220d-2 includes: a first shift register 220Pd-3 that supplies the first gate drive signal (first scan signal) GATEq+2 (P) to the first gate bus line (first scan line) SCLq+2 (P) coupled to the gates of the PMOS transistors (first pixel transistors) PTR of some of the pixels PX arranged in the (b+(2×c+1)×a)th row that belongs to a row where the value of b is 1; a first shift register 220Pd-4 that supplies the first gate drive signal (first scan signal) GATEq+3 (P) to the first gate bus line (first scan line) SCLq+3 (P) coupled to the gates of the PMOS transistors (first pixel transistors) PTR of some of the pixels PX arranged in the (b+(2×c+1)×a)th row that belongs to a row where the value of b is 2; a second shift register 220Nd-3 that supplies the second gate drive signal (second scan signal) GATEq+2 (N) to the second gate bus line (second scan line) SCLq+2 (N) coupled to the gates of the NMOS transistors (second pixel transistors) NTR of some of the pixels PX arranged in the (b+(2×c+1)×a)th row that belongs to the row where the value of b is 1; and a second shift register 220Nd-4 that supplies the second gate drive signal (second scan signal) GATEq+3 (N) to the second gate bus line (second scan line) SCLq+3 (N) coupled to the gates of the NMOS transistors (second pixel transistors) NTR of some of the pixels PX arranged in the (b+(2×c+1)×a)th row that belongs to the row where the value of b is 2.

The buffer circuit unit 221d-2 includes a first buffer circuit 221Pd-3 that supplies the first gate drive signal (first scan signal) GATEq+2 (P) generated by the first shift register 220Pd-3 to the first gate bus line (first scan line) SCLq+2 (P) coupled to the gates of the PMOS transistors (first pixel transistors) PTR of some of the pixels PX arranged in the (b+(2×c+1)×a)th row that belongs to the row where the value of b is 1; a first buffer circuit 221Pd-4 that supplies the first gate drive signal (first scan signal) GATEq+3 (P) generated by the first shift register 220Pd-4 to the first gate bus line (first scan line) SCLq+3 (P) coupled to the gates of the PMOS transistors (first pixel transistors) PTR of some of the pixels PX arranged in the (b+(2×c+1)×a)th row that belongs to the row where the value of b is 2; a second buffer circuit 221Nd-3 that supplies the second gate drive signal (second scan signal) GATEq+2 (N) generated by the second shift register 220Nd-3 to the second gate bus line (second scan line) SCLq+2 (N) coupled to the gates of the NMOS transistors (second pixel transistors) NTR of some of the pixels PX arranged in the (b+(2×c+1)×a)th row that belongs to the row where the value of b is 1; and a second buffer circuit 221Nd-4 that supplies the second gate drive signal (second scan signal) GATEq+3 (N) generated by the second shift register 220Nd-4 to the second gate bus line (second scan line) SCLq+3 (N) coupled to the gates of the NMOS transistors (second pixel transistors) NTR of some of the pixels PX arranged in the (b+(2×c+1)×a)th row that belongs to the row where the value of b is 2.

A processor 23*d* outputs the first start pulse VP and the first p-ch clock pulse CLKP1 to the first shift register 220Pd-1 of the first gate driver 22*d*-1. The processor 23*d* outputs the first start pulse VP and the second p-ch clock pulse CLKP2 to the first shift register 220Pd-2 of the first gate driver 22*d*-1. The processor 23*d* outputs the second start pulse VN and the first n-ch clock pulse CLKN1 to the second shift register 220Nd-1 of the first gate driver 22*d*-1. The processor 23*d* outputs the second start pulse VN and the second n-ch clock pulse CLKN2 to the second shift register 220Nd-2 of the first gate driver 22*d*-1. The processor 23*d* outputs the first start pulse VP and a third p-ch clock pulse CLKP3 to the first shift register 220Pd-3 of the second gate driver 22*d*-2. The processor 23*d* outputs the first start pulse VP and a fourth p-ch clock pulse CLKP4 to the first shift register 220Pd-4 of the second gate driver 22*d*-2. The processor 23*d* outputs the second start pulse VN and a third n-ch clock pulse CLKN3 to the second shift register 220Nd-3 of the second gate driver 22*d*-2. The processor 23*d* outputs the second start pulse VN and a fourth n-ch clock pulse CLKN4 to the second shift register 220Nd-4 of the second gate driver 22*d*-2.

In the display device 10*d* according to the modification of the third embodiment, as illustrated in FIG. 29, a circuit of the first gate driver 22*d*-1 for rows of a (in this example, two rows) can be disposed in a portion of the bezel area 12 having a width of 2a rows (in this example, four rows) of the pixels PX. In the display device 10*d* according to the modification of the third embodiment, as illustrated in FIG. 30, a circuit of the second gate driver 22*d*-2 for rows of a (in this example, two rows) can be disposed in a portion of the bezel area 12 having a width of 2a rows (in this example, four rows) of the pixels PX. As a result, the bezel area 12 can be narrower in the first direction (X-direction in FIGS. 29 and 30) of the TFT substrate 100*d* than that in the first embodiment. Also, in the same manner as in the first embodiment, the number of the supplied power supply voltages having different voltage values can be reduced, and the cost for the power supply circuit 200 can be reduced.

Figure 31:
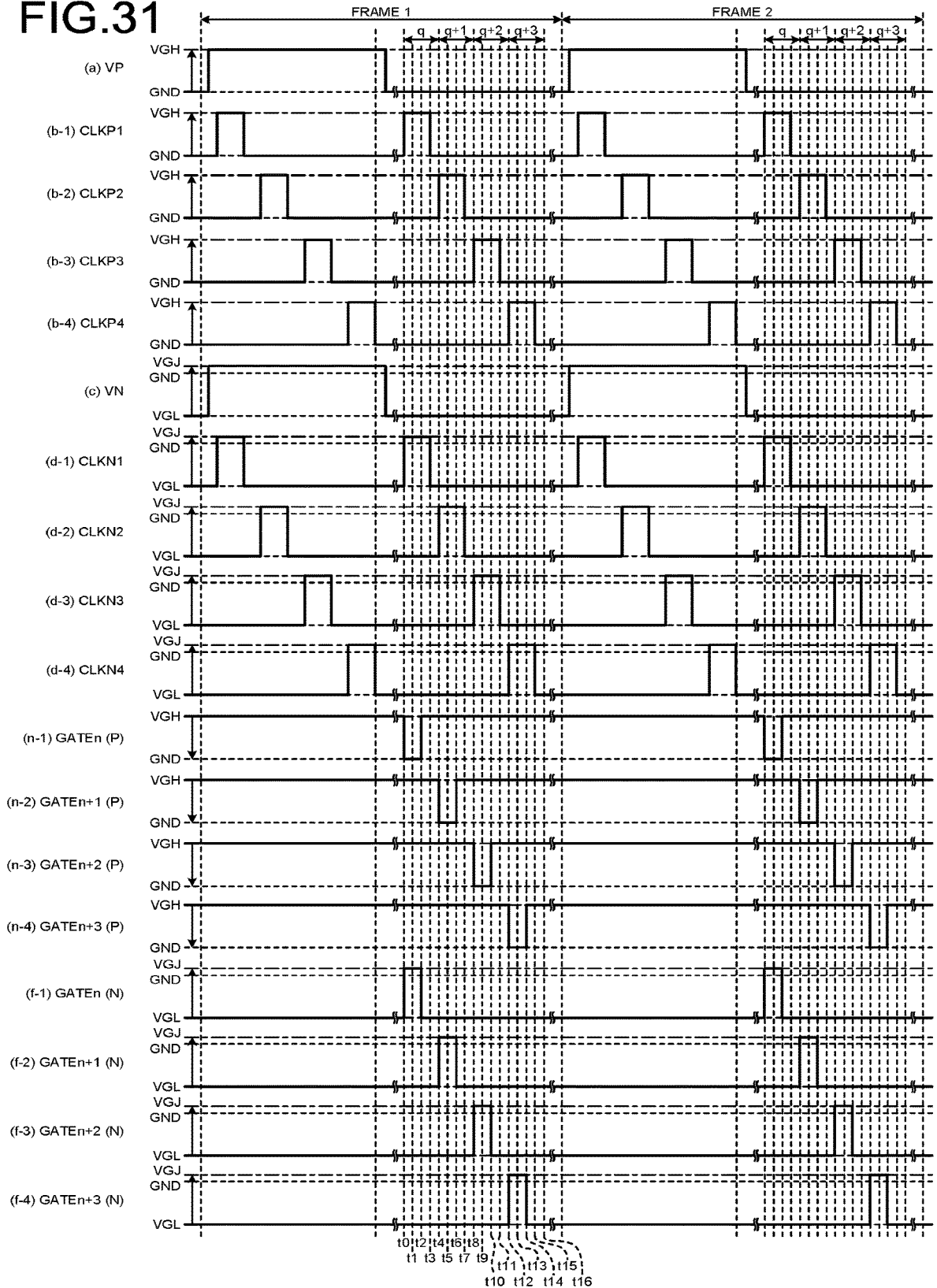
FIG. 31 is a timing diagram for the configuration of the display device according to the modification of the third embodiment illustrated in FIGS. 27 to 30.

The following describes an operation example in the display device 10*d* according to the modification of the third embodiment with reference to FIG. 31. FIG. 31 is a timing diagram for the configuration of the display device according to the modification of the third embodiment illustrated in FIGS. 27 to 30.

Diagram (a) illustrated in FIG. 31 represents the first start pulse VP.

Diagram (b-1) illustrated in FIG. 31 represents the first p-ch clock pulse CLKP1. Diagram (b-2) illustrated in FIG. 31 represents the second p-ch clock pulse CLKP2. Diagram (b-3) illustrated in FIG. 31 represents the third p-ch clock pulse CLKP3. Diagram (b-4) illustrated in FIG. 31 represents the fourth p-ch clock pulse CLKP4.

Diagram (c) illustrated in FIG. 31 represents the second start pulse VN.

Diagram (d-1) illustrated in FIG. 31 represents the first n-ch clock pulse CLKN1. Diagram (d-2) illustrated in FIG. 31 represents the second n-ch clock pulse CLKN2. Diagram (d-3) illustrated in FIG. 31 represents the third n-ch clock pulse CLKN3. Diagram (d-4) illustrated in FIG. 31 represents the fourth n-ch clock pulse CLKN4.

Diagram (e-1) illustrated in FIG. 31 represents the first gate drive signal (first scan signal) GATEq (P) output from the first gate pulse generator 220*d*-1. Diagram (e-2) illustrated in FIG. 31 represents the first gate drive signal (first scan signal) GATEq+1 (P) output from the second gate pulse generator 220*d*-2. Diagram (e-3) illustrated in FIG. 31 represents the first gate drive signal (first scan signal) GATEq+2 (P) output from a third gate pulse generator 220*d*-3. Diagram (e-4) illustrated in FIG. 31 represents the first gate drive signal (first scan signal) GATEq+3 (P) output from a fourth gate pulse generator 220*d*-4.

Diagram (f-1) illustrated in FIG. 31 represents the second gate drive signal (second scan signal) GATEq (N) output from the first gate pulse generator 220*d*-1. Diagram (f-2) illustrated in FIG. 31 represents the second gate drive signal (second scan signal) GATEq+1 (N) output from the second gate pulse generator 220*d*-2. Diagram (f-3) illustrated in FIG. 31 represents the second gate drive signal (second scan signal) GATEq+2 (N) output from the third gate pulse generator 220*d*-3. Diagram (f-4) illustrated in FIG. 31 represents the second gate drive signal (second scan signal) GATEq+3 (N) output from the fourth gate pulse generator 220*d*-4.

In the example illustrated in FIG. 31, a period from time t0 to time t4 represents a horizontal period in which the source drive signals (video signals) are written to the pixels PX in the q-th row; a period from time t4 to time t8 represents a horizontal period in which the source drive signals (video signals) are written to the pixels PX in the (q+1)th row; a period from time t8 to time t12 represents a horizontal period in which the source drive signals (video signals) are written to the pixels PX in the (q+2)th row; and a period from time t12 to time t16 represents a horizontal period in which the source drive signals (video signals) are written to the pixels PX in the (q+3)th row.

At time t0, the first gate drive signal (first scan signal) GATEq (P) is switched to the low potential (GND potential), and the second gate drive signal (second scan signal) GATEq (N) is switched to the high potential (second positive potential VGJ). Then, the PMOS transistors (first pixel transistors) PTR and the NMOS transistors (second pixel transistors) NTR of the pixels PX in the q-th row are placed in the on standby state.

At time t1, the source drive signals (video signals) are supplied to the pixels PX in the q-th row. Then, the pixel electrodes Pix of the pixels PX in the q-th row are supplied with the source drive signals (video signals), and the pixel capacitors CS are charged with electrical charges corresponding to the source drive signals (video signals).

Then, at time t2, the first gate drive signal (first scan signal) GATEq (P) is switched to the high potential (first positive potential VGH), and the second gate drive signal (second scan signal) GATEq (N) is switched to the low potential (negative potential VGL). Then, the PMOS transistors (first pixel transistors) PTR and the NMOS transistors (second pixel transistors) NTR of the pixels PX in the q-th row are placed in the off state. As a result, the pixel capacitors CS keep the potentials of the pixel electrodes Pix even after the source drive signals (video signals) are switched to the GND potential at time t3.

At time t4, the first gate drive signal (first scan signal) GATEq+1 (P) is switched to the low potential (GND potential), and the second gate drive signal (second scan signal) GATEq+1 (N) is switched to the high potential (second positive potential VGJ). Then, the PMOS transistors (first pixel transistors) PTR and the NMOS transistors (second pixel transistors) NTR in the (q+1)th row are placed in the on standby state.

At time t5, the source drive signals (video signals) are supplied to the pixels PX in the (q+1)th row. Then, the pixel electrodes Pix of the pixels PX in the (q+1)th row are supplied with the source drive signals (video signals), and the pixel capacitors CS are charged with electrical charges corresponding to the source drive signals (video signals).

Then, at time t6, the first gate drive signal (first scan signal) GATEq+1 (P) is switched to the high potential (first positive potential VGH), and the second gate drive signal (second scan signal) GATEq+1 (N) is switched to the low potential (negative potential VGL). Then, the PMOS transistors (first pixel transistors) PTR and the NMOS transistors (second pixel transistors) NTR of the pixels PX in the (q+1)th row are placed in the off state. As a result, the pixel capacitors CS keep the potentials of the pixel electrodes Pix even after the source drive signals (video signals) are switched to the GND potential at time t7.

At time t8, the first gate drive signal (first scan signal) GATEq+2 (P) is switched to the low potential (GND potential), and the second gate drive signal (second scan signal) GATEq+2 (N) is switched to the high potential (second positive potential VGJ). Then, the PMOS transistors (first pixel transistors) PTR and the NMOS transistors (second pixel transistors) NTR of the pixels PX in the (q+2)th row are placed in the on standby state.

At time t9, the source drive signals (video signals) are supplied to the pixels PX in the (q+2)th row. Then, the pixel electrodes Pix of the pixels PX in the (q+2)th row are supplied with the source drive signals (video signals), and the pixel capacitors CS are charged with electrical charges corresponding to the source drive signals (video signals).

Then, at time t10, the first gate drive signal (first scan signal) GATEq+2 (P) is switched to the high potential (first positive potential VGH), and the second gate drive signal (second scan signal) GATEq+2 (N) is switched to the low potential (negative potential VGL). Then, the PMOS transistors (first pixel transistors) PTR and the NMOS transistors (second pixel transistors) NTR of the pixels PX in the (q+2)th row are placed in the off state. As a result, the pixel capacitors CS keep the potentials of the pixel electrodes Pix even after the source drive signals (video signals) are switched to the GND potential at time t11.

At time t12, the first gate drive signal (first scan signal) GATEq+3 (P) is switched to the low potential (GND potential), and the second gate drive signal (second scan signal) GATEq+3 (N) is switched to the high potential (second positive potential VGJ). Then, the PMOS transistors (first pixel transistors) PTR and the NMOS transistors (second pixel transistors) NTR in the (q+3)th row are placed in the on standby state.

At time t13, the source drive signals (video signals) are supplied to the pixels PX in the (q+3)th row. Then, the pixel electrodes Pix of the pixels PX in the (q+3)th row are supplied with the source drive signals (video signals), and the pixel capacitors CS are charged with electrical charges corresponding to the source drive signals (video signals).

Then, at time t14, the first gate drive signal (first scan signal) GATEq+3 (P) is switched to the high potential (first positive potential VGH), and the second gate drive signal (second scan signal) GATEq+3 (N) is switched to the low potential (negative potential VGL). Then, the PMOS transistors (first pixel transistors) PTR and the NMOS transistors (second pixel transistors) NTR of the pixels PX in the (q+3)th row are placed in the off state. As a result, the pixel capacitors CS keep the potentials of the pixel electrodes Pix even after the source drive signals (video signals) are switched to the GND potential at time t15.

As described above, in each of the display devices 10c and 10d according to the third embodiment, the pixels PX arranged in the (b+2×c×a)th row (where a is an integer of 1 or greater, b is an integer from 1 to a, and c is an integer of 0 or greater) are supplied with the first gate drive signals (first scan signals) from the first shift registers provided in the bezel area 12 on one side in the first direction (X-direction) of corresponding one of the TFT substrates 100c and 100d, and in the same manner, are supplied with the second gate drive signals (second scan signals) from the second shift registers provided in the bezel area 12 on one side in the first direction (X-direction) of corresponding one of the TFT substrates 100c and 100d. Also, the pixels PX arranged in the (b+(2×c+1)×a)th row are supplied with the first gate drive signals (first scan signals) from the first shift registers provided in the bezel area 12 on the other side in the first direction (X-direction) of each of the TFT substrates 100c and 100d, and in the same manner, are supplied with the second gate drive signals (second scan signals) from the second shift registers provided in the bezel area 12 on the other side in the first direction (X-direction) of each of the TFT substrates 100c and 100d.

With the above-described configuration, in the bezel area 12 on one side in the first direction (X-direction) of each of the TFT substrates 100c and 100d, the circuit of the first gate driver for rows of a can be disposed in the bezel area 12 having the width of 2a rows of the pixels PX. Also, in the bezel area 12 on the other side in the first direction (X-direction) of each of the TFT substrates 100c and 100d, the circuit of the second gate driver for rows of a can be disposed in the bezel area 12 having the width of 2a rows of the pixels PX. With this configuration, the bezel area 12 can be narrower in the first direction (X-direction) of each of the TFT substrates 100c and 100d than that in the first embodiment.

In the same manner as in the first embodiment, the number of the supplied power supply voltages having different voltage values can be reduced, and the cost for the power supply circuit 200 can be reduced, so that the price of each of the display devices 10c and 10d can be reduced.

The present embodiment can provide the display devices 10c and 10d capable of reducing the number of the supplied power supply voltages having different voltage values.

Fourth Embodiment

Hereinafter, components having the same functions as those of the above-described first embodiment will be assigned with reference numerals identical thereto, and will not be described. A display device of a fourth embodiment of the present invention will be described mainly in terms of differences from that of the first embodiment.

Figure 32:
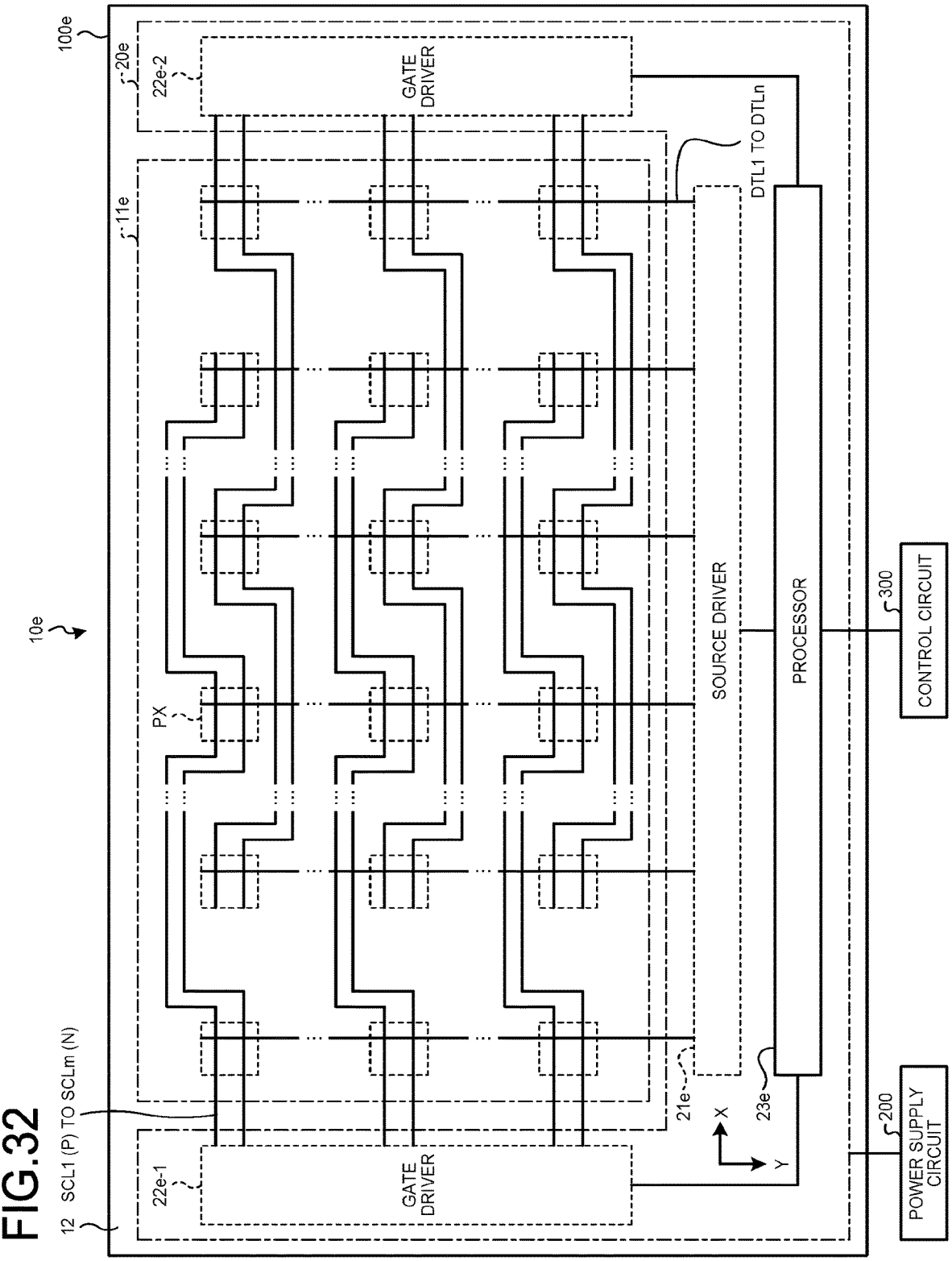
FIG. 32 is a diagram illustrating an exemplary schematic configuration of a display device according to a fourth embodiment of the present disclosure.
Figure 33:
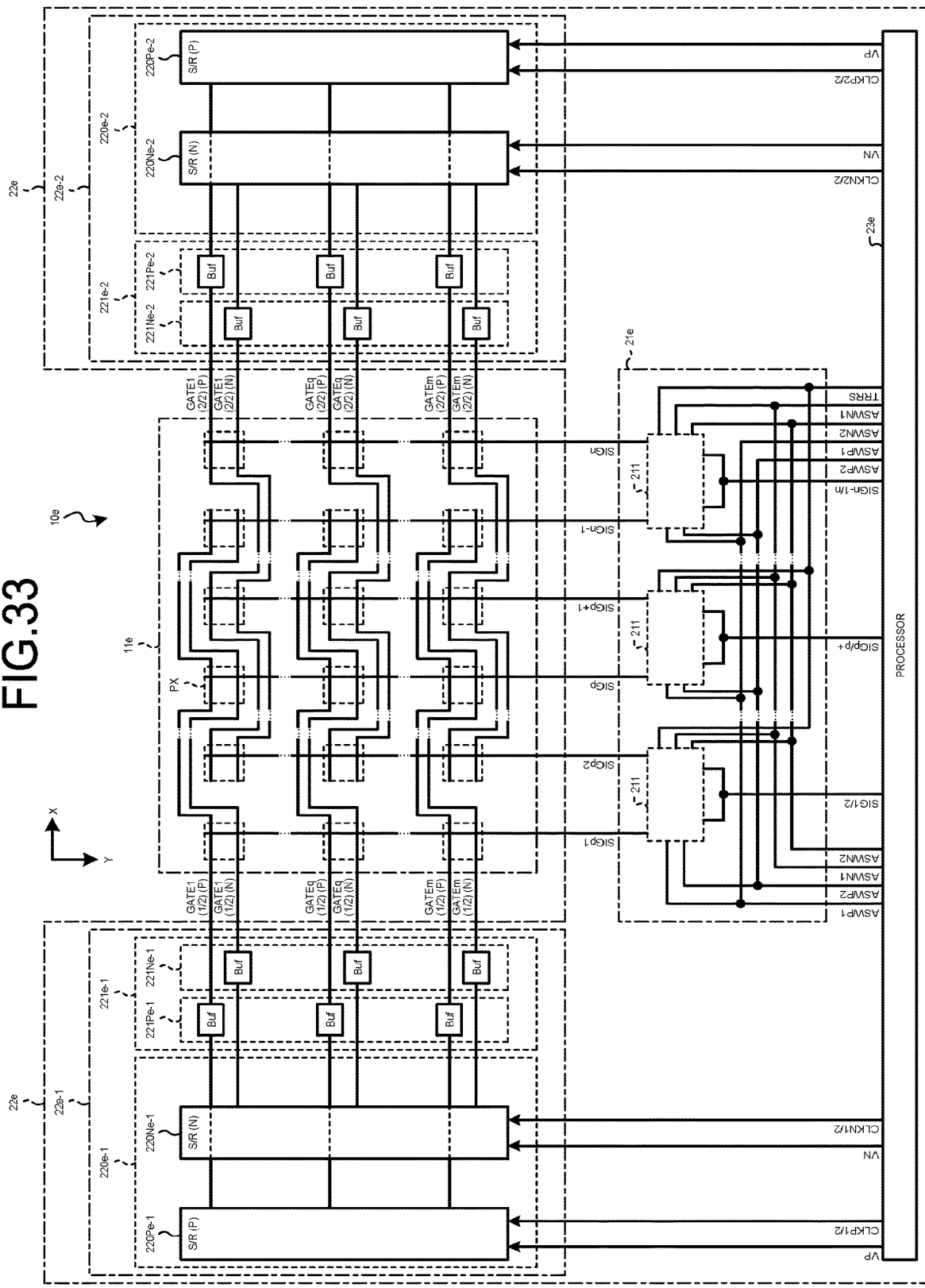
FIG. 33 is a diagram illustrating an exemplary overall configuration of a display portion and a display panel driver of the display device according to the fourth embodiment.

FIG. 32 is a diagram illustrating an exemplary schematic configuration of the display device according to the fourth embodiment. FIG. 33 is a diagram illustrating an exemplary overall configuration of a display portion and a display panel driver of the display device according to the fourth embodiment.

A display device 10e according to the present embodiment supplies the first gate drive signal (first scan signal) GATEq(1/2)(P) and the second gate drive signal (second scan signal) GATEq(1/2)(N) from a first gate driver 22e-1 provided in the bezel area 12 on one side in the first direction (X-direction in FIG. 32) of a TFT substrate 100e to the pixels PX arranged in odd-numbered columns of each row, and supplies the first gate drive signal (first scan signal) GATEq(2/2)(P) and the second gate drive signal (second scan signal) GATEq(2/2)(N) from a second gate driver 22e-2 provided in the bezel area 12 on the other side in the first direction (X-direction in FIG. 32) of the TFT substrate 100e to the pixels PX arranged in even-numbered columns of each row.

In the configuration illustrated in FIGS. 32 and 33, the first gate driver 22e-1 includes a first gate pulse generator 220e-1 and a buffer circuit unit 221e-1.

The first gate pulse generator 220e-1 includes a first odd-numbered column shift register 220Pe-1 that supplies the first gate drive signal (first scan signal) GATEq(1/2)(P) to the first gate bus line (first scan line) SCLq(1/2)(P) coupled to the gates of the PMOS transistors (first pixel transistors) PTR of the pixels PX belonging to the odd-numbered columns of each row, and includes a second odd-numbered column shift register 220Ne-1 that supplies the second gate drive signal (second scan signal) GATEq(1/2)(N) to the second gate bus line (second scan line) SCLq(1/2)(N) coupled to the gates of the NMOS transistors (second pixel transistors) NTR of the pixels PX belonging to the odd-numbered columns of each row.

The buffer circuit unit 221e-1 includes a first odd-numbered column buffer circuit 221Pe-1 that supplies the first gate drive signal (first scan signal) GATEq(1/2)(P) generated by the first odd-numbered column shift register 220Pe-1 to the first gate bus line (first scan line) SCLq(1/2)(P) coupled to the gates of the PMOS transistors (first pixel transistors) PTR of the pixels PX belonging to the odd-numbered columns of each row, and includes a second odd-numbered column buffer circuit 221Ne-1 that supplies the second gate drive signal (second scan signal) GATEq(1/2)(N) generated by the second odd-numbered column shift register 220Ne-1 to the second gate bus line (second scan line) SCLq(1/2)(N) coupled to the gates of the NMOS transistors (second pixel transistors) NTR of the pixels PX belonging to the odd-numbered columns of each row.

In the configuration illustrated in FIGS. 32 and 33, the second gate driver 22e-2 includes a second gate pulse generator 220e-2 and a buffer circuit unit 221e-2.

The second gate pulse generator 220e-2 includes a first even-numbered column shift register 220Pe-2 that supplies the first gate drive signal (first scan signal) GATEq(2/2)(P) to the first gate bus line (first scan line) SCLq(2/2)(P) coupled to the gates of the PMOS transistors (first pixel transistors) PTR of the pixels PX belonging to the even-numbered columns of each row, and includes a second even-numbered column shift register 220Ne-2 that supplies the second gate drive signal (second scan signal) GATEq(2/2)(N) to the second gate bus line (second scan line) SCLq(2/2)(N) coupled to the gates of the NMOS transistors (second pixel transistors) NTR of the pixels PX belonging to the even-numbered columns of each row.

The buffer circuit unit 221e-2 includes a first even-numbered column buffer circuit 221Pe-2 that supplies the first gate drive signal (first scan signal) GATEq(2/2)(P) generated by the first even-numbered column shift register 220Pe-2 to the first gate bus line (first scan line) SCLq(2/2)(P) coupled to the gates of the PMOS transistors (first pixel transistors) PTR of the pixels PX belonging to the even-numbered columns of each row, and includes a second even-numbered column buffer circuit 221Ne-2 that supplies the second gate drive signal (second scan signal) GATEq(2/2)(N) generated by the second even-numbered column shift register 220Ne-2 to the second gate bus line (second scan line) SCLq(2/2)(N) coupled to the gates of the NMOS transistors (second pixel transistors) NTR of the pixels PX belonging to the even-numbered columns of each row.

A processor 23e outputs the first start pulse VP and a first p-ch clock pulse CLKP1/2 to the first odd-numbered column shift register 220Pe-1 of the first gate driver 22e-1. The processor 23e outputs the second start pulse VN and a first n-ch clock pulse CLKN1/2 to the second odd-numbered column shift register 220Ne-1 of the first gate driver 22e-1. The processor 23e outputs the first start pulse VP and a second p-ch clock pulse CLKP2/2 to the first even-numbered column shift register 220Pe-2 of the second gate driver 22e-2. The processor 23e outputs the second start pulse VN and a second n-ch clock pulse CLKN2/2 to the second even-numbered column shift register 220Ne-2 of the second gate driver 22e-2.

A source driver 21e of the display device 10e according to the present embodiment includes video signal selectors 211 that temporally divide one horizontal period into a first period and a second period, and that supply the video signals to the pixels PX arranged in the odd-numbered columns in the first period and supply the video signals to the pixels PX arranged in the even-numbered columns in the second period.

In the present embodiment, the source driver 21e is disposed in the bezel area 12 on a side in the second direction (Y-direction in FIG. 32) of the TFT substrate 100e.

Figure 34:
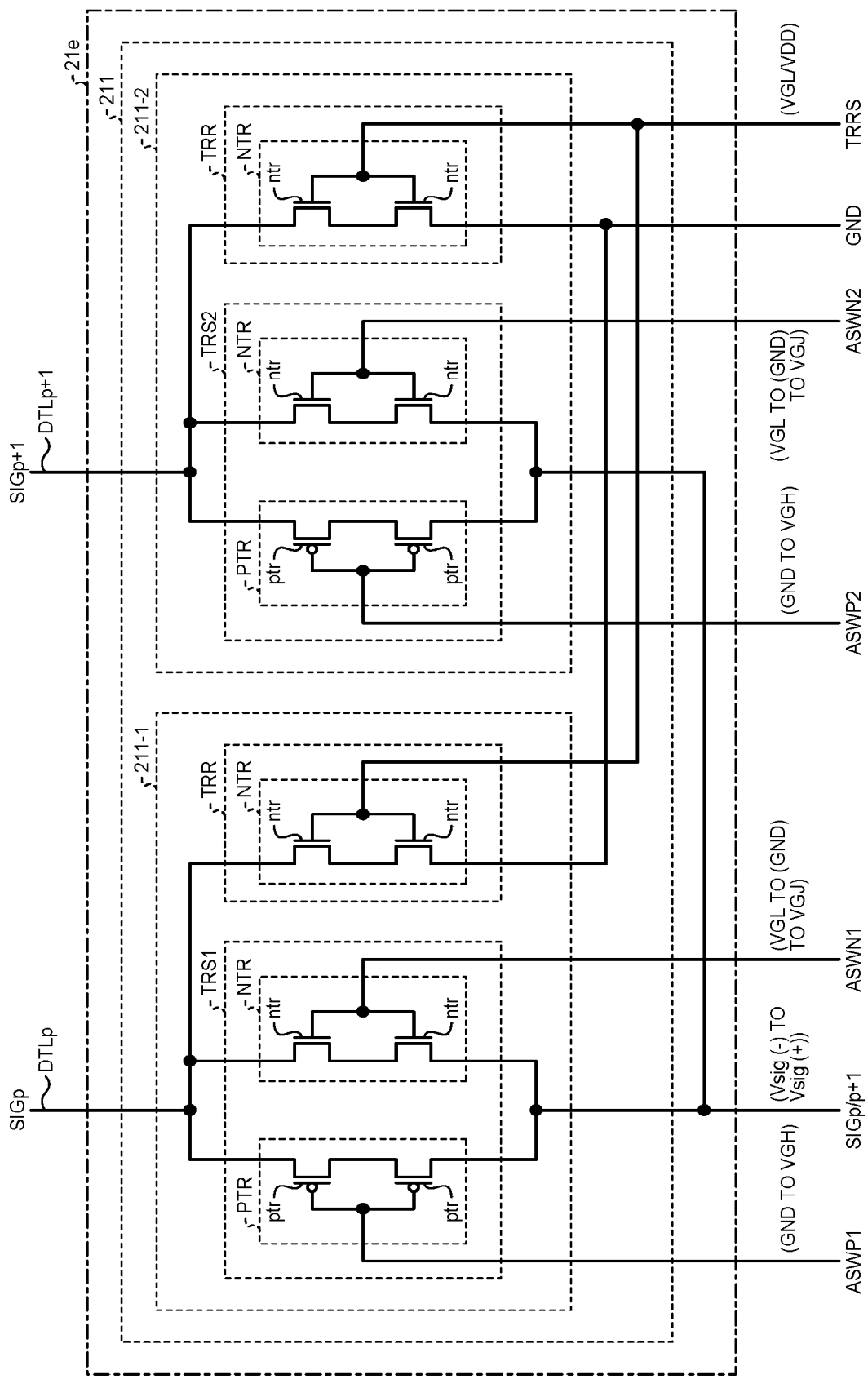
FIG. 34 is a diagram illustrating a configuration example of a video signal selector in a source driver of the display device according to the fourth embodiment.

FIG. 34 is a diagram illustrating a configuration example of each of the video signal selectors in the source driver of the display device according to the fourth embodiment. FIG. 34 illustrates the configuration in which the source drive signal (video signal) SIGp/p+1 is temporally divided, and the source drive signal (video signal) SIGp is supplied to the source bus line (video signal line) DTLp in the p-th column that is an odd-numbered column and the source drive signal (video signal) SIGp+1 is supplied to the source bus line (video signal line) DTLp+1 in the (p+1)th column that is an even-numbered column.

As illustrated in FIG. 34, each of the video signal selectors 211 includes an odd-numbered column video signal selection circuit 211-1 that supplies the source drive signal (video signal) SIGp to the source bus line (video signal line) DTLp in the p-th column that is an odd-numbered column and an even-numbered column video signal selection circuit 211-2 that supplies the source drive signal (video signal) SIGp+1 to the source bus line (video signal line) DTLp+1 in the (p+1)th column that is an even-numbered column.

The odd-numbered column video signal selection circuit 211-1 includes a first transistor circuit TRS1 that supplies the source drive signal (video signal) SIGp to the source bus line (video signal line) DTLp in the p-th column.

The even-numbered column video signal selection circuit 211-2 includes a second transistor circuit TRS2 that supplies the source drive signal (video signal) SIGp+1 to the source bus line (video signal line) DTLp+1 in the (p+1)th column.

Each of the odd-numbered column video signal selection circuit 211-1 and the even-numbered column video signal selection circuit 211-2 includes a video signal line reset transistor TRR that resets corresponding one of the source bus lines (video signal lines) DTLp and DTLp+1 to the GND potential.

In the present embodiment, each of the first transistor circuit TRS1 and the second transistor circuit TRS2 has a complementary MOS (CMOS) configuration including a PMOS transistor (first video selection transistor) PTR and an NMOS transistor (second video selection transistor) NTR.

The gate of the PMOS transistor (first video selection transistor) PTR of the first transistor circuit TRS1 is supplied with a first odd-numbered column video selection signal ASWP1 from the processor 23e. The gate of the NMOS transistor (second video selection transistor) NTR of the first transistor circuit TRS1 is supplied with a second odd-numbered column video selection signal ASWN1 from the processor 23e. The first odd-numbered column video selection signal ASWP1 is a pulsed signal having a high potential of the first positive potential VGH and a low potential of the GND potential. The second odd-numbered column video selection signal ASWN1 is a pulsed signal having a high potential of the second positive potential VGJ and a low potential of the negative potential VGL.

The source path and the drain path of the PMOS transistor (first video selection transistor) PTR of the first transistor circuit TRS1 are coupled in parallel respectively to the source path and the drain path of the NMOS transistor (second video selection transistor) NTR of the first transistor circuit TRS1. The drain of the PMOS transistor (first video selection transistor) PTR is coupled to the drain of the NMOS transistor (second video selection transistor) NTR.

In other words, the PMOS transistor (first video selection transistor) PTR is coupled in parallel to the NMOS transistor (second video selection transistor) NTR to constitute the first transistor circuit TRS1. The source bus line (video signal line) DTLp is coupled to a coupling point between the drain of the PMOS transistor (first video selection transistor) PTR and the drain of the NMOS transistor (second video selection transistor) NTR.

The sources of the PMOS transistor (first video selection transistor) PTR and the NMOS transistor (second video selection transistor) NTR of the first transistor circuit TRS1 are supplied with the source drive signal (video signal) SIGp/p+1 from the processor 23e.

The gate of the PMOS transistor (first video selection transistor) PTR of the second transistor circuit TRS2 is supplied with a first even-numbered column video selection signal ASWP2 from the processor 23e. The gate of the NMOS transistor (second video selection transistor) NTR of the second transistor circuit TRS2 is supplied with a second even-numbered column video selection signal ASWN2 from the processor 23e. The first even-numbered column video selection signal ASWP2 is a pulsed signal having a high potential of the first positive potential VGH and a low potential of the GND potential. The second even-numbered column video selection signal ASWN2 is a pulsed signal having a high potential of the second positive potential VGJ and a low potential of the negative potential VGL.

The source path and the drain path of the PMOS transistor (first video selection transistor) PTR of the second transistor circuit TRS2 are coupled in parallel respectively to the source path and the drain path of the NMOS transistor (second video selection transistor) NTR of the second transistor circuit TRS2. The drain of the PMOS transistor (first video selection transistor) PTR is coupled to the drain of the NMOS transistor (second video selection transistor) NTR.

In other words, the PMOS transistor (first video selection transistor) PTR is coupled in parallel to the NMOS transistor (second video selection transistor) NTR to constitute the second transistor circuit TRS2. The source bus line (video signal line) DTLp+1 is coupled to a coupling point between the drain of the PMOS transistor (first video selection transistor) PTR and the drain of the NMOS transistor (second video selection transistor) NTR.

The sources of the PMOS transistor (first video selection transistor) PTR and the NMOS transistor (second video selection transistor) NTR of the second transistor circuit TRS2 are supplied with the source drive signal (video signal) SIGp/p+1 from the processor 23e.

The example illustrated in FIG. 34 illustrates examples in which the PMOS transistor (first video selection transistor) PTR is constituted by coupling two PMOS transistors ptr in series, and the NMOS transistor (second video selection transistor) NTR is constituted by coupling two NMOS transistors ntr in series.

The PMOS transistor (first video selection transistor) PTR may be constituted by one of the PMOS transistors ptr, and the NMOS transistor (second video selection transistor) NTR may be constituted by one of the NMOS transistors ntr.

The PMOS transistor (first video selection transistor) PTR may be constituted by coupling three or more of the PMOS transistors ptr in series, and the NMOS transistor (second video selection transistor) NTR may be constituted by coupling the same number of the NMOS transistors ntr as that of the PMOS transistors ptr in series.

The video signal line reset transistor TRR is constituted by the NMOS transistor NTR. The source of the NMOS transistor NTR is coupled to the source bus line (video signal line) DTLp or DTLp+1. The drain of the NMOS transistor NTR is held at the GND potential. The gate of the NMOS transistor NTR is supplied with a video signal line reset signal TRRS from the processor 23e. The video signal line reset signal TRRS is a control signal switched between a high potential of a power supply voltage VDD of the processor 23e and a low potential of the negative potential VGL.

The example illustrated in FIG. 34 illustrates an example in which the NMOS transistor NTR constituting the video signal line reset transistor TRR is constituted by coupling the two NMOS transistors ntr in series.

The NMOS transistor NTR constituting the video signal line reset transistor TRR may be constituted by one of the NMOS transistors ntr.

The NMOS transistor NTR constituting the video signal line reset transistor TRR may be constituted by coupling three or more of the NMOS transistors ntr in series.

The source drive signal (video signal) SIGp/p+1 can have a voltage range from Vsig(−) to Vsig(+).

In the present embodiment, the voltage upper limit value Vsig(+) and the voltage lower limit value Vsig(−) of the source drive signal (video signal) SIGp have the same potential difference with respect to the GND potential (|Vsig(+)−GND|=|GND−Vsig(−)|). In other words, the middle value between the voltage upper limit value Vsig(+) and the voltage lower limit value Vsig(−) of the source drive signal (video signal) SIGp/p+1 serves as the GND potential. In the present embodiment, the voltage upper limit value Vsig(+) of the source drive signal (video signal) SIGp/p+1 is, for example, +15 V, and the voltage lower limit value Vsig(−) of the source drive signal (video signal) SIGp/p+1 is, for example, −15 V.

In the present embodiment, the GND potential serving as the low potential of the first odd-numbered column video selection signal ASWP1 is supplied to the gate of the PMOS transistor (first video selection transistor) PTR of the first transistor circuit TRS1 to place the PMOS transistor (first video selection transistor) PTR in the on standby state, and the second positive potential VGJ serving as the high potential of the second odd-numbered column video selection signal ASWN1 is supplied to the gate of the NMOS transistor (second video selection transistor) NTR to place the NMOS transistor (second video selection transistor) NTR in the on standby state.

In the present embodiment, the GND potential serving as the low potential of the first even-numbered column video selection signal ASWP2 is supplied to the gate of the PMOS transistor (first video selection transistor) PTR of the second transistor circuit TRS2 to place the PMOS transistor (first video selection transistor) PTR in the on standby state, and the second positive potential VGJ serving as the high potential of the second even-numbered column video selection signal ASWN2 is supplied to the gate of the NMOS transistor (second video selection transistor) NTR to place the NMOS transistor (second video selection transistor) NTR in the on standby state.

In the present embodiment, the processor 23e controls timing of the first odd-numbered column video selection signal ASWP1, the second odd-numbered column video selection signal ASWN1, the first even-numbered column video selection signal ASWP2, and the second even-numbered column video selection signal ASWN2 so as to temporally divide the source drive signal (video signal) SIGp/p+1, and to supply the source drive signal (video signal) SIGp to the source bus line (video signal line) DTLp in the p-th column that is an odd-numbered column and supply the source drive signal (video signal) SIGp+1 to the source bus line (video signal line) DTLp+1 in the (p+1)th column that is an even-numbered column.

In the present embodiment, as described above, the source driver 21e is disposed in the bezel area 12 on the side in the second direction (Y-direction in FIG. 32) of the TFT substrate 100e. In a configuration in which all the source bus lines (video signal lines) DTL1, DTLn are coupled to the processor 23e, the width of the source bus lines (video signal lines) DTL1, DTLn occupies a large portion of the width of the bezel area 12 in the second direction (Y-direction in FIG. 32) of the TFT substrate 100e, which causes hindrance to narrowing of the bezel area 12 in the second direction (Y-direction in FIG. 32) of the TFT substrate 100e.

In the display device 10e according to the present embodiment, the source driver 21e includes the video signal selectors 211, and one horizontal period is provided with the period (first period T1) of supplying the source drive signals (video signals) to the pixels PX belonging to the odd-numbered columns and the period (second period T2) of supplying the source drive signals (video signals) to the pixels PX belonging to the even-numbered columns. Thereby, the number of wires between the processor 23e and the source driver 21e can be reduced. As a result, the bezel area 12 can be narrower in the second direction (Y-direction in FIG. 32) of the TFT substrate 100e than that in each of the configurations of the above-described first to third embodiments. Since the power supply used by the video signal selectors 211 is the same as the power supply used by the first gate driver 22e-1 and the second gate driver 22e-2, the cost for the power supply circuit 200 can be reduced in the same manner as in the first embodiment.

Figure 35:
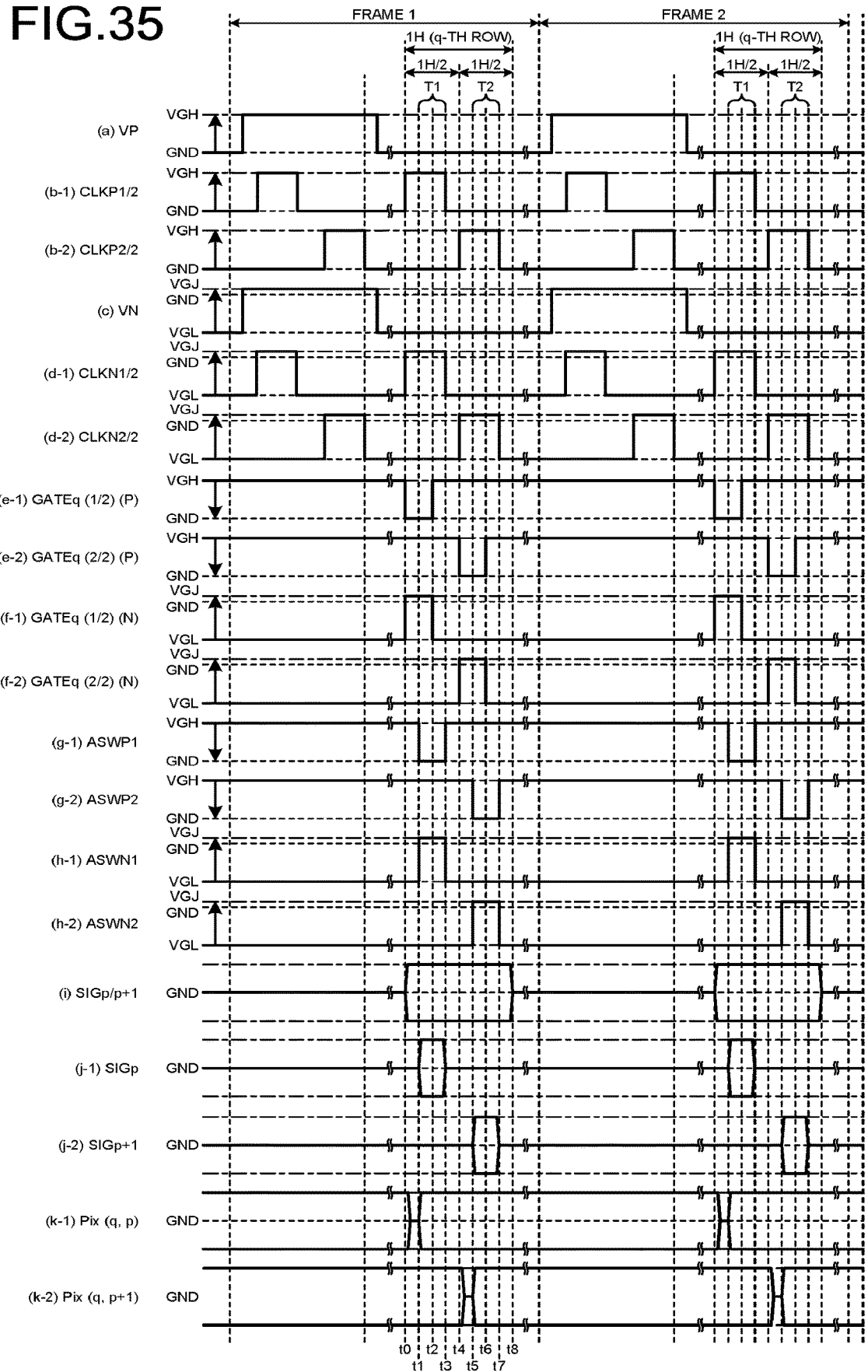
FIG. 35 is a timing diagram for the configuration of the display device according to the fourth embodiment illustrated in FIGS. 32 to 34.

The following describes an operation example in the display device 10e according to the fourth embodiment with reference to FIG. 35. FIG. 35 is a timing diagram for the configuration of the display device according to the fourth embodiment illustrated in FIGS. 32 to 34.

Diagram (a) illustrated in FIG. 35 represents the first start pulse VP.

Diagram (b-1) illustrated in FIG. 35 represents the first p-ch clock pulse CLKP1/2. Diagram (b-2) illustrated in FIG. 35 represents the second p-ch clock pulse CLKP2/2.

Diagram (c) illustrated in FIG. 35 represents the second start pulse VN.

Diagram (d-1) illustrated in FIG. 35 represents the first n-ch clock pulse CLKN1/2. Diagram (d-2) illustrated in FIG. 35 represents the second n-ch clock pulse CLKN2/2.

Diagram (e-1) illustrated in FIG. 35 represents the first gate drive signal (first scan signal) GATEq(1/2)(P) output from the first gate pulse generator 220e-1. Diagram (e-2) illustrated in FIG. 35 represents the first gate drive signal (first scan signal) GATEq(2/2)(P) output from the second gate pulse generator 220e-2.

Diagram (f-1) illustrated in FIG. 35 represents the second gate drive signal (second scan signal) GATEq(1/2)(N) output from the first gate pulse generator 220e-1. Diagram (f-2) illustrated in FIG. 35 represents the second gate drive signal (second scan signal) GATEq(2/2)(N) output from the second gate pulse generator 220e-2.

Diagram (g-1) illustrated in FIG. 35 represents the first odd-numbered column video selection signal ASWP1. Diagram (g-2) illustrated in FIG. 35 represents the first even-numbered column video selection signal ASWP2.

Diagram (h-1) illustrated in FIG. 35 represents the second odd-numbered column video selection signal ASWN1. Diagram (h-2) illustrated in FIG. 35 represents the second even-numbered column video selection signal ASWN2.

Diagram (i) illustrated in FIG. 35 represents the source drive signal (video signal) SIGp/p+1.

Diagram (j-1) illustrated in FIG. 35 represents the source drive signal (video signal) SIGp. Diagram (j-2) illustrated in FIG. 35 represents the source drive signal (video signal) SIGp+1.

Diagram (k-1) illustrated in FIG. 35 represents the potential of the pixel electrode Pix of the pixel PX in the q-th row of the p-th column. Diagram (k-2) illustrated in FIG. 35 represents the potential of the pixel electrode Pix of the pixel PX in the q-th row of the (p+1)th column.

In the example illustrated in FIG. 35, a period from time t0 to time t4 represents a horizontal period in which the source drive signal (video signal) is written to the pixel PX in the q-th row of the p-th column, and a period from time t4 to time t8 represents a horizontal period in which the source drive signal (video signal) is written to the pixel PX in the q-th row of the (p+1)th column.

At time t0, the first gate drive signal (first scan signal) GATEq(1/2)(P) is switched to the low potential (GND potential), and the second gate drive signal (second scan signal) GATEq(1/2)(N) is switched to the high potential (second positive potential VGJ). Then, the PMOS transistor (first pixel transistor) PTR and the NMOS transistor (second pixel transistor) NTR of the pixel PX in the q-th row of the p-th column are placed in the on standby state.

At time t1, the first odd-numbered column video selection signal ASWP1 is switched to the low potential (GND potential), and the second odd-numbered column video selection signal ASWN1 is switched to the high potential (second positive potential VGJ). Then, the first transistor TRS1 of the odd-numbered column video signal selection circuit 211-1 is placed in an on state, and the source drive signal (video signal) SIGp is supplied to the pixel electrode Pix of the pixel PX in the q-th row of the p-th column to charge the pixel capacitor CS of the pixel PX in the q-th row of the p-th column with an electrical charge corresponding to the source drive signal (video signal) SIGp.

Then, at time t2, the first gate drive signal (first scan signal) GATEq(1/2)(P) is switched to the high potential (first positive potential VGH), and the second gate drive signal (second scan signal) GATEq(1/2)(N) is switched to the low potential (negative potential VGL). Then, the PMOS transistor (first pixel transistor) PTR and the NMOS transistor (second pixel transistor) NTR of the pixel PX in the q-th row of the p-th column are placed in the off state.

At time t3, the first odd-numbered column video selection signal ASWP1 is switched to the high potential (first positive potential VGH), and the second odd-numbered column video selection signal ASWN1 is switched to the low potential (negative potential VGL). Then, the first transistor TRS1 of the odd-numbered column video signal selection circuit 211-1 is placed in the off state. In this state, the pixel capacitor CS keeps the potential of the pixel electrode Pix of the pixel PX in the q-th row of the p-th column even after the source drive signal (video signal) SIGp is switched to the GND potential. The period from time t1 to time t3 corresponds to the first period T1 in the present disclosure.

At time t4, the first gate drive signal (first scan signal) GATEq(2/2)(P) is switched to the low potential (GND potential), and the second gate drive signal (second scan signal) GATEq(2/2)(N) is switched to the high potential (second positive potential VGJ). Then, the PMOS transistor (first pixel transistor) PTR and the NMOS transistor (second pixel transistor) NTR of the pixel PX in the q-th row of the (p+1)th column are placed in the on standby state.

At time t5, the first even-numbered column video selection signal ASWP2 is switched to the low potential (GND potential), and the second even-numbered column video selection signal ASWN2 is switched to the high potential (second positive potential VGJ). Then, the first transistor TRS1 of the even-numbered column video signal selection circuit 211-2 is placed in the on state, and the source drive signal (video signal) SIGp+1 is supplied to the pixel electrode Pix of the pixel PX in the q-th row of the (p+1)th column to charge the pixel capacitor CS of the pixel PX in the q-th row of the (p+1)th column with an electrical charge corresponding to the source drive signal (video signal) SIGp+1.

Then, at time t6, the first gate drive signal (first scan signal) GATEq(2/2)(P) is switched to the high potential (first positive potential VGH), and the second gate drive signal (second scan signal) GATEq(2/2)(N) is switched to the low potential (negative potential VGL). Then, the PMOS transistor (first pixel transistor) PTR and the NMOS transistor (second pixel transistor) NTR of the pixel PX in the q-th row of the (p+1)th column are placed in the off state.

At time t7, the first even-numbered column video selection signal ASWP2 is switched to the high potential (first positive potential VGH), and the second even-numbered column video selection signal ASWN2 is switched to the low potential (negative potential VGL). Then, the first transistor TRS1 of the even-numbered column video signal selection circuit 211-2 is placed in the off state. In this state, the pixel capacitor CS keeps the potential of the pixel electrode Pix of the pixel PX in the q-th row of the (p+1)th column even after the source drive signal (video signal) SIGp+1 is switched to the GND potential. The period from time t5 to time t7 corresponds to the second period T2 in the present disclosure.

As described above, the display device 10e according to the fourth embodiment provides the first period T1 for supplying the source drive signals (video signals) to the pixels PX belonging to the odd-numbered columns of each row and the second period T2 for supplying the source drive signals (video signals) to the pixels PX belonging to the even-numbered columns of each row in one horizontal period, and includes the video signal selectors 211 that supply the source drive signals (video signals) to the pixels PX belonging to the odd-numbered columns of each row during the first period T1 and supply the source drive signals (video signals) to the pixels PX belonging to the even-numbered columns of each row during the second period T2.

This configuration can reduce the number of wires in the bezel area 12 on the side in the second direction (Y-direction in FIG. 32) of the TFT substrate 100e, and thus can narrow the bezel area 12 in the second direction (Y-direction in FIG. 32) of the TFT substrate 100e.

Since the power supply used by the video signal selectors 211 is the same as the power supply used by the first gate driver 22e-1 and the second gate driver 22e-2, the number of the supplied power supply voltages having different voltage values can be reduced in the same manner as in the first embodiment. As a result, the cost for the power supply circuit 200 can be reduced, and the price of the display device 10e can be reduced.

The present embodiment can provide the display device 10e capable of reducing the number of the supplied power supply voltages having different voltage values.

The components of the embodiments described above can be combined as appropriate. Other operational advantages accruing from aspects described in the above-described embodiments that are obvious from the description herein, or that are appropriately conceivable by those skilled in the art will naturally be understood as accruing from the above-described embodiments.

What is claimed is:

1. A display device comprising:
a display portion that is provided on a thin-film transistor (TFT) substrate and that comprises pixel capacitors and pixel transistors included in a plurality of pixels arranged in a matrix in a first direction and a second direction intersecting the first direction, a plurality of scan lines each coupled to some of the pixels arranged in the first direction, and a plurality of video signal lines each coupled to some of the pixels arranged in the second direction; and
a driver that is provided on the TFT substrate and that is configured to supply video signals to the video signal lines and to control the pixel transistors to be on and off through the scan lines, wherein
the pixel transistors comprise:
first pixel transistors that are p-channel metal-oxide semiconductor (PMOS) transistors coupled between the video signal lines and the pixel capacitors; and
second pixel transistors that are n-channel metal-oxide semiconductor (NMOS) transistors coupled in parallel to the first pixel transistors,
the scan lines comprise:
first scan lines coupled to gates of the first pixel transistors; and
second scan lines coupled to gates of the second pixel transistors, and
the driver comprises:
a first shift register configured to generate first scan signals to be sequentially supplied to the first scan lines at intervals of a predetermined period; and
a second shift register configured to generate second scan signals to be sequentially supplied to the second scan lines at intervals of the predetermined period, wherein
each of the first pixel transistors is provided by coupling a plurality of PMOS transistors in series between corresponding one of the video signal lines and corresponding one of the pixel capacitors, and
each of the second pixel transistors is provided by coupling the same number of NMOS transistors as that of the PMOS transistors included in the first pixel transistor in series between the video signal line and the pixel capacitor.

2. A display device comprising:
a display portion that is provided on a thin-film transistor (TFT) substrate and that comprises pixel capacitors and pixel transistors included in a plurality of pixels arranged in a matrix in a first direction and a second direction intersecting the first direction, a plurality of scan lines each coupled to some of the pixels arranged in the first direction, and a plurality of video signal lines each coupled to some of the pixels arranged in the second direction; and a driver that is provided on the TFT substrate and that is configured to supply video signals to the video signal lines and to control the pixel transistors to be on and off through the scan lines, wherein the pixel transistors comprise:

first pixel transistors that are p-channel metal-oxide semiconductor (PMOS) transistors coupled between the video signal lines and the pixel capacitors; and second pixel transistors that are n-channel metal-oxide semiconductor (NMOS) transistors coupled in parallel to the first pixel transistors, the scan lines comprise:

first scan lines coupled to gates of the first pixel transistors; and second scan lines coupled to gates of the second pixel transistors, and the driver comprises:

a first shift register configured to generate first scan signals to be sequentially supplied to the first scan lines at intervals of a predetermined period; and a second shift register configured to generate second scan signals to be sequentially supplied to the second scan lines at intervals of the predetermined period, wherein a high potential of the first scan signals is higher than a voltage upper limit value of the video signals supplied to the video signal lines, a low potential of the first scan signals is equal to or lower than a middle value of a potential difference between a voltage upper limit value and a voltage lower limit value of the video signals supplied to the video signal lines, a low potential of the second scan signals is lower than the voltage lower limit value of the video signals supplied to the video signal lines, and a high potential of the second scan signals is equal to or higher than the middle value of the potential difference between the voltage upper limit value and the voltage lower limit value of the video signals supplied to the video signal lines.

3. A display device comprising:

a display portion that is provided on a thin-film transistor (TFT) substrate and that comprises pixel capacitors and pixel transistors included in a plurality of pixels arranged in a matrix in a first direction and a second direction intersecting the first direction, a plurality of scan lines each coupled to some of the pixels arranged in the first direction, and a plurality of video signal lines each coupled to some of the pixels arranged in the second direction; and a driver that is provided on the TFT substrate and that is configured to supply video signals to the video signal lines and to control the pixel transistors to be on and off through the scan lines, wherein the pixel transistors comprise:

first pixel transistors that are p-channel metal-oxide semiconductor (PMOS) transistors coupled between the video signal lines and the pixel capacitors; and second pixel transistors that are n-channel metal-oxide semiconductor (NMOS) transistors coupled in parallel to the first pixel transistors, the scan lines comprise:

first scan lines coupled to gates of the first pixel transistors; and second scan lines coupled to gates of the second pixel transistors, and the driver comprises:

a first shift register configured to generate first scan signals to be sequentially supplied to the first scan lines at intervals of a predetermined period; and a second shift register configured to generate second scan signals to be sequentially supplied to the second scan lines at intervals of the predetermined period, wherein the first shift register is supplied with a first positive potential higher than a voltage upper limit value of the video signals supplied to the video signal lines and with a ground (GND) potential of the display portion, and the second shift register is supplied with a negative potential lower than a voltage lower limit value of the video signals supplied to the video signal lines and with a second positive potential lower than the first positive potential.

4. The display device according to claim 3, wherein the first shift register and the second shift register are provided in a bezel area outside the display portion.

5. The display device according to claim 4, wherein the first shift register and the second shift register are provided in the bezel area on either one side in the first direction.

6. The display device according to claim 4, wherein the first shift registers and the second shift registers are provided in the bezel area on both sides in the first direction.

7. The display device according to claim 6, wherein the first scan lines are supplied with the first scan signals from both the first shift registers provided in the bezel area on both sides in the first direction, and the second scan lines are supplied with the second scan signals from both the second shift registers provided in the bezel area on both sides in the first direction.

8. The display device according to claim 3, wherein the first shift register is provided in the bezel area on one side in the first direction, and the second shift register is provided in the bezel area on another side in the first direction.

9. The display device according to claim 3, wherein some of the first scan lines coupled to the gates of the first pixel transistors of some of the pixels arranged in (b+2×c×a)th rows (where a is an integer of 1 or greater, b is an integer from 1 to a, and c is an integer of 0 or greater) are supplied with the first scan signals from the first shift register provided in a bezel area on one side in the first direction, some of the second scan lines coupled to the gates of the second pixel transistors of the pixels arranged in the (b+2×c×a)th rows are supplied with the second scan signals from the second shift register provided in the bezel area on the one side in the first direction, some of the first scan lines coupled to the gates of the first pixel transistors of some of the pixels arranged in (b+(2×c+1)×a)th rows are supplied with the first scan signals from the first shift register provided in the bezel area on another side in the first direction, and some of the second scan lines coupled to the gates of the second pixel transistors of the pixels arranged in the (b+(2×c+1)×a)th rows are supplied with the second scan signals from the second shift register provided in the bezel area on the other side in the first direction.

10. The display device according to claim 9, wherein the first shift register provided in the bezel area on the one side in the first direction comprises shift registers configured to supply the first scan signals to the first scan lines coupled to the gates of the first pixel transistors of some of the pixels arranged in the (b+2×c×a)th rows that belong to rows specified by a value of b, the second shift register provided in the bezel area on the one side in the first direction comprises shift registers configured to supply the second scan signals to the second scan lines coupled to the gates of the second pixel transistors of the some of the pixels arranged in the (b+2×c×a)th rows that belong to the rows specified by the value of b, the first shift register provided in the bezel area on the other side in the first direction comprises shift registers configured to supply the first scan signals to the first scan lines coupled to the gates of the first pixel transistors of some of the pixels arranged in the (b+(2×c+1)×a)th rows that belong to rows specified by the value of b, the second shift register provided in the bezel area on the other side in the first direction comprises shift registers configured to supply the second scan signals to the second scan lines coupled to the gates of the second pixel transistors of the some of the pixels arranged in the (b+(2×c+1)×a)th rows that belong to the rows specified by the value of b.

11. The display device according to claim 3, wherein the first shift register comprises:
a first odd-numbered column shift register configured to supply the first scan signals to the gates of the first pixel transistors of some of the pixels belonging to odd-numbered columns of each row; and
a second odd-numbered column shift register configured to supply the second scan signals to the gates of the second pixel transistors of the some of the pixels belonging to the odd-numbered columns of each row, and the second shift register comprises:
a first even-numbered column shift register configured to supply the first scan signals to the gates of the first pixel transistors of some of the pixels belonging to even-numbered columns of each row; and
a second even-numbered column shift register configured to supply the second scan signals to the gates of the second pixel transistors of the some of the pixels belonging to the even-numbered columns of each row.

12. The display device according to claim 11, wherein the first odd-numbered column shift register and the second odd-numbered column shift register are provided in a bezel area on one side in the first direction, and
the first even-numbered column shift register and the second even-numbered column shift register are provided in the bezel area on another side in the first direction.

13. The display device according to claim 11, wherein the driver comprises a video signal selector configured to supply the video signals to the pixels arranged in the odd-numbered columns during a first period of one horizontal period, and supply the video signals to the pixels arranged in the even-numbered columns during a second period different from the first period in the one horizontal period.

14. The display device according to claim 13, wherein the video signal selector comprises:
a first transistor circuit configured to supply the video signals to the pixels arranged in the odd-numbered columns; and
a second transistor circuit configured to supply the video signals to the pixels arranged in the even-numbered columns, and
each of the first transistor circuit and the second transistor circuit comprises:
a first video selection transistor that is a PMOS transistor; and
a second video selection transistor that is an NMOS transistor coupled in parallel to the first video selection transistor.

15. The display device according to claim 14, wherein the driver is configured to:
output a first odd-numbered column video selection signal that switches a gate of the first video selection transistor of the first transistor circuit to a low potential and a second odd-numbered column video selection signal that switches a gate of the second video selection transistor of the first transistor circuit to a high potential during the first period; and
output a first even-numbered column video selection signal that switches a gate of the first video selection transistor of the second transistor circuit to the low potential and a second even-numbered column video selection signal that switches a gate of the second video selection transistor of the second transistor circuit to the high potential during the second period.

16. The display device according to claim 15, wherein the first video selection transistor is provided by coupling a plurality of NMOS transistors in series, and
the second video selection transistor is provided by coupling in series the same number of PMOS transistors as that of the NMOS transistors included in the first video selection transistor.

17. The display device according to claim 15, wherein
a high potential of the first odd-numbered column video selection signal and the first even-numbered column video selection signal is higher than the voltage upper limit value of the video signals supplied to first video signal lines and second video signal lines,
a low potential of the first odd-numbered column video selection signal and the first even-numbered column video selection signal is equal to or lower than a middle value of a potential difference between the voltage upper limit value and the voltage lower limit value of the video signals supplied to the first video signal lines and the second video signal lines,
a low potential of the second odd-numbered column video selection signal and the second even-numbered column video selection signal is lower than the voltage lower limit value of the video signals supplied to the first video signal lines and the second video signal lines, and
a high potential of the second odd-numbered column video selection signal and the second even-numbered column video selection signal is equal to or higher than the middle value of the potential difference between the voltage upper limit value and the voltage lower limit value of the video signals supplied to the first video signal lines and the second video signal lines.

* * * * *